United States Patent [19]
Yoneda et al.

[11] Patent Number: 5,548,666
[45] Date of Patent: Aug. 20, 1996

[54] IMAGE FORMING APPARATUS WITH FILING FUNCTION WHICH CAN STORE IMAGE DATA AND CAN EFFICIENTLY PERFORM DOCUMENT FILING

[75] Inventors: Hitoshi Yoneda; Haruyoshi Hasegawa, both of Kawasaki; Takefumi Nosaki, Yokohama; Koji Tanimoto, Kawasaki; Hironobu Machida; Hajime Nakamura, both of Tokyo, all of Japan

[73] Assignee: Kabushiki Kaisha Toshiba, Kawasaki, Japan

[21] Appl. No.: 352,457

[22] Filed: Dec. 9, 1994

Related U.S. Application Data

[63] Continuation of Ser. No. 182,404, Jan. 18, 1994, abandoned, which is a continuation of Ser. No. 992,385, Dec. 17, 1992, abandoned, which is a continuation of Ser. No. 632,339, Dec. 21, 1990, Pat. No. 5,222,157.

[30]  Foreign Application Priority Data

Dec. 25, 1989  [JP]  Japan ..................................... 1-336007

[51] Int. Cl.$^6$ ................................................... G06K 9/36
[52] U.S. Cl. ................................................. 382/276; 382/306
[58] Field of Search ................................... 382/276, 282, 382/232, 317, 305; 358/403, 450

[56]  References Cited

U.S. PATENT DOCUMENTS

| | | | |
|---|---|---|---|
| 4,437,127 | 3/1984 | Hirose | 358/403 |
| 4,445,195 | 4/1984 | Yamamoto | 358/403 |
| 4,506,342 | 3/1985 | Yamamoto | 358/403 |
| 4,760,606 | 7/1988 | Lesnick et al. | 382/48 |
| 4,768,099 | 8/1988 | Mukai | 358/403 |
| 5,019,916 | 5/1991 | Ogura | 358/449 |
| 5,027,421 | 6/1991 | Kanno | 382/47 |
| 5,041,918 | 8/1991 | Ishida et al. | 358/442 |
| 5,058,185 | 10/1991 | Morris et al. | 382/61 |
| 5,093,873 | 3/1992 | Takahashi | 382/61 |
| 5,191,429 | 3/1993 | Rourke | 358/449 |

Primary Examiner—Jose L. Couso
Attorney, Agent, or Firm—Foley & Lardner

[57]  ABSTRACT

An apparatus for printing an image which is stored on an optical disk is read by a scanner. A plurality of images read out from the optical disk are edited to form an abstract image on the basis of a predetermined unit (e.g., one page), and code data (i.e., retrieval data) is added to the abstract image. The resultant image, including both the abstract image and the code data, is printed on a sheet. The code data is extracted from the printed image, and desired images are retrieved from the optical disk on the basis of the code data.

5 Claims, 59 Drawing Sheets

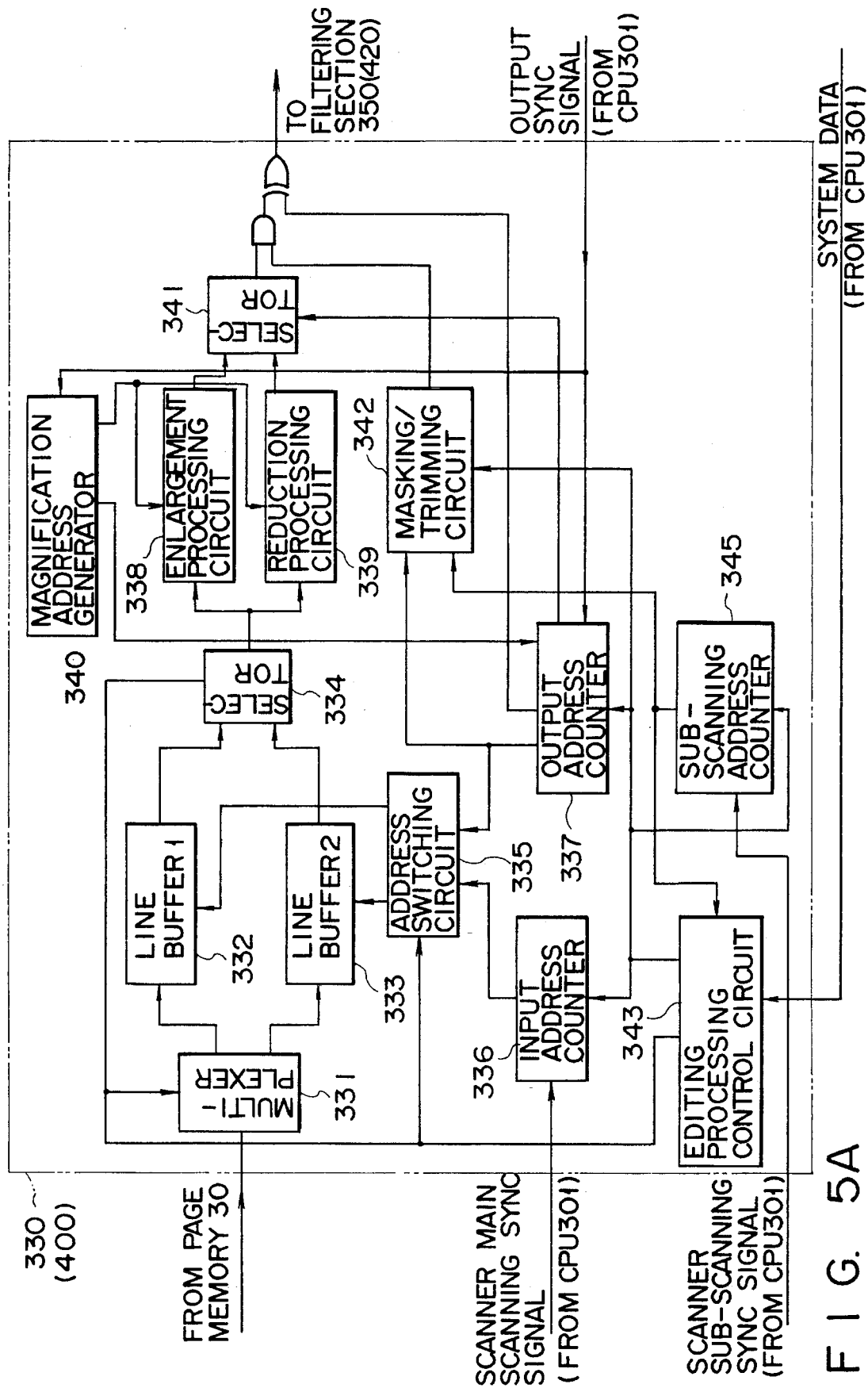
F I G. 5A

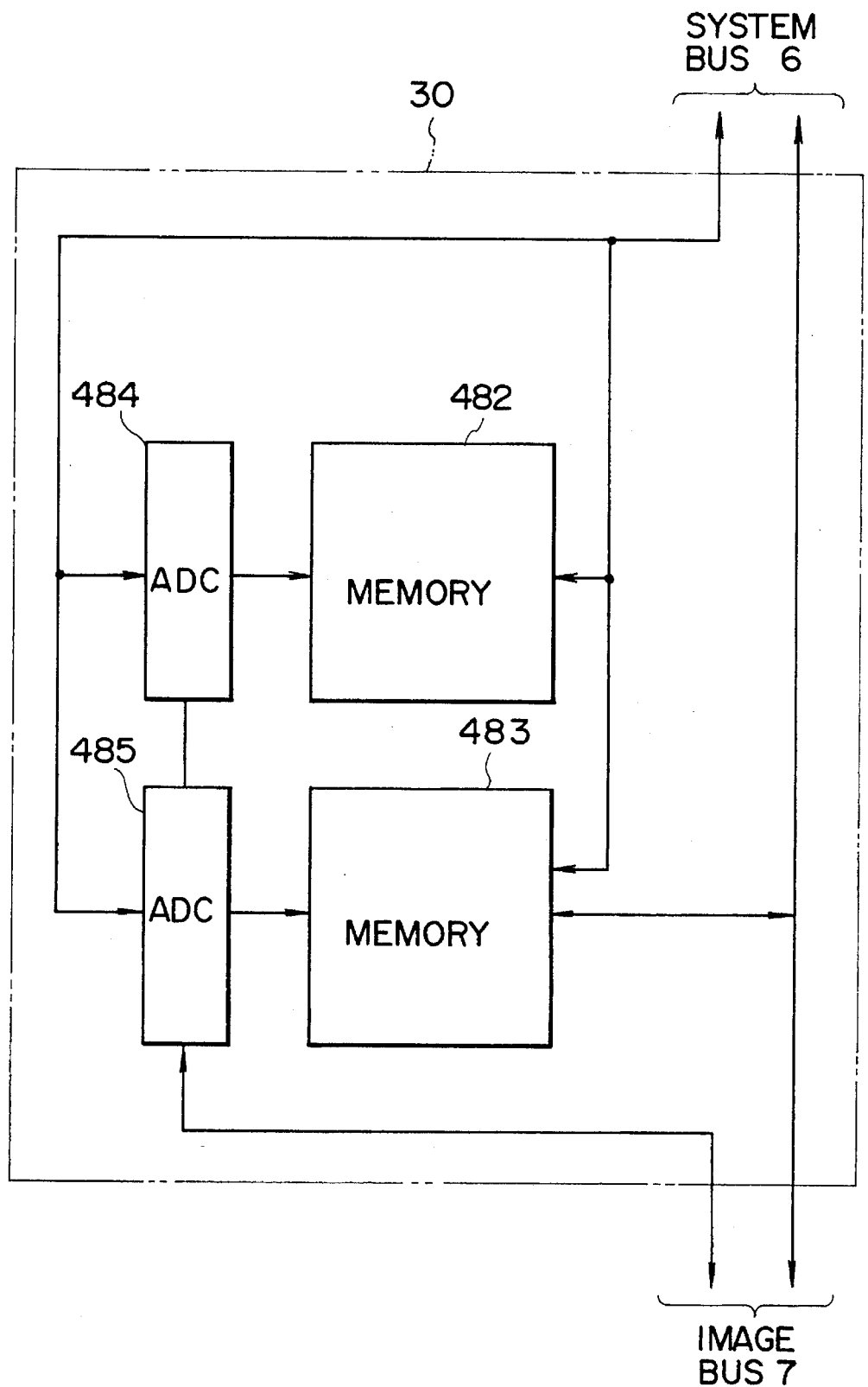
F I G. 6

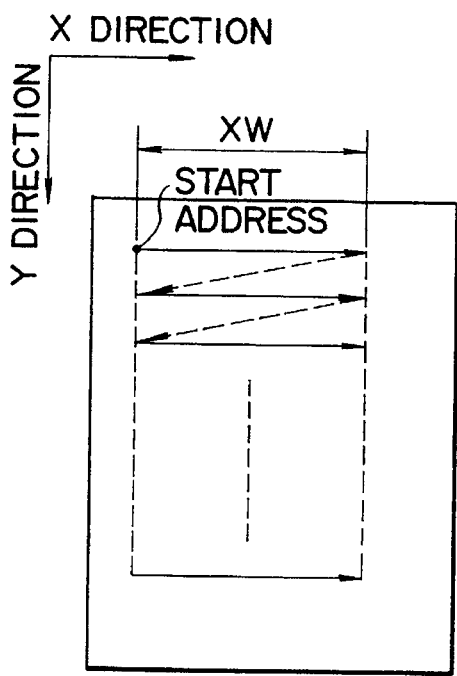 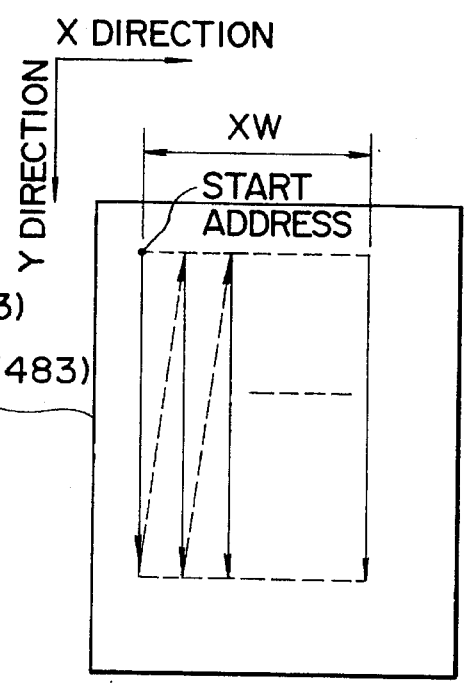
F I G. 7    F I G. 8

FIG. 11

| | | | | |
|---|---|---|---|---|
| 106/106a ● OUTPUT PAPER SIZE | ○ A5 120 | ● A4 121 | ○ A3 122 | ○ B5 123 | ○ B4 124 |
| 107/107a ○ ABSTRACT IMAGE CONTENTS | ● UPPER SURFACE / ABSTRACT IMAGE | ○ UPPER SURFACE | ○ ABSTRACT IMAGE | | |
| 108/108a ○ NUMBER OF ABSTRACT IMAGE | ● UNLIMITED | ○ ONE | | | |
| 109/109a ○ NUMBER OF ABSTRACT IMAGE DIVISIONS | ● AUTO-MATIC | ○ 4 | ○ 9 | ○ 16 | |
| 110/110a ○ UPPER SURFACE / ABSTRACT IMAGE RECORDING DIRECTION | ● VERTICALLY ELONGATED | ○ HORIZONTALLY ELONGATED | | | |
| 111/111a ○ ABSTRACT IMAGE REDUCTION CONDITION | ● SAME SIZE | ○ PROPORTIONAL | | | |
| 112/112a ○ DOCUMENT INPUT CONDITION | ● RADF | ○ MANUAL | | | |
| 113/113a ○ RADF DOCUMENT | ● SINGLE SIDE | ○ DOUBLE SIDE | | | |
| 114/114a ○ RADF FILE | ● MANUAL | ○ AUTOMATIC | | | |
| 115/115a ○ DOCUMENT SETTING DIRECTION | ● VERTICALLY ELONGATED | ○ HORIZONTALLY ELONGATED | | | |
| 116/146a ○ DOCUMENT SIZE | ○ A5 | ● A4 | ○ A3 | ○ B5 | ○ B4 |
| 117/147a ○ DOCUMENT TYPE | ● CHARACTER / PHOTOGRAPH | ○ CHARACTER | ○ PHOTOGRAPH | | |
| 118/148a ○ READ DENSITY | ● AUTOMATIC | HIGH ○ ○ ○ ○ ○ LOW | | | |

116 ○ CONFIRMATION

| | | |
|---|---|---|
| ○ RETRIEVAL MODE | ● AUTOMATIC ○ MANUAL | DOCUMENT NUMBER □□□□□ |
| ○ OUTPUT CONTENTS | ● ALL ○ PARTIAL | PAGE NUMBER □□□□□ |
| ○ NUMBER OF OUTPUT COPIES | ● ONE COPY ○ MULTIPLE COPIES | NUMBER OF COPIES □□ |
| ○ OUTPUT PAPER SIZE | ● AUTOMATIC ○ A5 ○ A4 ○ A3 ○ B5 ○ B4 | |
| ○ PRINTING SURFACE | ● SINGLE SIDE ○ DOUBLE SIDES | |
| | | ○ CONFIRMATION |

| | | |
|---|---|---|
| ○ DOCUMENT LIST CONTENTS —140 | | |
| ○ DATE DIVISION —141 | ● DESIGNATION ○ ALL —143 | [0][5]/[1][9][8][5] ~ [1][0]/[1][9][8][5] —144 |
| ○ AREA DESIGNATION —142 | ● TOTAL AREA  ○ 1/2  ○ 1/4  ○ 1/8 | |
| | | ○ CONFIRMATION —145 |

117

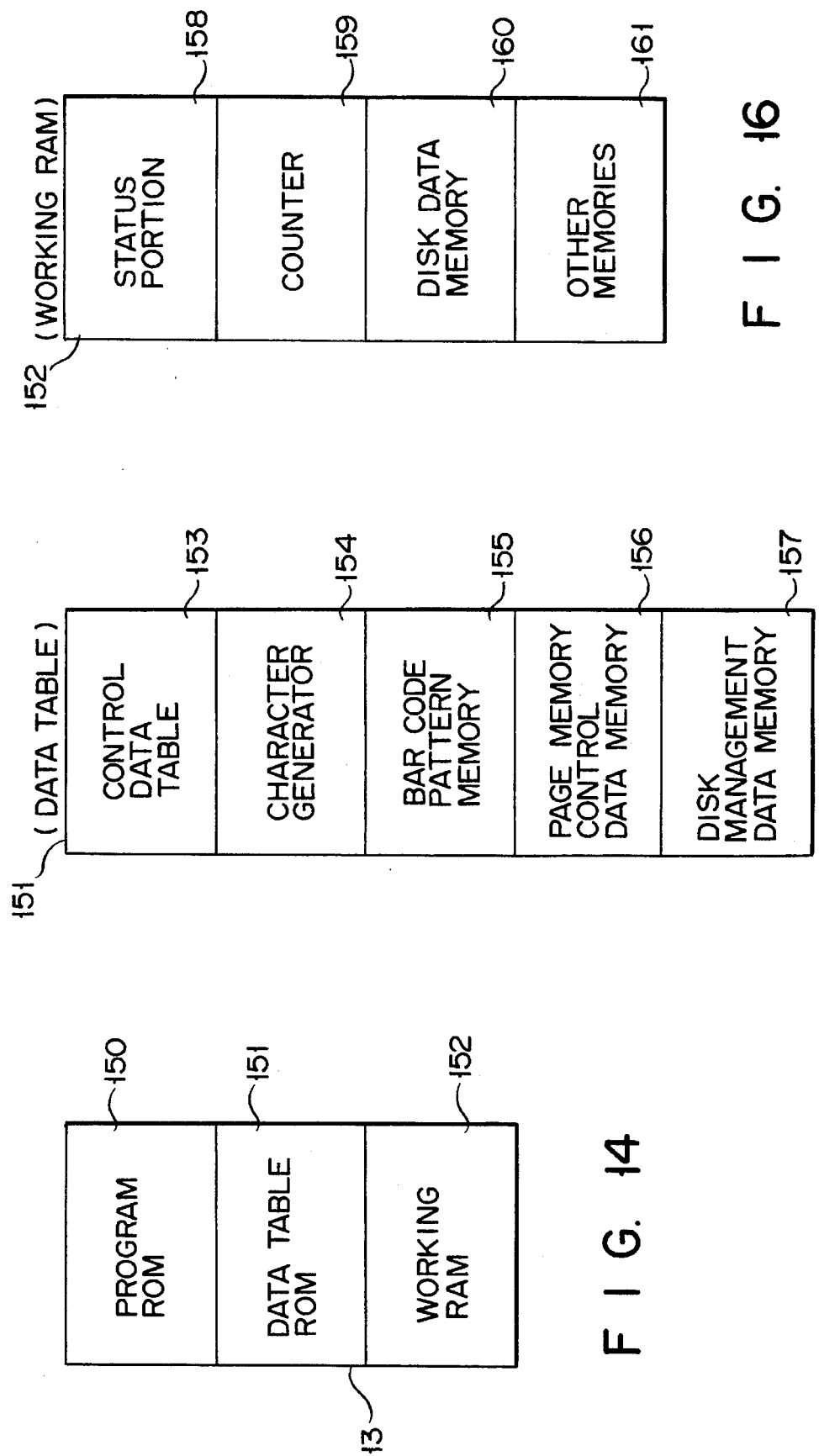
F I G. 16
F I G. 15
F I G. 14

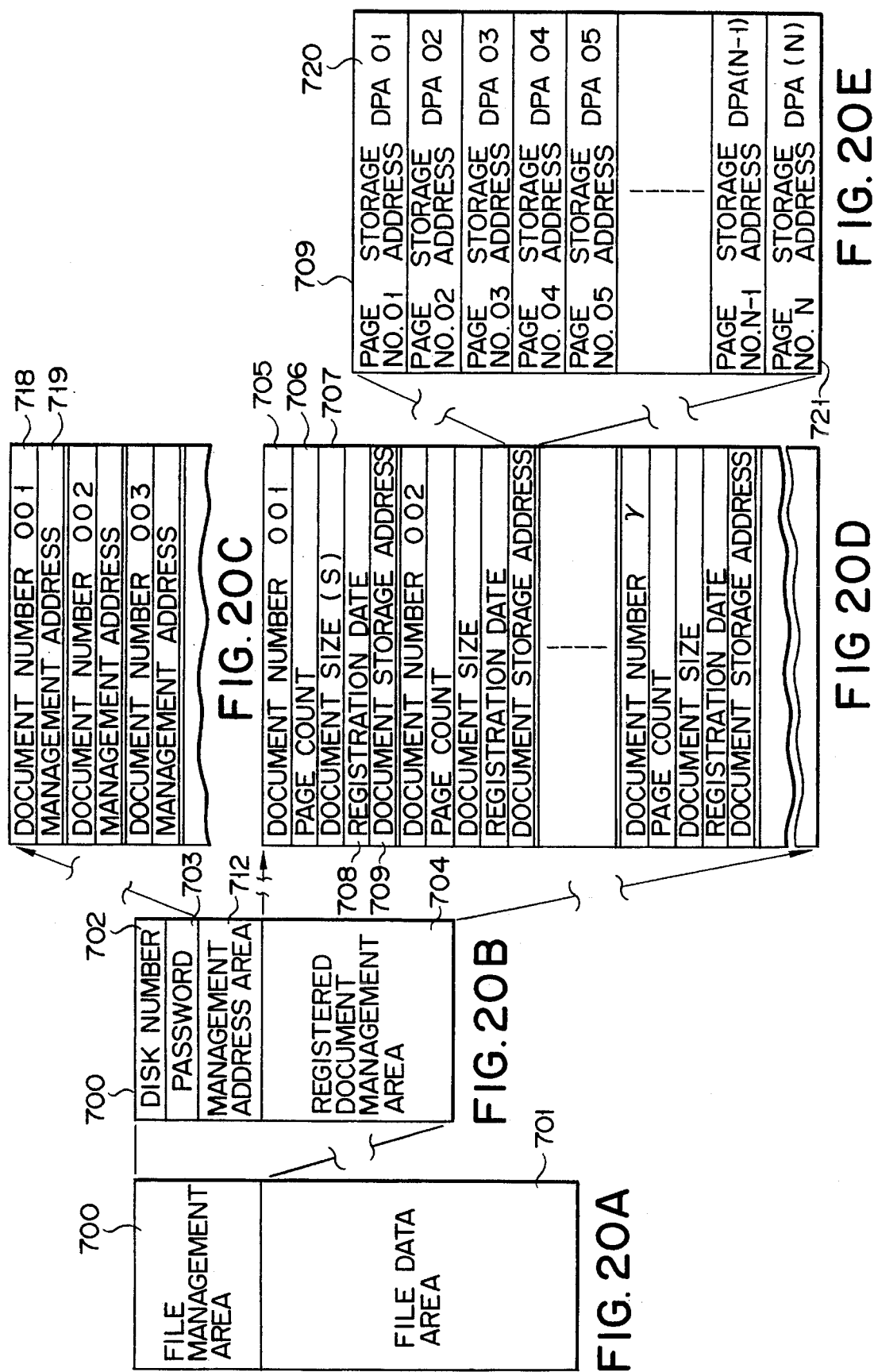

(4 DIVISIONS)
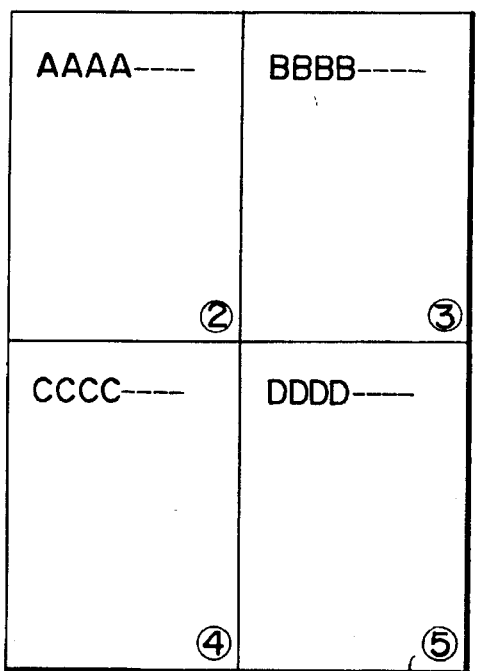
F I G. 23A
(9 DIVISIONS)
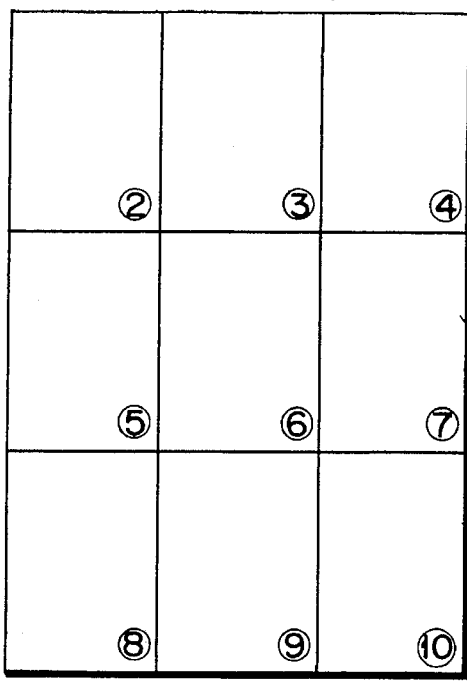
F I G. 23B
(16 DIVISIONS)
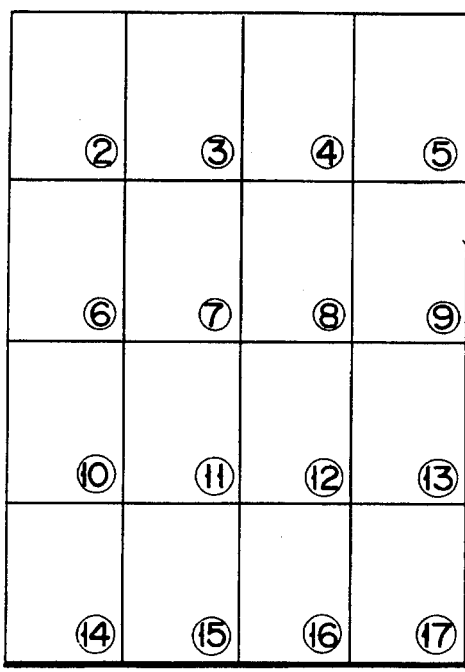
F I G. 23C

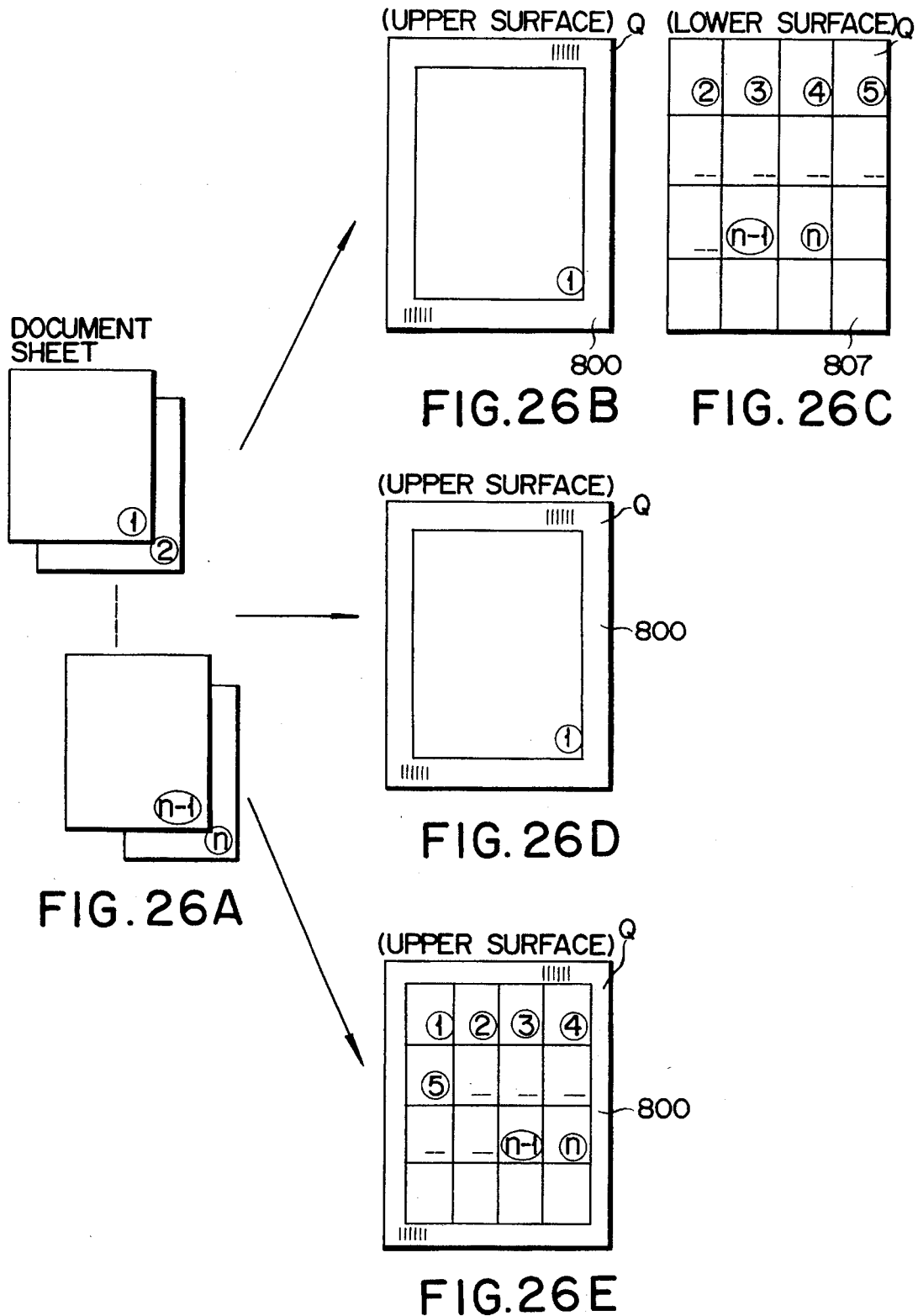

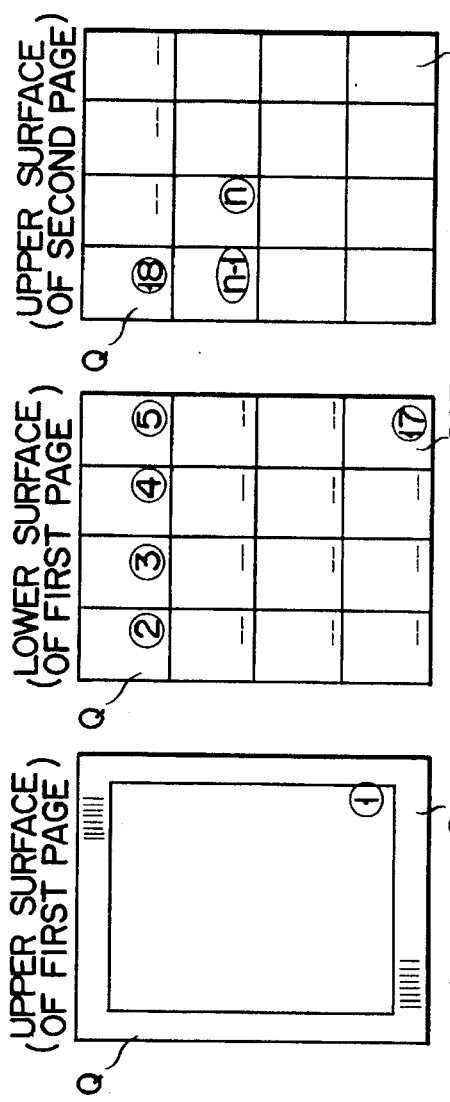
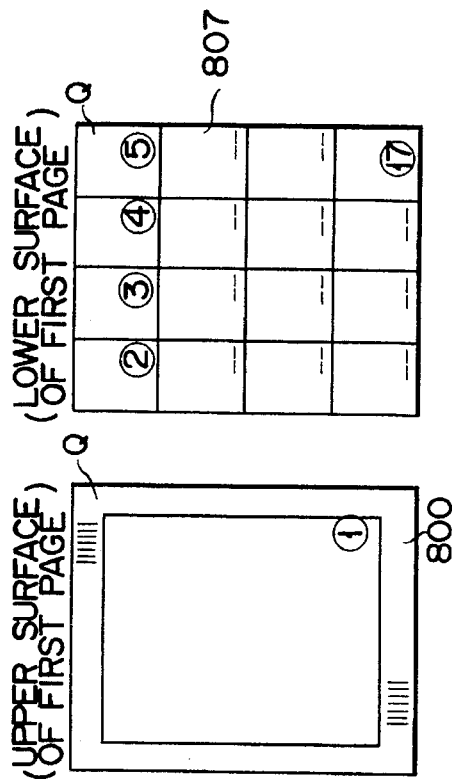
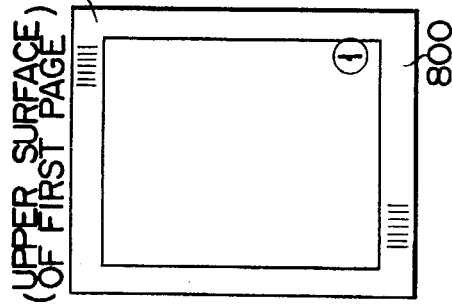
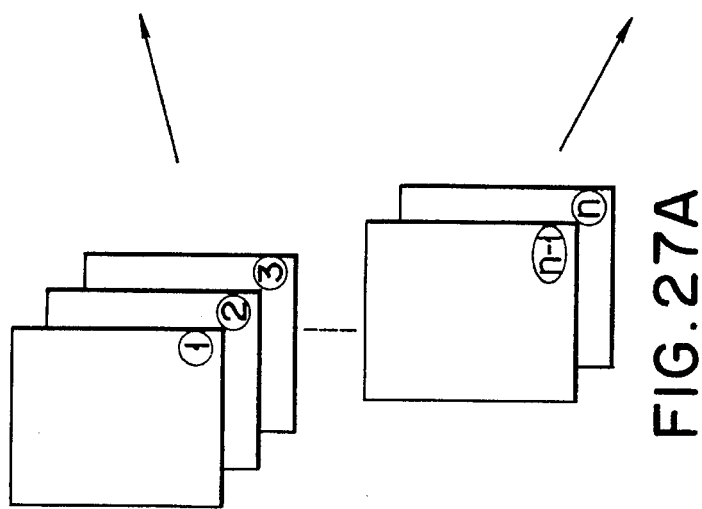
FIG. 27A, FIG. 27B, FIG. 27C, FIG. 27D, FIG. 27E, FIG. 27F

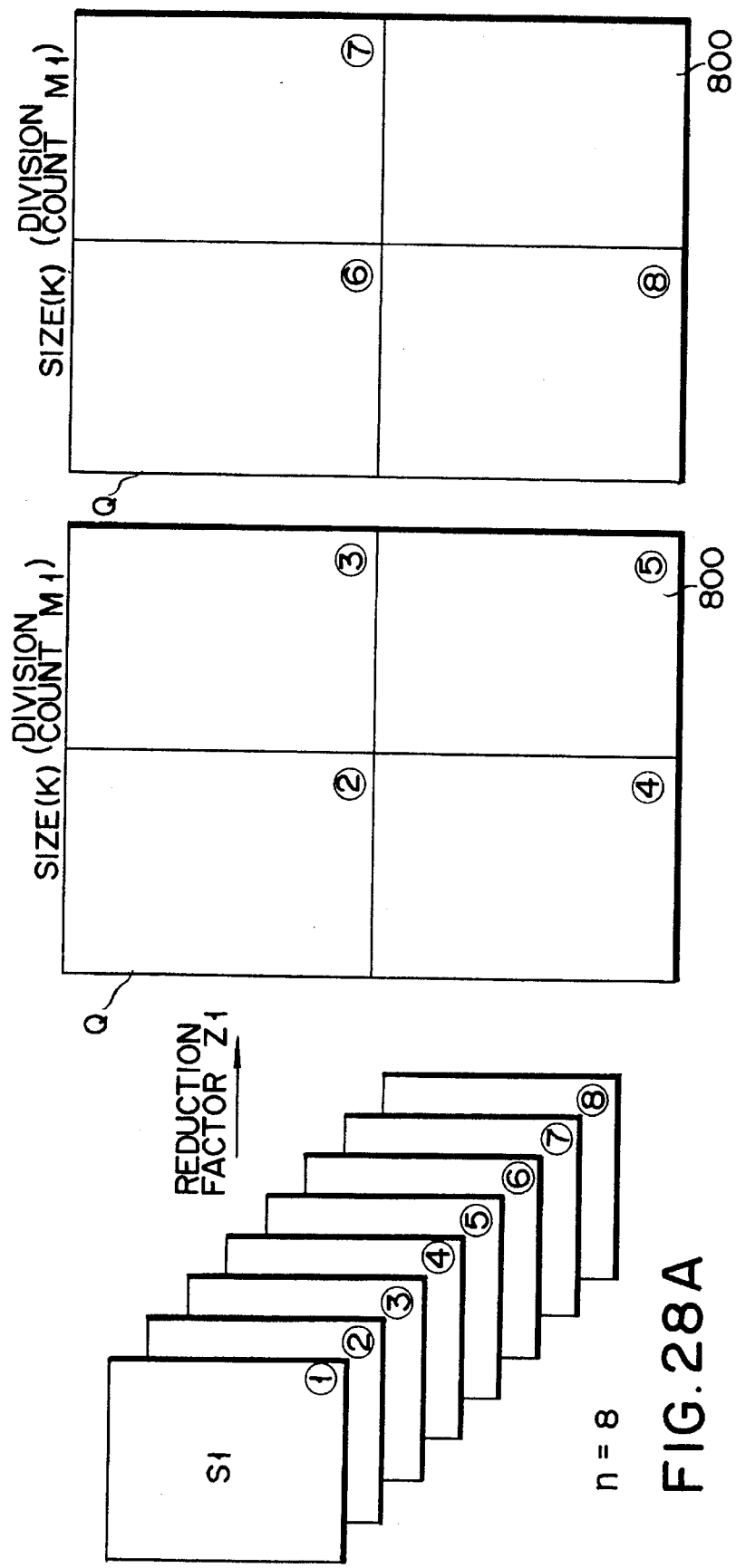

FIG. 34A

| DOCUMENT NUMBER | 001 |
| REGISTRATION DATE | 1985·2·3 |
| DOCUMENT NUMBER | 002 |
| REGISTRATION DATE | 1985·5·4 |
| DOCUMENT NUMBER | 003 |
| REGISTRATION DATE | 1985·10·10 |
| DOCUMENT NUMBER | 004 |
| REGISTRATION DATE | 1986·3·15 |
| DOCUMENT NUMBER | 005 |
| REGISTRATION DATE | 1987·8·3 |
| DOCUMENT NUMBER | 006 |
| REGISTRATION DATE | 1987·12·10 |
| DOCUMENT NUMBER | 007 |
| REGISTRATION DATE | 1988·6·8 |
| DOCUMENT NUMBER | 008 |
| REGISTRATION DATE | 1989·9·18 |

| DOCUMENT NUMBER | 001 |
| --- | --- |
| REGISTRATION DATE | 1985·2·3 |

| DOCUMENT NUMBER | 002 |
| --- | --- |
| REGISTRATION DATE | 1985·5·4 |

| DOCUMENT NUMBER | 003 |
| --- | --- |
| REGISTRATION DATE | 1985·10·10 |

| DOCUMENT NUMBER | 004 |
| --- | --- |
| REGISTRATION DATE | 1986·3·15 |

| DOCUMENT NUMBER | 005 |
| --- | --- |
| REGISTRATION DATE | 1987·8·3 |

| DOCUMENT NUMBER | 006 |
| --- | --- |
| REGISTRATION DATE | 1987·12·10 |

| DOCUMENT NUMBER | 007 |
| --- | --- |
| REGISTRATION DATE | 1988·6·8 |

| DOCUMENT NUMBER | 008 |
| --- | --- |
| REGISTRATION DATE | 1989·4·2 |

FIG. 35B

| 1985·2·3 / 001 | XXX YYY ZZZ | — | — |
| --- | --- | --- | --- |
| 1985·5·4 / 002 | AAA BBB CCC | — | — |
| 1985·10·10 / 003 | HHH III JJJ | — | — |
| 1986·3·15 / 004 | O P Q | — | — |
| 1987·8·3 / 005 | V W X | — | — |
| 1987·12·10 / 006 | C D E | — | — |
| 1988·6·8 / 007 | J K L | 1989·9·10 / n-1 | WWW XXX YYY |
| 1989·4·2 / 008 | Q R S | 1989·9·20 / n | ZZZ AAA BBB |

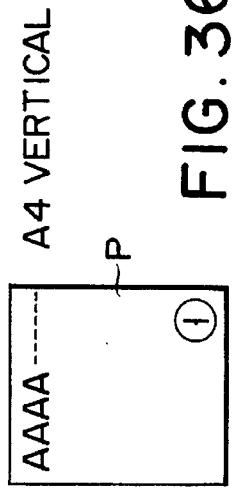

FIG. 36B
A4 VERTICAL

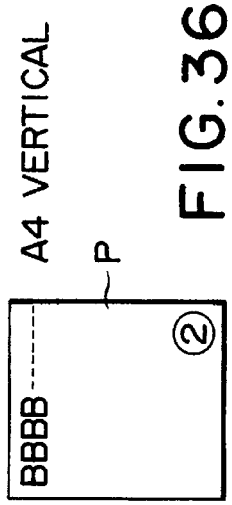

FIG. 36C
A4 VERTICAL

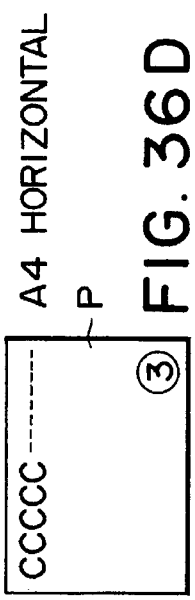

FIG. 36D
A4 HORIZONTAL

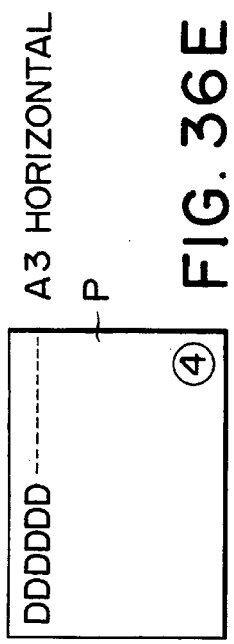

FIG. 36E
A3 HORIZONTAL

| 713 — | PAGE NO. | O1 | |
|---|---|---|---|
| 714 — | DOCUMENT SIZE | A4 | |
| 715 — | VERTICAL/HORIZONTAL DISCRIMINATION | VERTICAL | |
| 716 — | IMAGE DATA | | |
| 713 — | PAGE NO. | O2 | |
| 714 — | DOCUMENT SIZE | A4 | |
| 715 — | VERTICAL/HORIZONTAL DISCRIMINATION | VERTICAL | |
| 716 — | IMAGE DATA | | |
| 713 — | PAGE NO. | O3 | |
| 714 — | DOCUMENT SIZE | A4 | |
| 715 — | VERTICAL/HORIZONTAL DISCRIMINATION | HORIZONTAL | |
| 716 — | IMAGE DATA | | |
| 713 — | PAGE NO. | O4 | |
| 714 — | DOCUMENT SIZE | A3 | |
| 715 — | VERTICAL/HORIZONTAL DISCRIMINATION | HORIZONTAL | |
| 716 — | IMAGE DATA | | |

710 ↑

EQUAL MAGNIFICATION →  (×4)

FIG. 36A

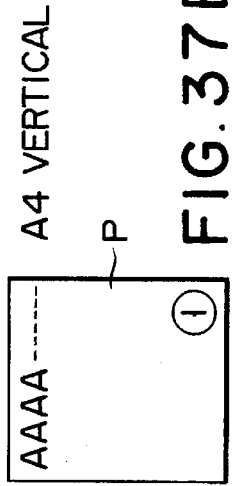
FIG. 37B
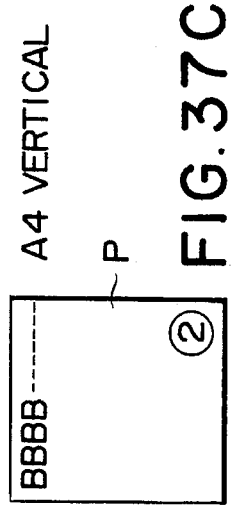
FIG. 37C
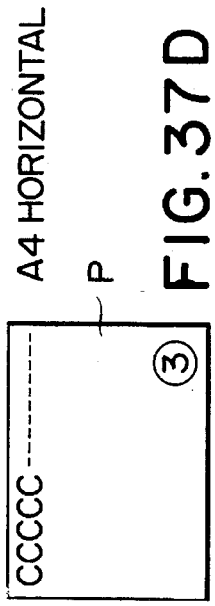
FIG. 37D
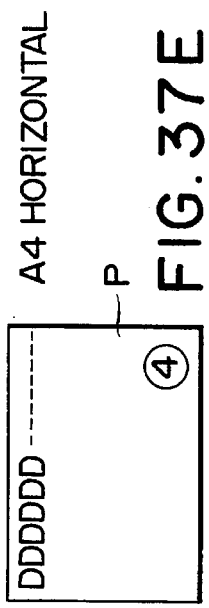
FIG. 37E
FIG. 37A

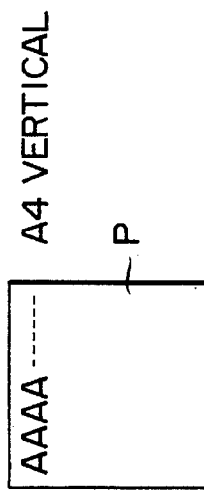
FIG. 38B
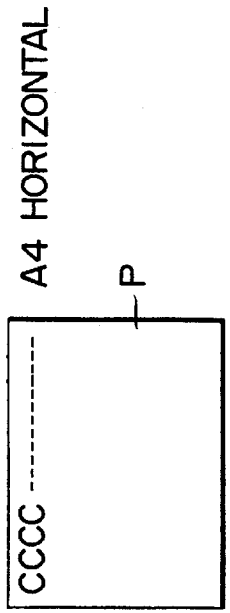
FIG. 38C
FIG. 38A

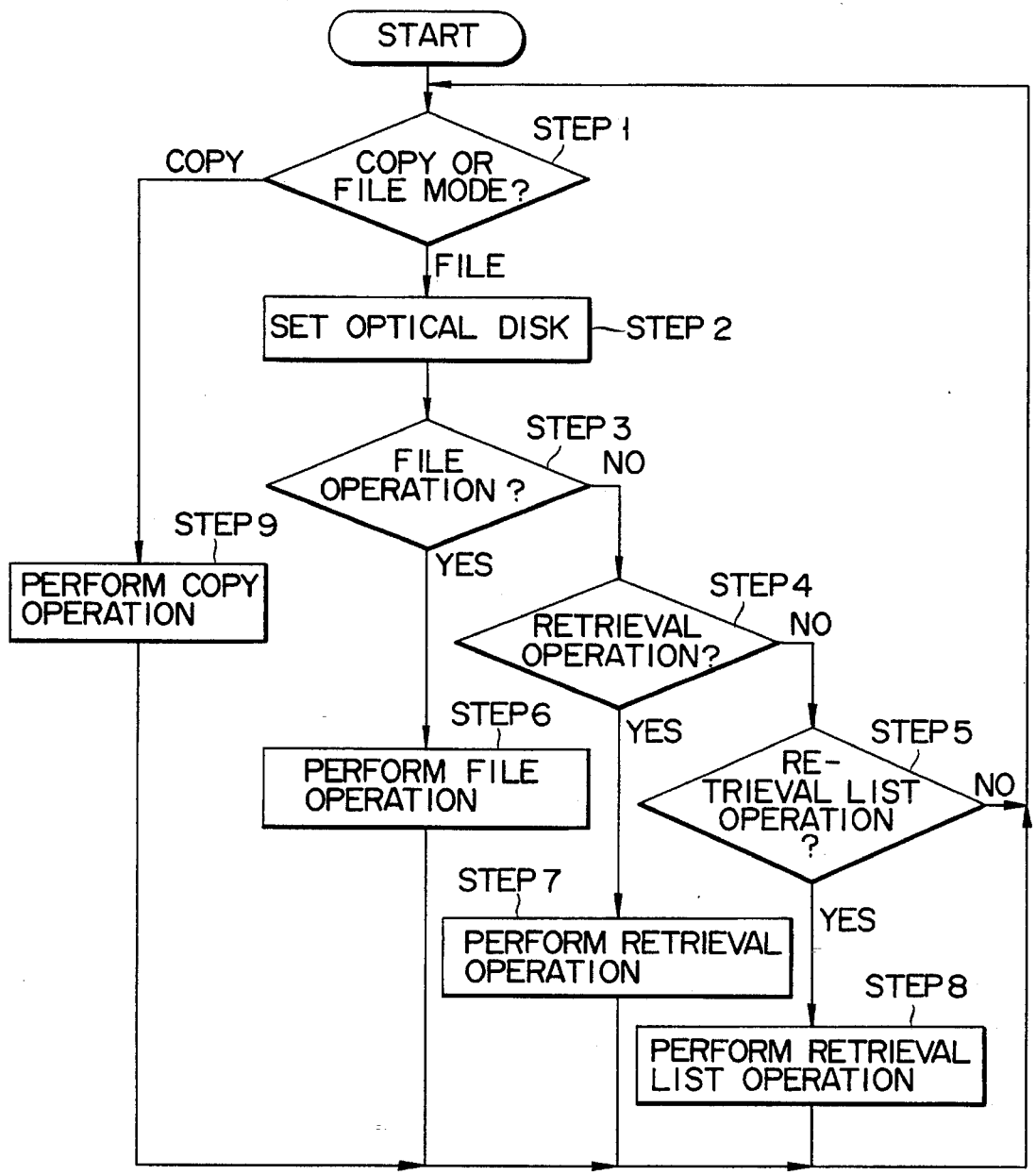
F I G. 39A

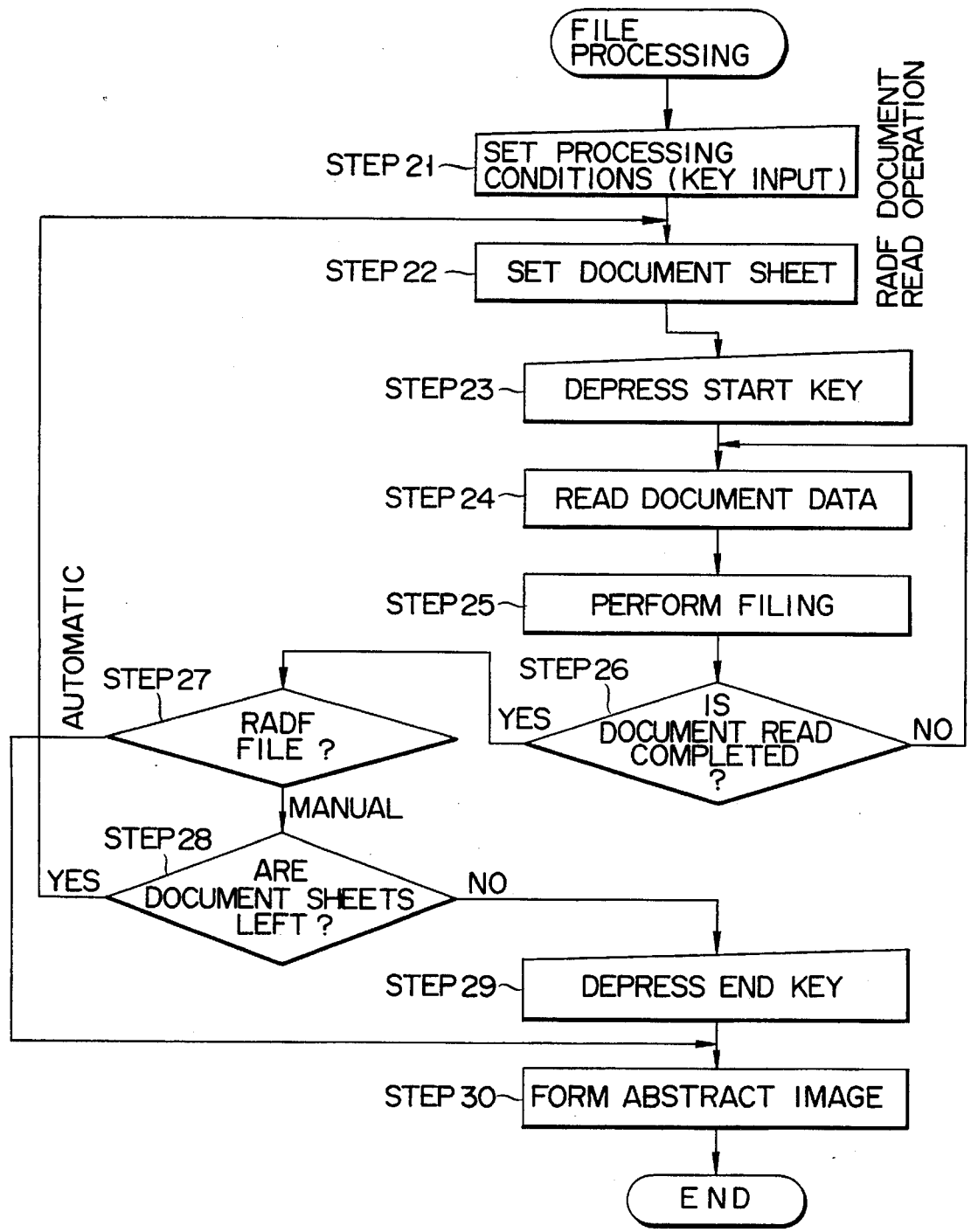
F I G. 39C

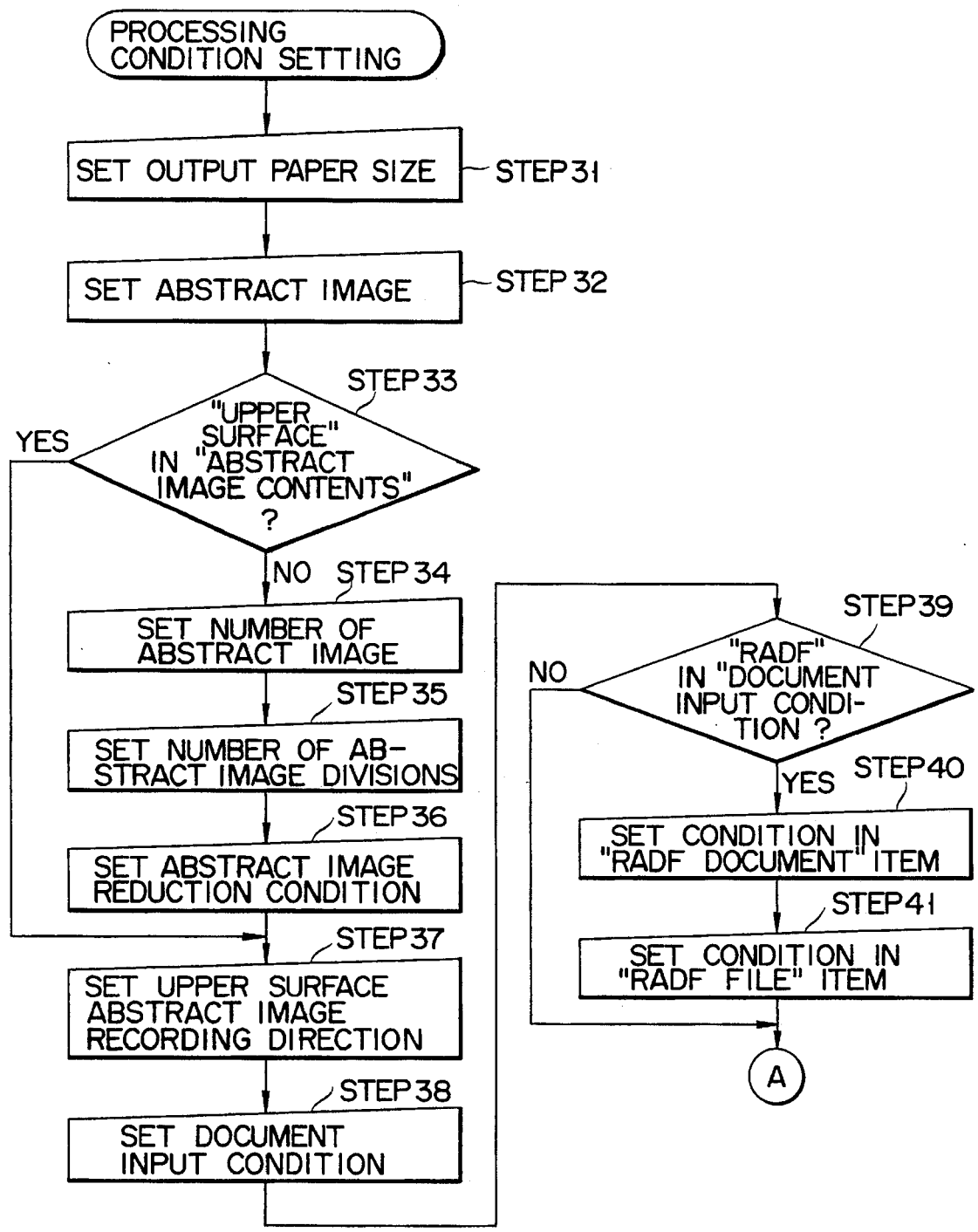
F I G. 39D

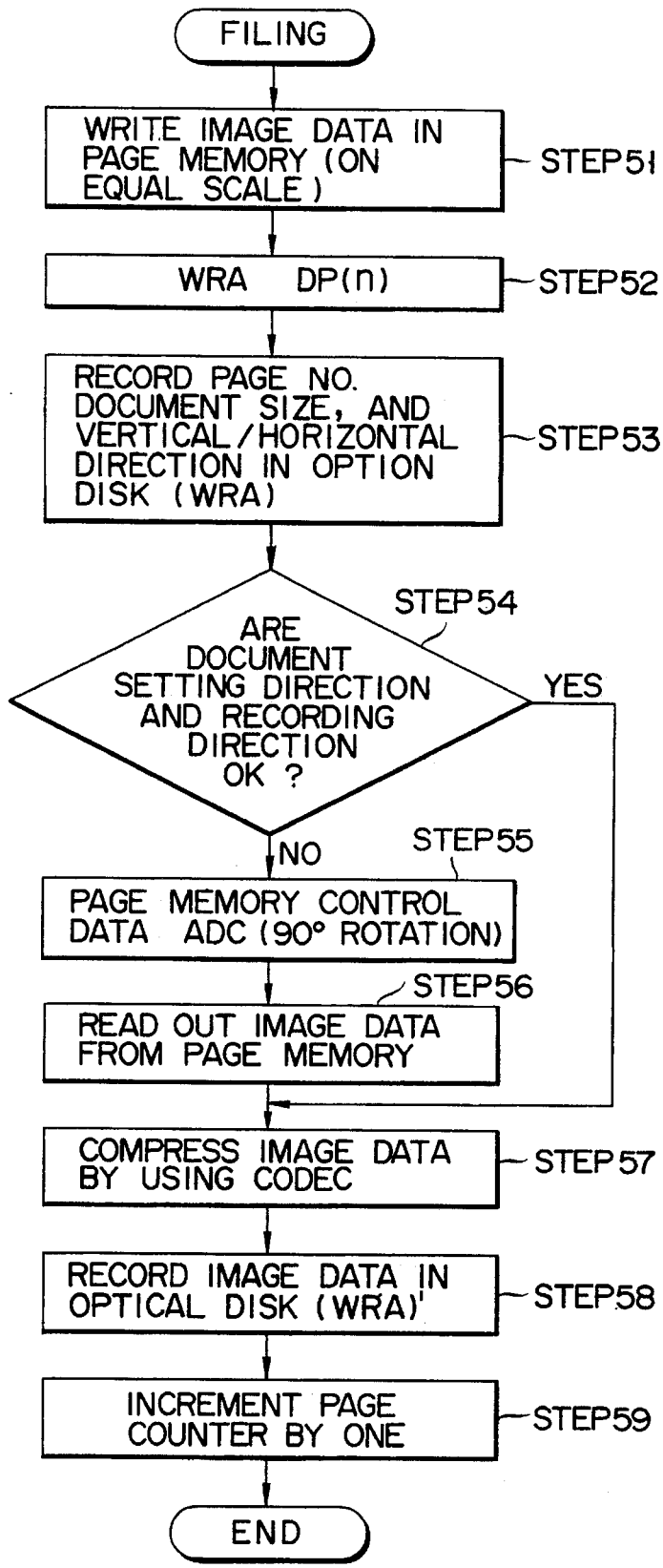
F I G. 39F

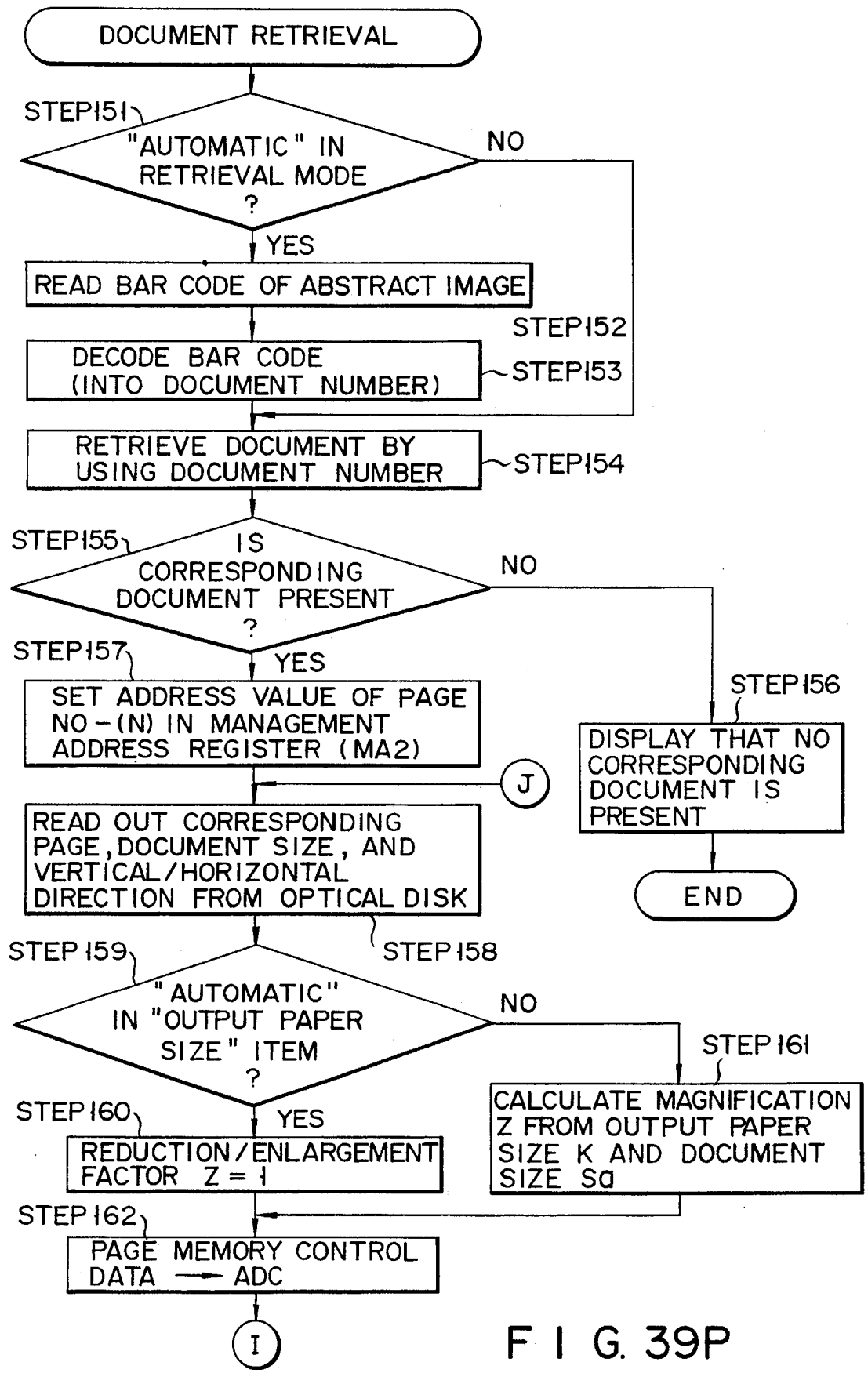
F I G. 39P

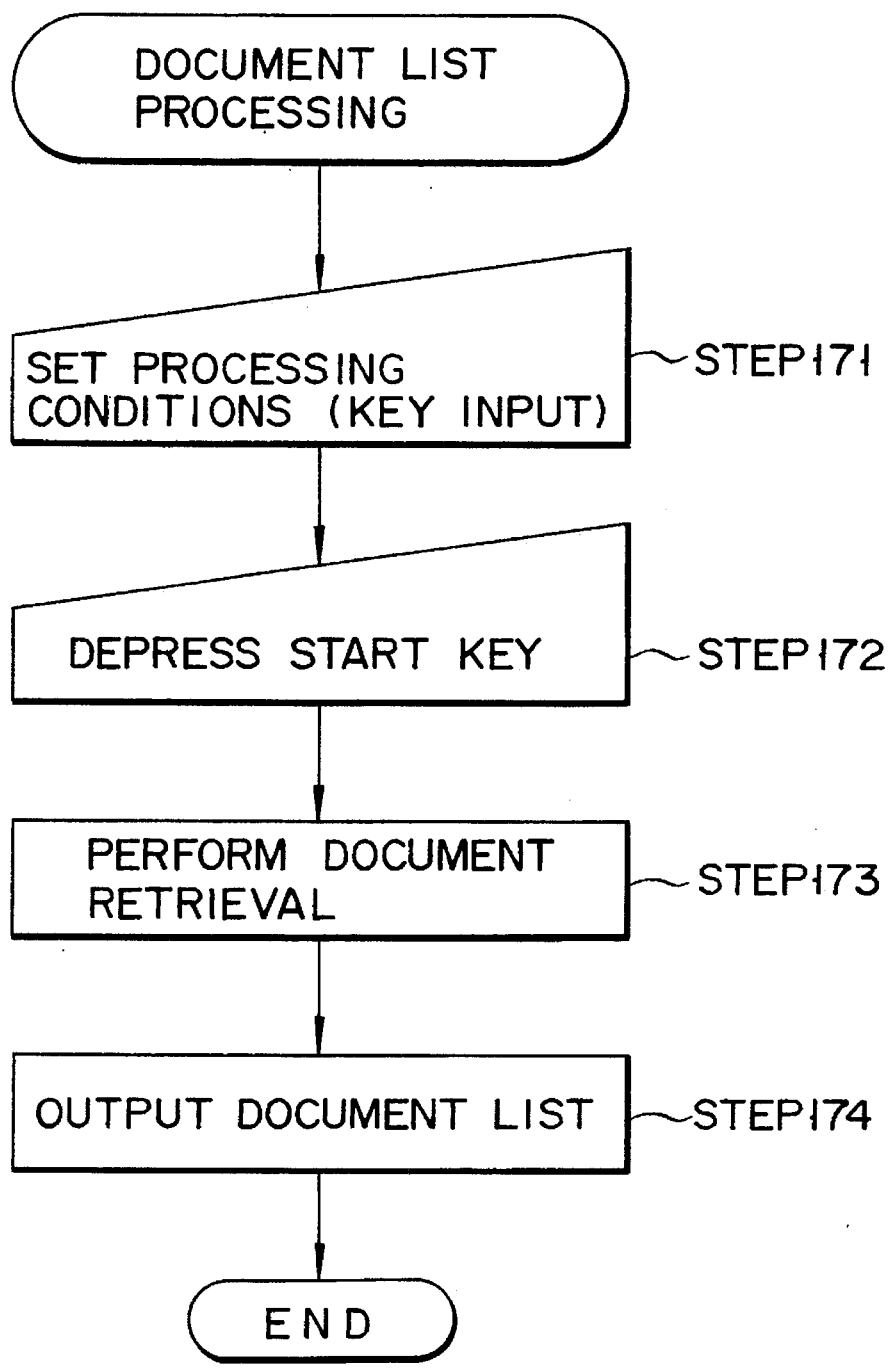
F I G. 39R dd
IMAGE FORMING APPARATUS WITH FILING FUNCTION WHICH CAN STORE IMAGE DATA AND CAN EFFICIENTLY PERFORM DOCUMENT FILING This application is a continuation, of application Ser. No. 08/182,404, filed Jan. 18, 1994 now abandoned, which is a continuation of Ser. No. 07/992,385, filed Dec. 17, 1992 now abandoned which is a continuation of application Ser. No. 07/632,339, filed Dec. 21, 1990 now U.S. Pat. No. 5,222,157.

BACKGROUND OF THE INVENTION

1. Field of the Invention

The present invention relates to an image forming apparatus with a filing function, such as a copying machine, which can store image data, e.g., document data, and can efficiently perform document filing.

2. Description of the Related Art

Generally, when a large amount of documents (images) are processed in an office and the like. The space for storing such documents is increasingly lacking. For this reason, a filing system such as a document filing apparatus using optical disks or the like has been developed. In such a filing system, sophisticated retrieved or registration processing, based on a sophisticated document editing or permanent filing system, can be performed by a high-performance display unit. However, the cost of such a filing system is very high. In addition, since such a system has various functions and requires complicated operations, document registration and retrieval take much time.

The drawbacks of the above-mentioned apparatus, therefore, are that registration or retrieval of images cannot be simply and easily performed, and the apparatus for doing so is expensive.

SUMMARY OF THE INVENTION

It is an object of the present invention to provide an inexpensive image forming apparatus with a filing function, which allows the simple, easy registration and retrieval of images.

The present invention, is an image forming apparatus with a filing function, comprising:

means for reading first image data;

means for storing the first image data read by the reading means;

means for generating retrieval data for retrieving the first image data stored in the storing means;

means for causing the storing means to store the retrieval data generated by the generating means;

means for outputting second image data obtained by adding the retrieval data, generated by the generating means, to the first image data read by the reading means;

means for extracting the retrieval data from the second image data by causing the reading means to read the second image data output from the outputting means; and means for retrieving the first image data stored in the storing means by collating the retrieval data extracted by the extracting means with the retrieval data stored in the storing means.

According to the present invention, an image forming apparatus with a filing function:

means for reading a plurality of image data; by said reading means in a memory medium;

means for forming abstract image by editing the plurality of image data read by said reading means; and means for printing the abstract image formed by the forming means onto a recording medium.

According to the present invention, an image forming apparatus with a filing function comprises:

means for reading image data;

means for storing the image data read by said reading means in an optical storage medium;

means for generating retrieval data for retrieving the image data stored in the optical storage medium by said storing means;

means for forming an abstract image by editing a plurality of image data read by said reading means and the retrieval data generated by said generating means;

means for printing the abstract image formed by the forming means on a recording medium;

means for extracting the retrieval data from the abstract image by reading the abstract image on the recording medium by said reading means; and means for retrieving the image data corresponding to the retrieval data from the optical storage medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5A is a block diagram showing a schematic arrangement of an editing processing section in FIG. 4;

FIG. 6 is a view showing a structure of a page memory in FIG. 1;

FIGS. 7 and 8 are views for explaining an address generating operation of an address controller in FIG. 6;

FIGS. 11 to 13 are views showing condition settings displayed on a condition display panel in FIG. 10;

FIG. 14 is a view for explaining the storage contents of a main memory in FIG. 1;

FIG. 15 is a view showing an arrangement of a data table ROM in FIG. 14;

FIG. 16 is a view showing an arrangement of a working RAM in FIG. 14.

FIGS. 20A to 20E are views respectively showing formats management data and of document data in the optical disk of FIG. 1;

FIGS. 23A, 23B, 23C, 24A, 24B, and 24C are views respectively showing examples of page division of the lower surface of the abstract image in FIG. 22B;

FIGS. 26A to 26E, FIGS. 27A to 27F, FIGS. 28A to 28C, FIGS. 29A and 29B, FIGS. 30A to 30D, FIGS. 31A to 31D, FIGS. 32A and 32B, and FIGS. 33A and 33B are views showing output examples of the abstract image shown in FIGS. 22A and 22B;

FIGS. 34A, 34B, 35A, and 35B are views showing detailed arrangements of document list outputs obtained when a document list output mode shown in FIG. 13 is selected;

FIGS. 36A to 36E, FIGS. 37A to 37E, and FIGS. 38A to 38C are views showing detailed arrangements of retrieval document outputs obtained when a retrieval output mode shown in FIG. 12 is selected;

FIG. 39A is a flow chart for explaining an operation of a basic function of the copying machine in FIG. 1;

FIGS. 39B and 39C are flow charts for explaining a filing operation shown in FIG. 39A;

FIGS. 39D and 39E are flow charts for explaining a processing condition setting operation in FIGS. 39B and 39C;

FIG. 39F is a flow chart for explaining a filing operation in FIG. 39C;

FIGS. 39G to 39L are flow charts for explaining a formation of an abstract image in FIGS. 39B and 39C;

FIGS. 39N and 39O are flow charts for explaining a processing condition setting operation in FIG. 39M;

FIGS. 39P and 39Q are flow charts for explaining document retrieval processing in FIG. 39M;

FIG. 39R is a flow chart for explaining document list processing in FIG. 39A;

DETAILED DESCRIPTION OF THE PREFERRED EMBODIMENTS

Figure 1:
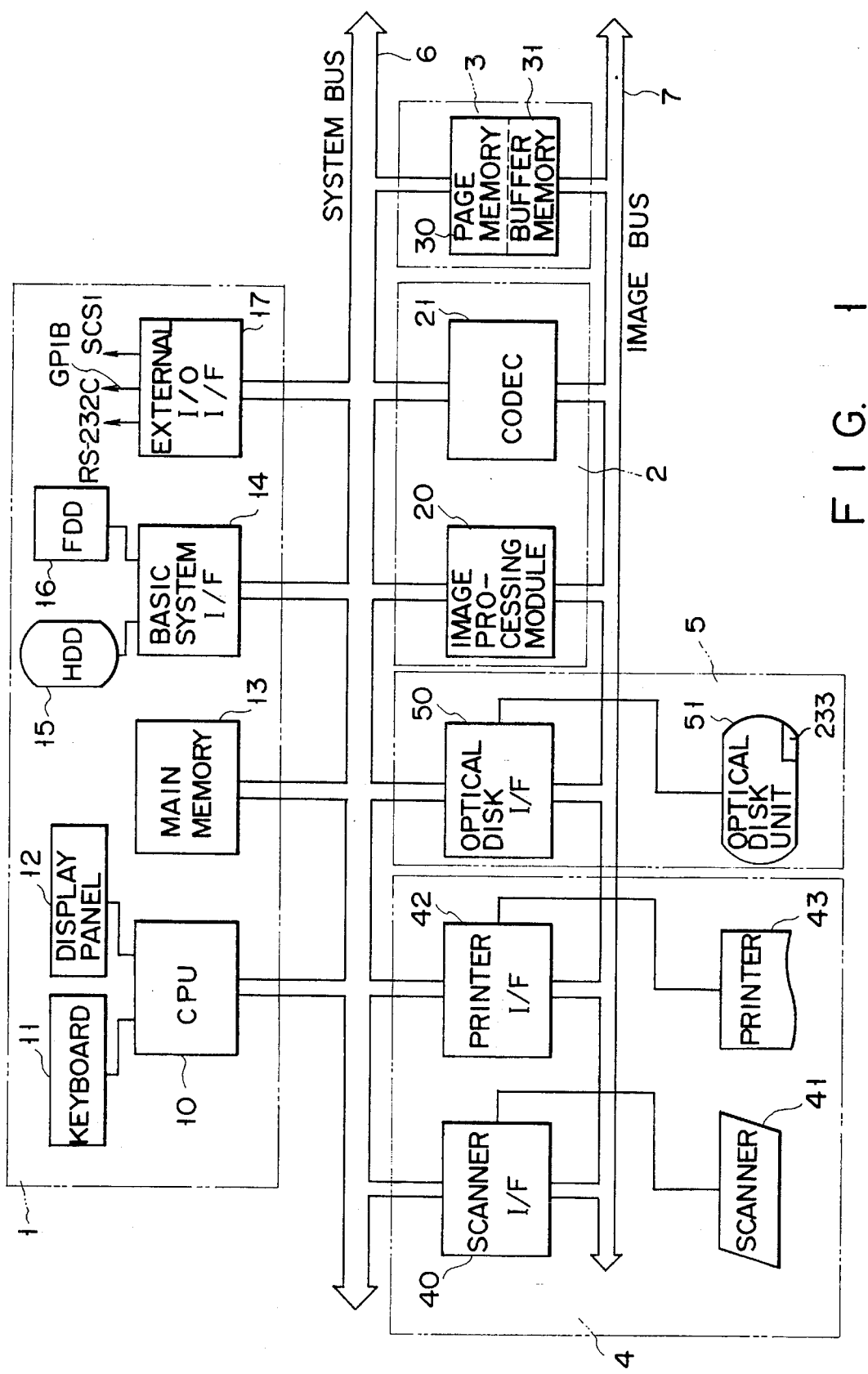
FIG. 1 is a block diagram showing a schematic arrangement of a copying machine of the present invention.

FIG. 1 shows a schematic arrangement of a copying machine as an image forming apparatus with a filing function according to an embodiment of the present invention.

Figure 2:
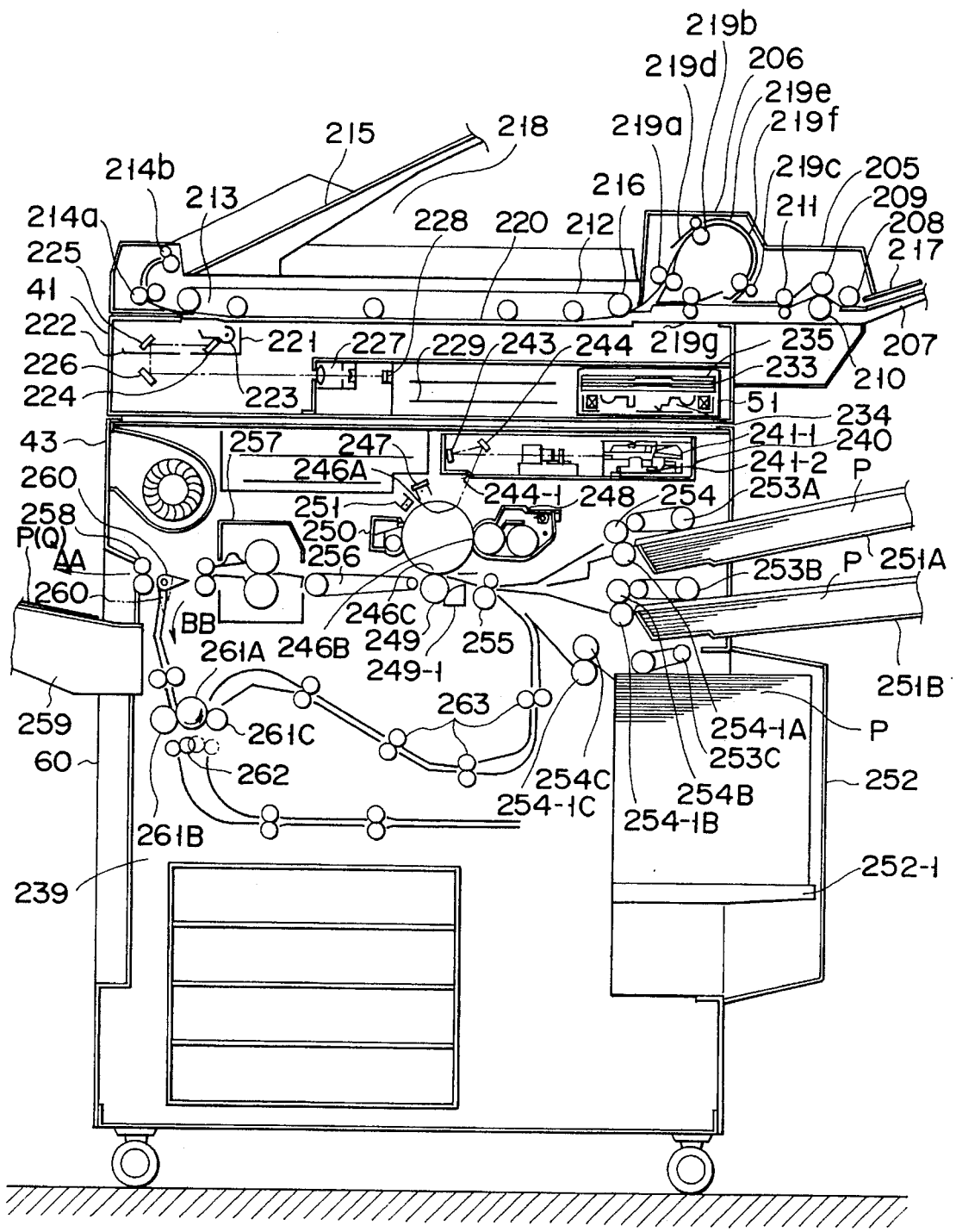
FIG. 2 is a schematic view showing the internal structures of a scanner, printer, and optical disk unit of the copying machine in FIG. 1.

As shown in FIG. 1, the copying machine comprises a basic system section 1, an image processing section 2, a memory section 3, an I/O section 4, an image storage section 5, a system bus 6, and an image bus 7. In this copying machine, the basic system section 1, the image processing section 2, the memory section 3, the I/O section 4, the image storage section 5, the system bus 6, and the image bus 7 are integrally arranged in a main body 60 of the copying machine, as shown in FIG. 2.

The basic system section 1 shown in FIG. 1 comprises a CPU (central processing unit) 10 for performing various control operations, a keyboard 11 for outputting data, a display section 12 for displaying various states, a main memory 13 as a program storage area, a magnetic disk unit 15 as a storage unit for various data, a basic system interface 14 for interfacing a floppy disk unit 16, and an external I/O interface 17 for allowing connection with external units.

The image processing section 2 comprises an image processing module (to be described later) 20 for performing various image processing operations, and a compression/expansion circuit (CODEC) 21 for performing compression/expansion of image data.

The memory section 3 is constituted by a page memory 30 having a recording capacity corresponding to several A3 pages, and a buffer memory 31 as a temporary storage area for image data.

The I/O section 4 comprises a scanner 41 as a document reader for optically reading document data and converting it into a time-serial electrical signal, a printer 43 as an image output section for printing out image data, a scanner interface 40 for connecting the above-mentioned components to the system, and a printer interface 42.

The image storage section 5 is constituted by an optical disk unit 51 for storing various data in an optical disk (not shown), and an optical disk interface 50 for connecting the unit 51 to the system.

The system bus 6 serves as a control bus for the overall system and controls the basic system section 1, the image processing section 2, the memory section 3, the I/O section 4, and the image storage section 5. The image bus 7 serves as a bus exclusively used for image data and allows high-speed transfer of image data of the image processing section 2, the memory section 3, the I/O section 4, and the image storage section 5.

FIG. 2 is a schematic view showing internal structures of the scanner 41, the printer 43, and the optical disk unit 51 of the copying machine shown in FIG. 1.

The scanner 41 comprises a return auto document feeder (RADF) 206 and an exposure section 229 constituted by a first carriage 224, a second carriage 222, a focusing lens 227, and a CCD (charge coupled device) sensor 228.

Referring to FIG. 2, a document sheet is placed facing down on a document glass 220. The front left side of the document glass 220 in the transverse direction serves as a center reference for positioning the document sheet. The document sheet is urged against the document glass 200 by a conveyor belt 212 of a convey unit section 218 of the return auto document feeder (RADF) 206. The document sheet is illuminated by a fluorescent lamp 223, and the reflected light is focused on a surface of the CCD 228 having a plurality of light-receiving elements arranged in a row through mirrors 224, 225, and 226 and the focusing lens 227.

The first carriage 1 including the mirror 24, light amount sensor (not shown) for detecting the light amount of the fluorescent lamp 223, and a heater for keeping the temperature of the fluorescent lamp 223 constant, and the second carriage 222 including the mirrors 225 and 226 are moved at a relative speed of 2:1. The first and second carriages 221 and 222 are moved from the left to the right to perform sub-scanning by means of a pulse motor (not shown) in synchronism with a read timing signal from the scanner interface 40. The speed of sub-scanning is switched in accordance with a read magnification by driving a two-phase pulse motor using a ½-phase excitation micro step driving method. A pulse motor driver (not shown) is designed to output a current waveform for canceling the natural oscillation of the drive system especially in a low-speed range to the pulse motor.

An image of the document sheet placed on the document glass 220 is sequentially read in units of lines in the above-described manner. An 8-bit digital signal representing the density of the image is output to the scanner interface 40.

The upper and lower surfaces of a document sheet are read by the return auto document feeder (RADF) 206 in the following manner. When a document detection switch 217 detects that a document sheet is placed on a document feed table 207, an RADF mode is set. Document sheets are picked up by a pickup roller 208 from the uppermost document sheet, and are separated and conveyed one by one by a feed roller 209 and a separation roller 210 which are rotated in opposite directions. The conveyed document sheet is aligned by aligning rollers 211 and is conveyed to the convey unit section 218.

The document sheet is further conveyed by the conveyor belt 212 until it is brought into contact with a document stopper 213, i.e., to a read reference position. After a read operation is performed at this position in the above-described manner, the conveyor belt 212 is rotated in the reverse direction to return the document sheet to a reverse gate 216 of a paper feed unit 205. At this time, the reverse gate 216 is pivoted to a position to convey the document sheet to reverse rollers 219a. The document sheet is then reversed and conveyed to aligning rollers 219g by reverse rollers 219a, 219b, and 219c through reverse guides 219d, 219e, and 219f.

After the document sheet is aligned, it is supplied to the convey unit section 218 by the aligning rollers 219g and is conveyed to the read reference position by the conveyor belt 212. When a read operation of the lower surface is completed, the document sheet is conveyed by the conveyor belt 212 until it reaches discharge rollers 214a. The document sheet is then discharged by the discharge rollers 214a and discharge rollers 214b and is stacked on a document discharge tray 215. The upper and lower surfaces of document sheets can be continuously read by repeating the above-described operation.

The optical disk unit 51 comprises an optical disk 233, an optical disk drive motor 234, a read head (not shown) and an optical disk drive control section 235.

Image data is stored in the following manner. Image data read by the scanner 41 is temporarily stored in the page memory 30. The image data is then compressed by the compression/expansion circuit 21 of the image processing section 2 through the image bus 7 and is output to the optical disk unit 51 through the optical disk interface 50. The compressed image data is recorded, by a head (not shown) controlled by the optical disk drive control section 235, as bit data on the optical disk 233 rotated/controlled by the optical disk drive motor 234.

When image data is to be read out, data recorded at a specific position on the optical disk 233 is read out by the head in accordance with control data (retrieval data identified from an abstract image). The image data is then expanded by the compression/expansion circuit 21 of the image processing section 2 through the image bus 7 and is temporarily stored in the page memory 30. The image data recorded in the page memory 30 is subjected to predetermined processing in the image processing module 30 and is output to the printer 43 through the image bus 7 and the printer interface 42.

The printer 43 is constituted by an image forming section 239 employing a combination of a laser optical system 240 and an electrophotographic scheme capable of forming images on the upper and lower surfaces of a transfer paper sheet (paper sheet) P.

The image data transferred from the page memory 30 through the image bus 7 and the printer interface 42 is synchronized by an image data processing circuit (not shown) and is output from a semiconductor laser oscillator (not shown) as a laser beam 245.

The output laser beam 245 is shaped by a beam shaping optical system (not shown) constituted by, e.g., a cylindrical lens. The beam 245 is then deflected by a polygonal rotating mirror 241-1 rotated by a high-speed rotating motor 241-2 using an air bearing. The laser beam 245 is reflected by mirrors 243 and 244 through an f-θ lens 242 and is focused at an exposure position 246A on a photosensitive drum 246 as a spot having a necessary resolution and is scanned/exposed to form a latent image on the photosensitive drum 246. The deflected laser beam 245 is detected by a beam detector (not shown) constituted by a photodiode to be synchronized.

The following components are arranged around the photosensitive drum 246: a charger 247 for charging the surface of the photosensitive drum 246, a developing unit 248, a transfer roller 249, a cleaner 250, and a discharge lamp 251.

The photosensitive drum 246 is rotated by a drive motor (not shown) at a peripheral velocity V0. The photosensitive drum surface is charged by the charger 247 having a grid electrode and arranged to oppose the drum surface. After the latent image is formed by spot-focusing the laser beam 245 at the exposure position 246A on the charged photosensitive drum 246, the drum 26 is rotated to a developing position 246B at the velocity V0. At this position, the latent image on the photosensitive drum 246 is developed as a toner image by the developing unit 248. The photosensitive drum 246 having the toner image formed thereon is continuously rotated at the velocity V0. At a transfer position 246C, the toner image is transferred onto the transfer paper sheet P, which is fed by a paper feed system at a predetermined timing, by using the transfer roller 249. An unnecessary toner attached to the transfer roller 249 is removed by a transfer roller cleaner 249-1.

The paper feed system comprises a means for selectively feeding the transfer paper sheet P as an image formation medium from two cassettes 251A and 251B and from a large-capacity feeder 252, and a reverse paper feed section for feeding the transfer paper sheet P again so as to form an image on the second surface (lower surface) of the transfer paper sheet P after the transfer paper sheet P having an image formed on its first surface (upper surface) is reversed.

Feeding of the transfer paper sheet P in the two cassettes 251A and 251B and in the large-capacity feeder 252 is selectively started by, e.g., a pickup roller 253A (253B or 253C), and only one transfer paper sheet P is separated and fed by a feed roller 254A (254B or 254C) and a separation roller 254-1A (254-1B or 254-1C). The transfer paper sheet P is then conveyed to register rollers 255 and is supplied to the transfer section at a predetermined timing. An elevator 252-1 of the large-capacity feeder 252 is vertically moved in accordance with the number of the transfer paper sheets P in such a manner that the level of the transfer paper sheet P at the position of the paper feed section is kept substantially constant.

On the downstream side of the transfer roller 249, the following components are arranged: a paper convey mechanism 256, a fixing unit 257, a path switching guide 260 for switching paper paths to discharge the image-formed transfer paper sheet P outside the apparatus or to guide it to the reverse paper feed section, and paper discharge rollers 258. The path switching guide 260 changes the path along which the transfer paper sheet P is conveyed from the fixing unit 257 in directions AA and BB in FIG. 2. For example, when the path switching guide 260 is set in a state shown in FIG. 2, the transfer paper sheet P advances along the path AA and is discharged onto a discharge tray 259 through the paper discharge rollers 258.

The formation of images on the first and second surfaces (upper and lower surfaces) of the transfer paper sheet P will be described in detail below. After a toner image corresponding to image data, e.g., cover data of an abstract image is transferred onto the first surface (upper surface) of the transfer paper sheet P by the transfer roller 249 through the above-described image formation process, the transfer paper sheet P is conveyed to the fixing unit 257 by the paper convey mechanism 256, and the toner image is fixed to the transfer paper sheet P. The path switching guide 260 is pivoted counterclockwise (indicated by a dotted line). As a result, the transfer paper sheet P which passes through the fixing unit 257 is conveyed to the path BB.

The transfer paper sheet P passes between reverse rollers 261A and 261B and is conveyed to reverse grip rollers 262. When the trailing end of the transfer paper sheet P passes through the reverse rollers 261A and 261B, the grip rollers 262 stop rotating and pivot clockwise while clamping the transfer paper sheet P (indicated by dotted lines) and are rotated in the reverse direction. The transfer paper sheet P is conveyed to a position between the reverse rollers 261A and 261B. The transfer paper sheet P then passes through convey rollers 263 and reaches the register rollers 255 to be fed to the transfer position 246C at a predetermined timing.

At this time, a toner image corresponding to image data, e.g., lower surface data of the abstract image, is formed on the second surface (lower surface) of the transfer paper sheet P. The transfer paper sheet P is then conveyed to the fixing unit 257 by the paper convey mechanism 256. As a result, the toner image is fixed onto the second surface (lower surface) of the transfer paper sheet P. The path switching guide 260 is pivoted clockwise (indicated by FIG. 2) so that the transfer paper sheet P advances along the path AA and is discharged onto the discharge tray 259 by the discharge rollers 258.

Figure 3:
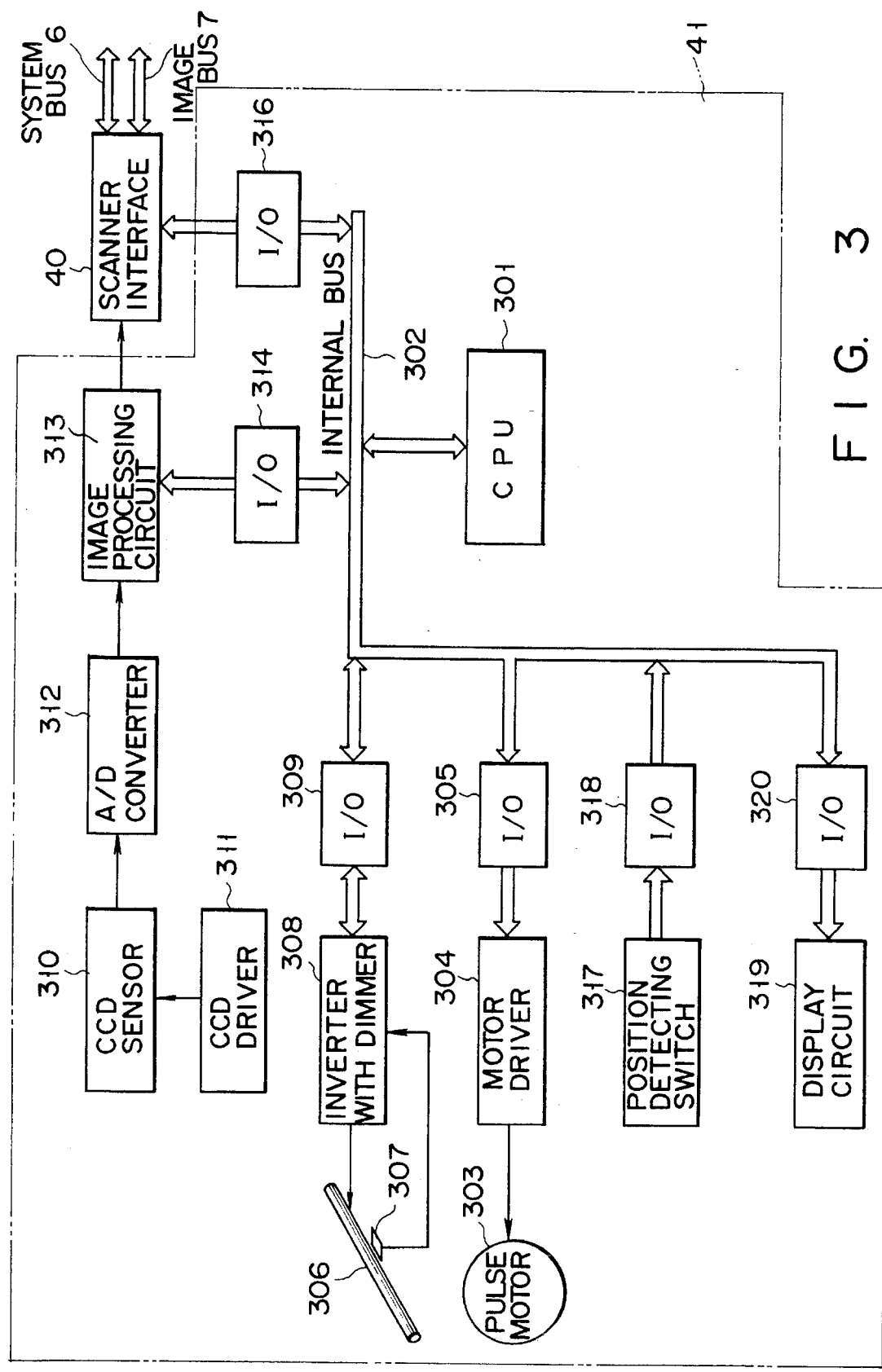
FIG. 3 is a block diagram showing a schematic arrangement of the scanner in FIG. 1.

FIG. 3 is a block diagram showing a schematic arrangement of the scanner 41 in FIG. 1. More specifically, a CPU 301 controls the overall operation of the scanner 41. An internal bus 302 is connected to the CPU 301. A motor driver 304 is connected to the CPU 301 through the internal bus 302 and an I/O interface 305. A pulse motor 303 for read scanning is driven/controlled by the motor driver 304.

An inverter 308 with a dimmer is connected to the internal bus 302 through an I/O interface 309. The brightness of a fluorescent lamp 306 is controlled by the inverter 308 on the basis of a signal from a dimming sensor 307. In addition, an image processing circuit 313 and the scanner interface 40 are connected to the internal bus 302 through I/O interfaces 314 and 316, respectively.

A CCD sensor 310 as a photoelectric converter is controlled by a CCD driver 311. The CCD sensor 310 is designed such that light reflected by a document surface upon radiation by the fluorescent lamp 306 is focused on the CCD sensor 310 through, e.g., a focusing lens (not shown), and corresponding image data of the document sheet is photoelectrically converted by the CCD sensor 310. The photoelectrically converted image data is sequentially extracted in units of lines in accordance with the intensity of optical data.

An output from the CCD sensor 310, i.e., an image signal, is converted from an analog amount to a digital amount by an A/D converter 312 and is output to the scanner interface 40.

A position detecting switch 317 for detecting the position of a read/scan portion is connected to the internal bus 302 through an I/O interface 318. Furthermore, a display circuit 319 is connected to the internal bus 302 through an I/0 interface 320.

Figure 4:
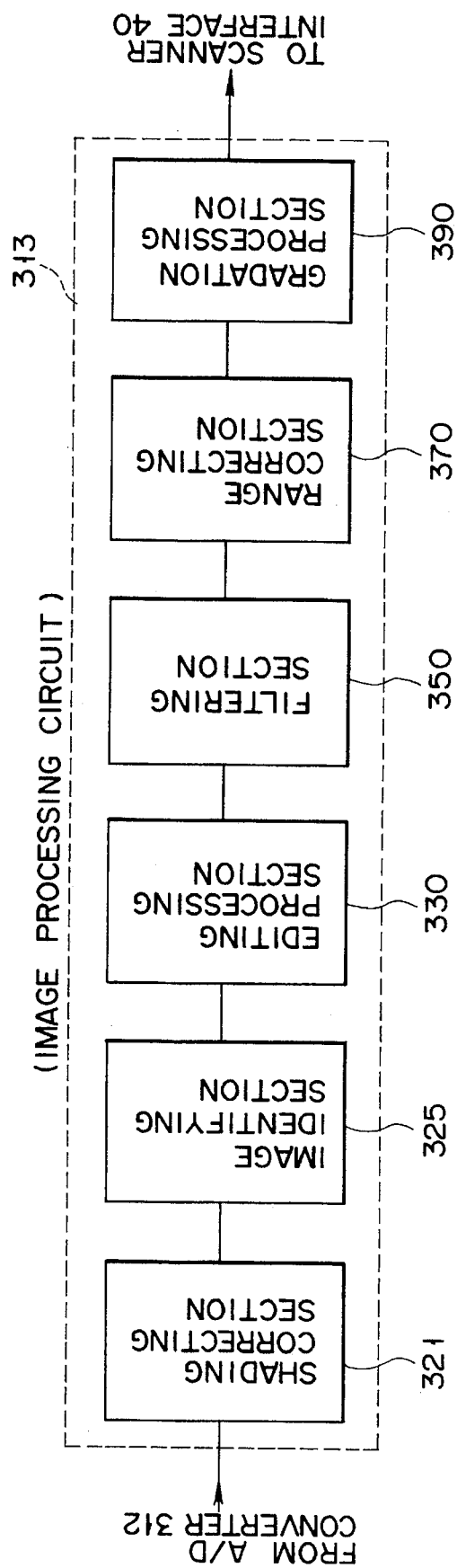
FIG. 4 is a block diagram showing a schematic arrangement of an image processing circuit in FIG. 3.

FIG. 4 is a block diagram showing a schematic arrangement of the image processing circuit 313 in FIG. 3.

The image processing circuit 313 is designed to receive image data as digital data obtained by the A/D converter 312 and perform shading correction processing of the image data in a shading correcting section 321 (FIG. 4). If the shading-corrected image data is an abstract image having identification data of an image recorded in the optical disk 233, an image identifying section 325 extracts bar code data recorded at a predetermined position of the abstract image and outputs it to the CPU 301. The CPU 301 analyzes the bar code data and outputs an image data identification code for identifying image data stored in the optical disk 233.

If the image data is an abstract image, image processing described later is not performed, and image data read by the scanner 41 is not transferred to the basic system section 1 side. If the image is not an abstract image, no bar code data is extracted by the image identifying section 325, and the image data is transferred to the basic system section 1 side in synchronism with a predetermined clock after the image data is subjected to the following processing.

The shading-corrected image data is subjected to image editing processing, e.g., enlargement/reduction, movement, trimming/masking, black-and-white inversion, and mirror image processing in accordance with a command from the CPU 301. Thereafter, this image data is subjected to gradation processing corresponding to the characteristic features of the image data and is converted into image corresponding to the output level of an output portion of, e.g., the printer 43. The image data is then output, through the printer interface 42, to an output, unit such as the printer 43 or the page memory 30, to be stored in a storage processing section such as the optical disk unit 51.

An editing processing section 330 of the image processing circuit 313 receives the image data which is output from the shading correcting section 321 in synchronism with a main scanning sync signal from the scanner 41, and executes the editing processing designated by the CPU 301.

FIG. 5A is a block diagram showing a schematic arrangement of the editing processing section 330 in FIG. 4. An editing processing control circuit 343 analyzes each editing processing command from the CPU 301 and controls the respective components in the editing processing section 330 in accordance with the editing processing command. A multiplexer 331 selectively switches output 8-bit image data in units of lines and outputs them to line buffers 332 and 333. For example, even-numbered lines are output to the line buffer 332, whereas odd-numbered lines are output to the line buffer 333.

An input address counter 336 is an up/down counter for sequentially counting up/down in synchronism with a main scanning sync signal from the scanner 41. An output address counter 337 is an up/down counter for sequentially counting up/down image data in synchronism with an output sync signal from the basic system section 1. An address switching circuit 335 selects and switches outputs from the input and output address counters 336 and 337 in units of lines. If, for example, output data is data of an even-numbered line, the address switching circuit 335 outputs an output from the input address counter 336 to the line buffer 332, and outputs an output from the output address counter 337 to the line buffer 333. In contrast to this, if the output data is data of an odd-numbered line, an output from the input address counter 336 is output to the line buffer 333, and an output from the output address counter 337 is output to the line buffer 332.

In this case, movement processing is performed in the main scanning direction by changing the initial values of the input and output address counters 336 and 337. Movement processing in the sub-scanning direction is performed by shifting the output timing of image data under the control of the CPU 301. Mirror image formation processing is performed by switching count up/down operations of the output address counter 337 when its count reaches a predetermined value within a line. Repetition processing is performed by causing the output address counter 337 to repeatedly output addresses in a predetermined range within a line.

Each of the line buffers 332 and 333 is constituted by a one-line memory for temporarily storing image data output from the shading correcting section 321. A selector 334 selectively switches image data in the line buffers 332 and 333 in units of lines (e.g., even-numbered lines are stored in the line buffer 332, and odd-numbered lines are stored in the line buffer 333) so as to output them to an enlargement processing circuit 338 and to a reduction processing circuit 339. With this arrangement, data delayed from each other by an amount corresponding to one line are output from the line buffers 332 and 333. A magnification address generator 340 calculates a magnification address corresponding to a given magnification and outputs it to the enlargement processing circuit 338 and the reduction processing circuit 339.

The magnification address generator 340 also outputs a control signal for stopping a counter up/down operation to the output address counter 337 when an enlargement magnification address reaches a specific value corresponding to the given magnification. The enlargement processing circuit 338 performs enlargement processing using linear interpolation. The reduction processing circuit 339 performs reduction processing by using a projection method. A selector 341 selects an enlargement processing result output from the enlargement processing circuit 338 when the given magnification is larger than 1. If the magnification is 1 or less, the selector 341 selects a reduction processing result output from the reduction processing circuit 339. Enlargement and reduction are performed in only the main scanning direction of an image. A change in magnification of an image in the sub-scanning direction is performed by changing the moving speed of the carriage of the scanner 41.

A masking/trimming circuit 342 has a bit plane memory corresponding to one page in which one pixel consists of two bits. The circuit 342 outputs two-bit data corresponding to pixels. Bit 1 is masking/trimming data, and bit 0 is inverse data for inversion from a negative image to a positive image. Masking/trimming processing is performed by calculating an AND of the data of bit "1" of the bit plane memory and image data. Inversion from a negative image to a positive image is performed by calculating an exclusive OR of the data of bit "0" of bit plane memory and image data. Owing to the bit plane memory, a plurality of areas with arbitrary shapes can be designated. A bit plane is written by the CPU 301 upon a predetermined operation.

A filtering section 350 in FIG. 4 receives image data output from the editing processing section 330 and performs, e.g., 3×3 filtering for it. A weighting coefficient is a variable output from the control section. Edge enhancement processing and smoothing processing are performed by changing the weighting coefficient.

A range correcting section 370 serves to correct the dynamic range of image densities. The section 370 receives maximum and minimum values at a local area which are output from a maximum/minimum value detector of a gradation processing section 390 (to be described later). This operation is repeatedly performed a number of times corresponding to several ten lines so as to detect maximum and minimum values corresponding to several tens lines. The output data is corrected to set these maximum and minimum values to be the maximum and minimum values of the output level.

The gradation processing section 390 receives image data output from the range correcting section 370 and obtains characteristic data of a maximum density difference at a local area, including a target pixel. The type of an image is discriminated on the basis of this characteristic data. If it is photographic data, pseudo-gradation processing using an error diffusion method is performed. If it is a character image, dynamic binarization is performed in accordance with the density of the local area.

Image data converted into data having the output level of the printer by the gradation processing section 390 is output to an output unit such as the printer or to the page memory to be stored in synchronism with an output sync signal from the basic system section 1.

Editing processing, filtering, range correction, and gradation processing can be selectively performed under the control of the CPU 301.

Figure 5B:
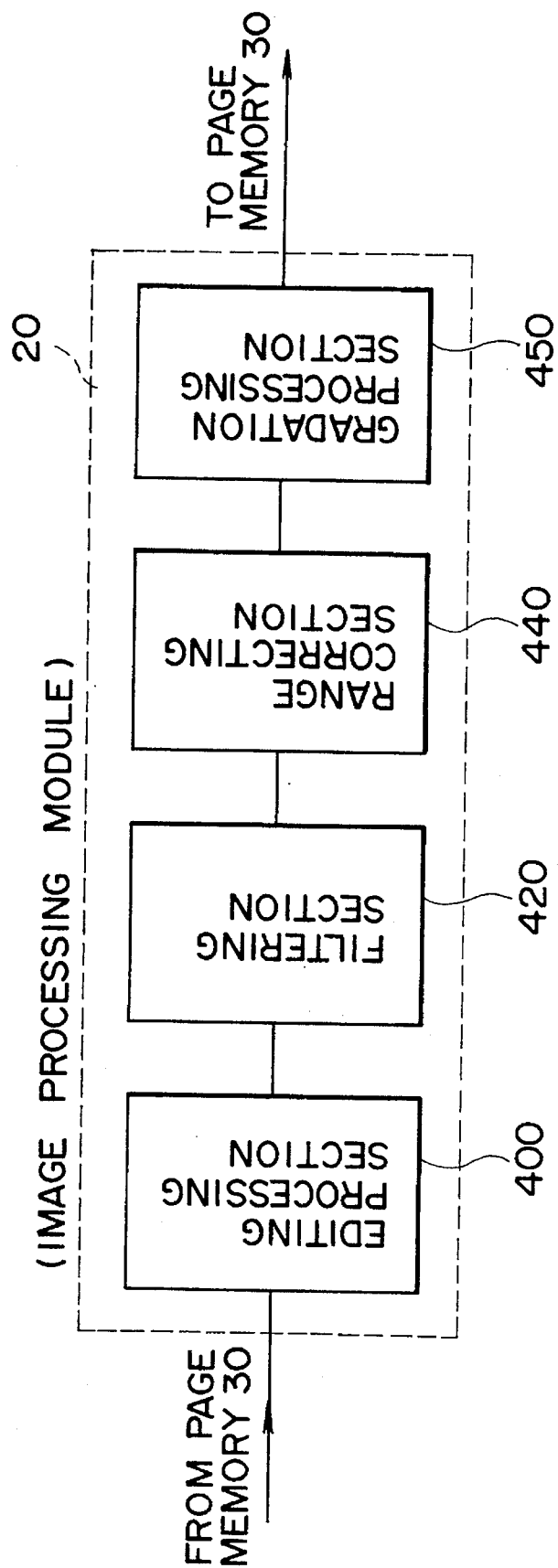
FIG. 5B is a block diagram showing a schematic arrangement of an image processing module in FIG. 1.

FIG. 5B is a block diagram showing a schematic arrangement of the image processing module 20 in FIG. 1.

When image data stored in the optical disk 233 of the optical disk unit 51 is output to an output unit such as the printer 43, the image processing module 20 is used to perform image processing of this image data. The image data from the optical disk 51 is supplied to the compression/expansion circuit 21 in units of lines through the image bus 7. A compression/expansion circuit 21 performs expansion processing in units of lines so that the extended image data is written in the page memory 30 in units of lines through the image bus 7. In this manner, one-page image data is written in the page memory 30.

The image processing module 20 receives the image data in the page memory 30 in units of lines and performs image editing processing, such as enlargement/reduction processing, trimming/masking, black-and-white inversion, or mirror image processing, in response to a command from the CPU 10. Thereafter, the image processing module 20 performs range correction and gradation processing corresponding to the characteristic features of the image represented by the image data, and converts it into image data corresponding to the output level of the printer 43 or the like. The module 20 outputs the image data to the page memory 30 in units of lines. After image processing corresponding to one page is completed, the image data is output from the page memory 30 to the printer 43 through the printer interface 42 in synchronism with a predetermined clock from the printer 43.

Since a filtering section 420, a range correcting section 440, and a gradation processing section 450 in the image processing module 20 are equivalent to the filtering section 350, the range correcting section 370, and the gradation processing section 390 in the scanner 40, respectively, a detailed description thereof will be omitted. Movement processing performed by an editing processing section 400 is also equivalent to that performed by the editing processing section 330 in the image processing circuit 313 of the scanner 40. Movement processing is performed by address control for the page memory 30 by means of address controllers 484 and 485 (to be described later) in the page memory 30. Note that whether to perform each of the four types of processing is determined under the control of the CPU 10 on the basis of a command from the basic system section 1.

The page memory 30 has a structure shown in FIG. 6. More specifically, the page memory 30 includes memories 482 and 483, each having a capacity of at least one A3 page. The address controllers 484 and 485 are respectively provided for the memories 482 and 483. These address controllers 484 and 485 can generate various addresses. For example, they can sequentially generate addresses in the X direction in synchronism with a predetermined clock, as shown in FIG. 7. Alternatively, the address controllers 484 and 485 can sequentially generate addresses in the Y direction by changing their parameters, as shown in FIG. 8. In addition, a scanning direction is not limited to the forward direction (in which addresses are increased in value) and addresses can be generated in the reverse direction (in which addresses are decreased in value).

Furthermore, the value (step) of an address increased (decreased) at every clock output can be variously set. This step includes an X-direction step (XS) and a Y-direction step (YS). XS includes an X-direction X step (XXS) and an X-direction Y step (XYS). YS includes a Y-direction X step (YXS) and a Y-direction Y step (YYS). XXS is an address value which is counted up in the x direction at every clock of a main scanning sync signal (not shown). XYS is an address value which is counted up in the Y direction at every clock of the main scanning sync signal. In addition, YXS is an address value which is counted up in the X direction at every clock of a sub-scanning sync signal (not shown). YYS is an address value which is counted up in the Y direction at every clock of the sub-scanning sync signal.

For example, as shown in FIG. 7, the address value is sequentially counted up in the X forward direction for (XXS=+1, XYS=0, YXS=0, YYS=1). For (XXS=0, XYS=1, YXS=0, YYS=+1), the address value is sequentially counted up in the Y forward direction. If negative values are set, addresses are generated in the reverse direction. In addition, decimal fractions can be set. For example, if (XXS=0.5, XYS=0, YXS=0, YYS=1) are set, the address value is counted up by one in the X forward direction at every two clocks of the main scanning sync signal. For (XXS=1, XYS=1, YXS=0, YYS=1), addresses are generated at an angle of 45°. That is, addresses can be generated at an arbitrary angle by changing the preset values of XXS and XYS.

Addresses can also be generated in the form of a rhombus by changing the preset values of YXS and YYS at the same time that the preset values of XXS and XYS are changed. A scanning width (XW) per line can be variously set in accordance with a paper size, and a start address can also be changed. Memory transfer is performed between the two memories 482 and 483 respectively using the address controllers 484 and 485 capable of generating various types of addresses as described above, thus enabling image editing such as movement, rotation, changes in vertical and horizontal positions, enlargement/reduction, repetition, mirror image processing, and shading.

The two memories 482 and 483 in the page memory 30 can be accessed through both the image bus 7 and the system bus 6. The parameters of the address controllers 484 and 485 can be accessed through only the system bus 6. The address controllers 484 and 485 can be updated by read and write signals from the image bus 7 and from the system bus 6.

Operation of the page memory 30 will be described, in which image data read by the scanner 41 is stored in the optical disk 233 of the optical disk unit 51. The image data read by the scanner 41 is fetched in the memory 482 in the page memory 30 through the scanner interface 40 and the image bus 7. The image data in the memory 482 is supplied to the compression/expansion circuit 21 in units of lines through the image bus 7. The compression/expansion circuit 21 performs compression of the image data in units of lines, and sequentially writes the compressed image data in the optical disk 233 of the optical disk unit 51 in units of lines through the image bus 7. At the same time, the image data in the memory 482 is subjected to thinning reduction processing to be reduced to ¼ and is copied in a predetermined area of the memory 483 in the page order of the document sheet.

The ¼ thinning reduction processing is performed as follows. When data is to be copied from the memory 482 to the memory 483, the address controller 484 increases the address value by one in the X direction at every clock of the main scanning sync signal, and increases the address value by one in the Y direction at every clock of the sub-scanning sync signal. In contrast to this, the address controller 485 increases the address values by one in the X direction at every four clocks of the main scanning sync signal, and increases the address value by one at every four clocks of the sub-scanning sync signal. In this manner, a reduction copy operation corresponding to a line ratio of ¼ and an area ratio of 1/16 is performed.

A control system of the printer 43 in FIG. 1 will be described with reference to a block diagram of FIG. 9.

Figure 9:
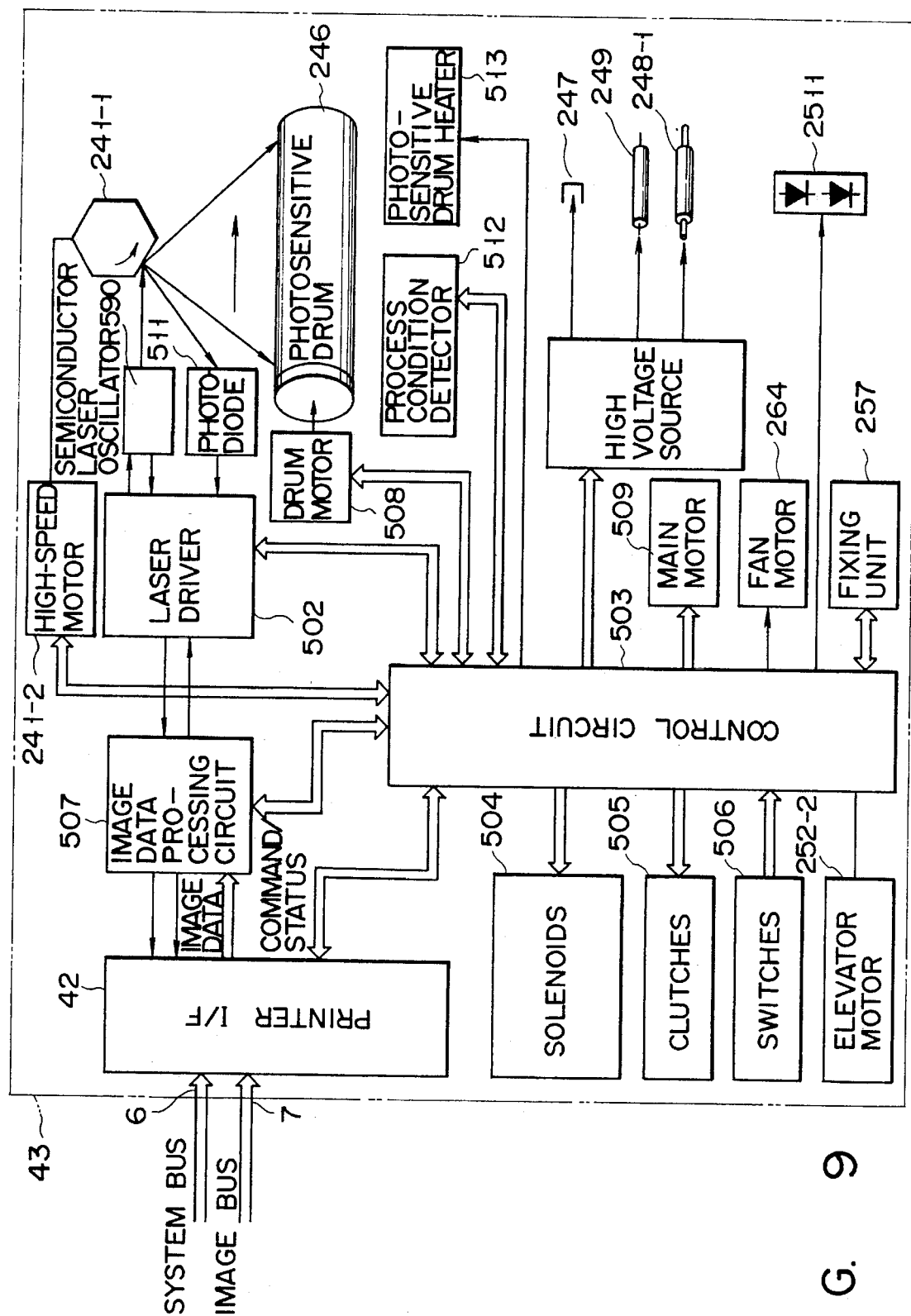
FIG. 9 is a block diagram showing a schematic arrangement of a control system of the printer in FIG. 1.

As shown in FIG. 9, the printer 43 is connected to the system bus 6 and the image bus 7 through the printer interface 42.

Data transmission/reception operations to be performed through the printer interface 42 can be roughly classified into two types of operations. In one type, transmission/ reception of control codes (command data from the system bus 6 and status data from the printer 43) is performed with the system bus 6. In the other type, transmission/reception of image data and accompanying sync signals is performed with the image bus 7.

Control codes, i.e., command data and status data, of the printer interface 42 are transmitted/received to/from a control circuit 503.

The control circuit 503 incorporates a microcomputer and performs main control operations for the printer 43. More specifically, the control circuit 503 interprets command data sent from the system bus 6 through the printer interface 42 and controls the respective components of the printer 43. In addition, the control circuit 503 outputs a status of the printer 43 to the system bus 6 through the printer interface 42 in response to a request from the system bus 6.

Control of the respective components of the printer 43 will be described in detail below by mainly referring to the control circuit 503.

(1) Gamma Characteristic Control

In an image data processing circuit 507, image data from the image bus 7 is synchronized with a sync signal from a beam detector 511 constituted by a photodiode and is converted into a laser modulation signal. The control circuit 503 can designate conversion characteristics associated with conversion from image data into a laser modulation signal with respect to the image data processing circuit 507. That is, the control circuit 503 can control the gamma characteristics of image data and of an output image (the gamma characteristics of the printer 43 are changed depending on temperatures and humidities and hence must be controlled.)

(2) Light Emission Power Control of Laser

The control circuit 503 can forcibly cause a laser driver 502 to emit a laser beam and monitors the emission power of a semiconductor laser oscillator 590, thus controlling the emission power of the laser.

(3) Motor Control

The control circuit 503 performs ON/OFF control, monitoring of the rotational frequencies, and control of the rotational frequencies with respect to a high-speed motor 241-2, a drum motor 508, a main motor 509, and a fan motor 264.

(4) High-voltage Output Control

The control circuit 503 performs high-voltage output control of the transfer charger 247, a developing roller 248-1, and the transfer roller 249, and can monitor outputs therefrom.

(5) Fixing Unit Temperature Control

The control circuit 503 monitors the temperature of a heat roller of the fixing unit 257 and controls it so as to allow a toner on a transfer paper sheet to be fixed.

(6) Process Control

The control circuit 503 causes a process condition detector 512 to detect the surface potential of the photosensitive drum 246, a toner density in the developing unit, a toner density on the photosensitive drum 246, and the temperature of the photosensitive drum 246, and performs gamma characteristic control, high-voltage output control, toner replenishment, emission power control for the laser, and control of a photosensitive drum heater 513. In addition, the control circuit 503 ON/OFF-controls a discharge lamp 2511 at a predetermined timing.

(7) Transfer Paper Sheet Path Control

The control circuit 503 performs selection of the paper feed cassettes 251A, 251B, and 251-2, controls rotation of the register rollers 255, controls the path switching guide 260, controls rotation of the reverse grip rollers 262, and controls various solenoids 504 and clutches 505 for rotation control in accordance with a print mode designated by the system bus 6 using data from switches 506.

(8) Others

The control circuit 503 controls an elevator motor 252-2 to vertically move an elevator 252-1 in accordance with the number of transfer paper sheets P in the large-capacity feeder 252.

Figure 10:
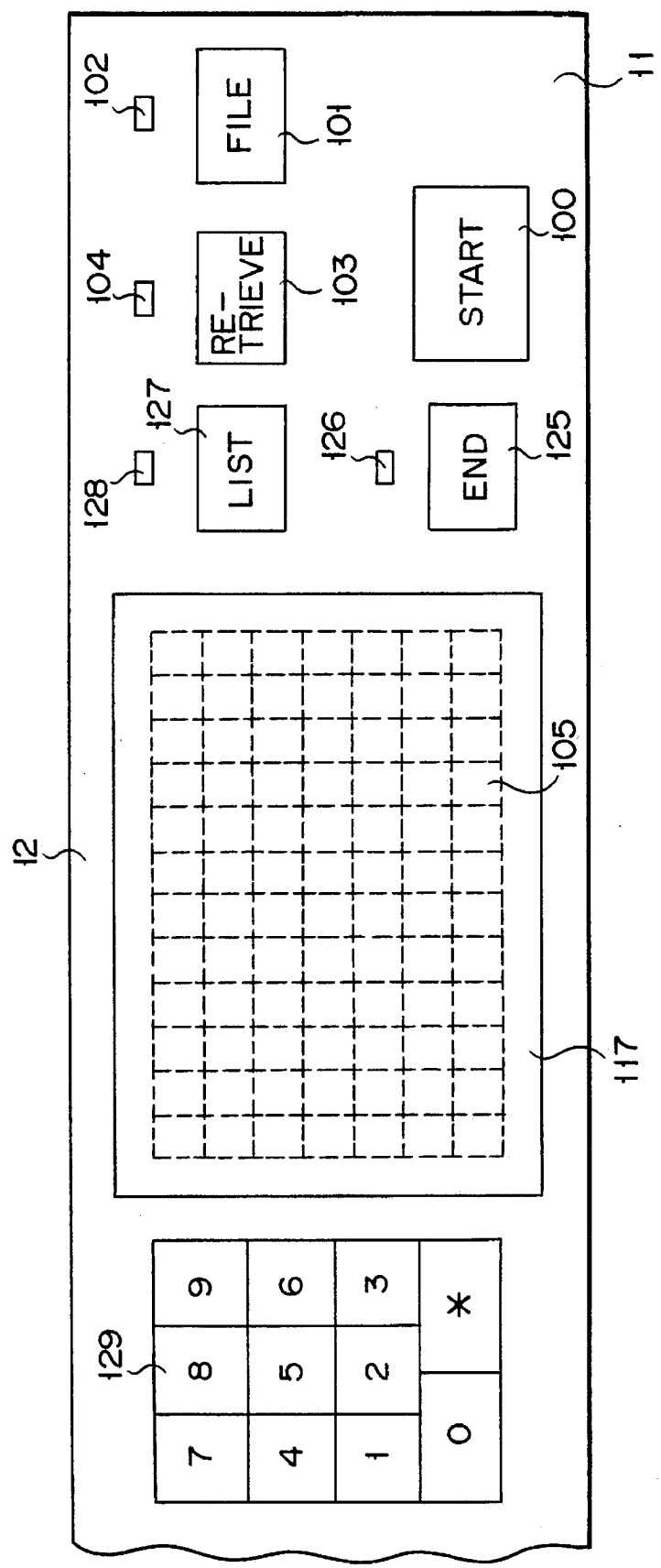
FIG. 10 is a plan view showing an arrangement of a display section in FIG. 1.

FIG. 10 shows a detailed arrangement of an operation/display section for performing operations and displaying system states, i.e., the keyboard 11 and the display section 12.

Referring to FIG. 10, the keyboard 11 comprises a start key 100 for starting a copy function and a filing function, a file key 101 for selecting a file mode/copy mode, a retrieve key 103 for selecting a retrieval mode for retrieving filed data, an end key 125 for notifying the end of document input in an "RADF" read operation, a list key 127 for outputting a retrieval list, a ten-key pad 129 for inputting various data, and a condition set ting switch panel 105 for setting conditions when the file mode or the retrieval mode is selected.

The display section 12 comprises a file lamp 102 for indicating that the file mode is selected, a retrieval lamp 104 for indicating that the retrieval mode is selected, a read end lamp 126 which is lighted at the end of a read operation of a set of document sheets on the document feed table 207, a list lamp 128 for indicating that the retrieval list output mode is selected, and a condition display panel 117 for displaying conditions set in the file mode or in the retrieval mode. The condition display panel 117 is a transmission type liquid crystal display unit, on which the condition setting switch panel 105 consisting of a transparent touch panel is mounted. The condition setting panel 105 is constituted by a plurality of switches, as indicated by dotted lines in FIG. 10. The positions of the switches coincide with the selection display positions of the condition display panel 117.

FIG. 11 shows condition settings on the condition display panel 117, in detail, upon selection of the file mode.

Referring to FIG. 11, the condition display panel 117 is constituted by an item selecting section 118 for selecting a setting item, and a condition setting section 119 for setting detailed conditions of the selected item. The switches of the condition setting panel 105 are arranged in correspondence with the positions of display portions 106a to 115a and 146a to 148a for indicating that the conditions in the item selecting section 118 can be set and of display portions 120 to 124 for indicating set conditions in the condition setting section 119.

Operation of the condition display panel 117 will be briefly described below. When the file key 101 is depressed, the conditions shown in FIG. 11 are displayed on the condition display panel 117. The conditions displayed at this time are those set in a previous file operation. The set conditions are indicated by black dots on the respective items in the condition setting section 119.

If the set conditions need not be changed, a file operation is performed under the displayed conditions by depressing the start key 100. If the displayed conditions are to be changed, the display portion (106a–115a, 146a–148a) of a target item, of the display portions 106a to 115a and 146a to 148a of the item selecting section, is depressed to select the target item. A new condition can be set in the target item by depressing the switch on a corresponding display portion (120 to 124) of the condition setting section 119. Subsequently, the condition setting switch panel 105 on a confirmation display portion 116 is depressed to complete the condition setting operation.

The condition setting items will be described in detail below. Referring to FIG. 11, item 106 is used to select the size of an abstract image sheet Q (paper sheet P) used for retrieval upon completion of a file operation. As shown in FIG. 11, five paper sizes, i.e., A5, A4, A3, B5, and B4 can be selected. When the power source is turned on and the optical disk 233 is set size, A4 is automatically selected.

An item 107 is used to select abstract image contents. As shown in FIG. 11, the abstract image contents include three modes: an "upper surface/abstract image" mode for outputting both an upper surface on which retrieval codes (bar codes and the like) and the data of the first document sheet are printed, and the contents of an abstract image portion (normally printed on a lower surface), in which reduced copies of the second and subsequent document sheets are printed; an "upper surface" mode for outputting only an upper surface; and an "abstract image" mode for outputting reduced copies of all the document sheets. When the power source is turned on and the optical disk 233 is set (to be referred to as default), "upper surface/abstract image" is automatically set. The "automatic" mode is selected as a default setting.

An item 108 is valid only when either of "upper surface/ abstract image" and "abstract image" is selected in selection of abstract image contents. Upon selection of one of these modes, the item 108 is used to designate the number of abstract image sheets. As shown in FIG. 11, two types of modes, i.e., "unlimited" and "one" are arranged. When "unlimited" is selected, all the document contents are output in the form of an abstract image. Therefore, if the document includes a large number of pages, and the contents of the abstract image cannot be printed on one paper sheet P, the abstract image is output by using a plurality of paper sheets P. In contrast to this, if "one" is selected, an abstract image is printed on one paper sheet P regardless of the number of document sheets. Therefore, if the document contents cannot be printed within one paper sheet P, contents of the document which are to be output by using the second and subsequent paper sheets P are omitted. The "unlimited" mode is automatically selected as a default setting.

An item 109 is used to select the number of divisions of an abstract image portion to be normally printed on the lower surface of the abstract image sheet Q. Reduced copies of document sheets are printed on an abstract image portion. In this case, the number of divisions indicates the number of document sheets which can be printed on one paper sheet Q. Four types of modes, i.e., "automatic", "4", "9", and "16" can be selected.

In the "automatic" mode, the number of divisions is automatically determined in accordance with the number of document sheets. Modes "4" to "16" allow an operator to arbitrarily select the number of divisions. The "automatic" mode is selected as a default setting.

Item 110 is used to select the recording direction of document sheets on the upper surface and abstract image portion of the abstract image sheet Q. More specifically, item 110 designates whether document sheets are "vertically elongated" or "horizontally elongated" on the upper surface and abstract image portion of the abstract image sheet Q. The default setting is "vertically elongated".

An item 111 is used to select a "same size" mode and a "proportional" mode. In the "same size" mode, when document sheets having a plurality of sizes are to be printed as an abstract image, all the document sheets are reduced to the same reduction size. In the "proportional" mode, the reduction sizes are proportional to the sizes of the document sheets. The default setting is "same size".

An item 112 is used to select one of document input methods: a method of inputting a document by means of the return auto document feeder 106; and a method of manually inputting a document. The default setting is "RADF".

Items 113 and 114 are used to designate detailed conditions when "RADF" is selected in the document input condition item. When "RADF" is selected, the item 113 is used to select either a "single side" mode (single-side read) for inputting only single-side data of a document sheet or a "double side" mode (double-side read) for inputting double-side data of a document sheet. The default setting is "one side".

The item 114 is used to select file operation conditions upon completion of a read operation of document sheets set on the document feed table 207 when "RADF" is selected as in the item 113. The file conditions include two types of modes, "manual" and "automatic" modes. In the "manual mode", after a read operation of document sheets set on the document feed table 207 is completed, the operation is temporarily stopped. In this case, if an input operation of all the document sheets of a document is completed, the "end" key 125 in FIG. 10 is depressed to output the abstract image sheet Q. If document sheets to be continuously input are still left, the remaining document sheets are set on the document feed table 207 to perform document input. When the document input of the document is completed in the above-described manner, the "end" key 125 is depressed. In the "automatic" mode, the abstract image sheet Q is automatically output upon completion of a read operation of document sheets set on the document feed table 207. This mode is used when the number of document sheets is relatively small. The default setting is "manual".

An item 115 is used to select the setting direction of a document sheet on the document glass 220 of the scanner 41. In the "vertical" mode, the transverse direction of the document sheet corresponds to the main scanning direction of the scanner 41; and in the "horizontal" mode, to the longitudinal direction of the document sheet.

An item 146 is used to select the size of a document sheet to be read by the scanner 41. As shown in FIG. 11, five sizes are set: A5, A4, A3, B5, and B4.

An item 147 is used to select a document type. Although there are various types of documents, three document types can be selected in this case: a document "character/photograph" including both characters and photographs; a document "character" including only characters; and a document "photograph" including only photographs.

An item 148 is used to select the read density of a document sheet. In this selection, "automatic" or "manual" is selected. In the "automatic" mode, the density of a document sheet is automatically read, and the read result is fed back to a read threshold value to always perform optimal density correction. In the "manual" mode, as shown in FIG. 11, a desired density can be set by an operator in accordance with the density of a document sheet itself.

FIG. 12 shows a detailed condition settings on the condition display panel 117 upon selection of the retrieval output mode.

Referring to FIG. 12, similar to the file mode, the left side constitutes an item selecting section, and the right side constitutes a condition setting section. In addition, the display section and the switches of the condition setting switch panel 105 correspond to each other as in the file mode. Furthermore, conditions are changed in the same manner as described above.

Referring to FIG. 12, item 130 is used to select whether to perform identification of a retrieval code in the retrieval mode by using a bar code on the upper surface of the abstract image sheet Q, or by using a retrieval code (document number) input by an operator. In an "automatic" mode, a bar code (document number) on the upper surface of the abstract image sheet Q is read by the scanner 41 to automatically identify the document number, and corresponding document contents are printed out. In a "manual" mode, the operator inputs a document number (expressed as numerals) on the upper surface of the abstract image Q and a document number of a document list (to be described later) by using the ten-key pad 129, and corresponding document contents are printed out. The document number input through the ten-key pad 129 is displayed in a document number display area 135. The default setting is "automatic". An item 131 is used to select an output range of the contents of a retrieved document. The default setting is "all". Therefore, all the contents of a corresponding document are normally printed out. However, "partial" can also be selected to print out only part of the contents of a corresponding document. When this "partial" mode is selected, a page number printed on the abstract image sheet Q is designated to print out only the document contents of a corresponding page. A page number is input through the ten-key pad 129. The input page number is then is displayed in a page No. display area 136. Note that a plurality of page numbers can be input.

An item 132 is used to designate the number of copies of a document to be output. Although the default setting is "one copy", "multiple copies" can be selected to output a desired number of copies which is input through the ten-key pad 129.

An item 133 is used to select an output paper size. The default setting is "automatic". In the "automatic" mode, the paper sheet P corresponding to document size data recorded in file data in the optical disk 233 (to be described later) is automatically selected and output. A document can be output with a specific paper size by selecting a designated size.

An item 134 is used to select whether to use a single side or double sides of the paper sheet P to be output. The default setting is "one side".

A confirmation display portion 137 is used in the same manner as in the file mode.

FIG. 13 shows condition settings, in detail, on the condition display panel 117 upon selection of a document list output mode.

Referring to FIG. 13, similar to the file mode, the left side constitutes an item selecting section, and the right side constitutes a condition setting section. In addition, display section 12 and the switches of the condition setting switch panel 105 correspond to each other in the same manner as in the file mode. Furthermore, conditions are changed in the same manner as described above.

Referring to FIG. 13, item 140 is used to select contents of a document list in the optical disk 233 when they are output. The default setting is "designation". In the "designation" mode, a document list is formed on the basis of documents, of document files recorded in the optical disk 233, which fall within a range designated by a date condition (to be described later). If "all" is selected, a list of all the documents recorded in the optical disk 233 is formed and output.

An item 141 is used to input a condition when "designation" is selected in the item 140, "document list contents". When a date condition is input, a list of corresponding documents is formed. The range of a document list is determined by two dates 143 and 144. Note that year and month data are input through the ten key pad 129.

An item 142 is used to select a printing area on the upper surface of the abstract image sheet Q (the first page of a document) to be printed on a list in the item 140, "document list contents". The default setting is "total area". In this state, the total area of the upper surface of an abstract image is printed on a list. If "½", "¼", or "⅛" is selected, only upper ½, ¼, or ⅛ portion of the upper surface of the abstract image sheet Q is printed.

FIGS. 14 to 16 are views for explaining contents of the main memory 13 in the basic system section 1 in FIG. 1. FIG. 14 shows the overall arrangement. The main memory 13 comprises a program ROM 150 for storing programs for controlling the overall system, a data table ROM 151 for storing timer data and the like for control operations, and a working RAM 152 for temporarily storing control data.

FIG. 15 shows a more detailed arrangement of the data table ROM 15. The data table ROM 151 is constituted by a control data table 153 for storing fixed data required to control the overall basic system section 1, a character generator 154 for storing character patterns such as alphanumeric characters to be added to data on the abstract image sheet Q, a bar code pattern memory 155 for storing bar code patterns which are used to print a bar code as identification data on the abstract image sheet Q, an address controller 484 for forming the abstract image sheet Q in the page memory 30, a page memory control data memory 156 for outputting various address data to the address controller 484, and a disk management data memory 157 for storing address data for managing the optical disk 233.

FIG. 16 shows a detailed arrangement of the working RAM 152. The working RAM 152 is constituted by a status portion 158 for storing a control status of the overall basic system section 1, a counter 159 for performing counting operations of various data, a disk data memory 160 for storing various control data for the mounted optical disk 233, and other memories 160 for temporarily storing other data.

Figures 17, 18:
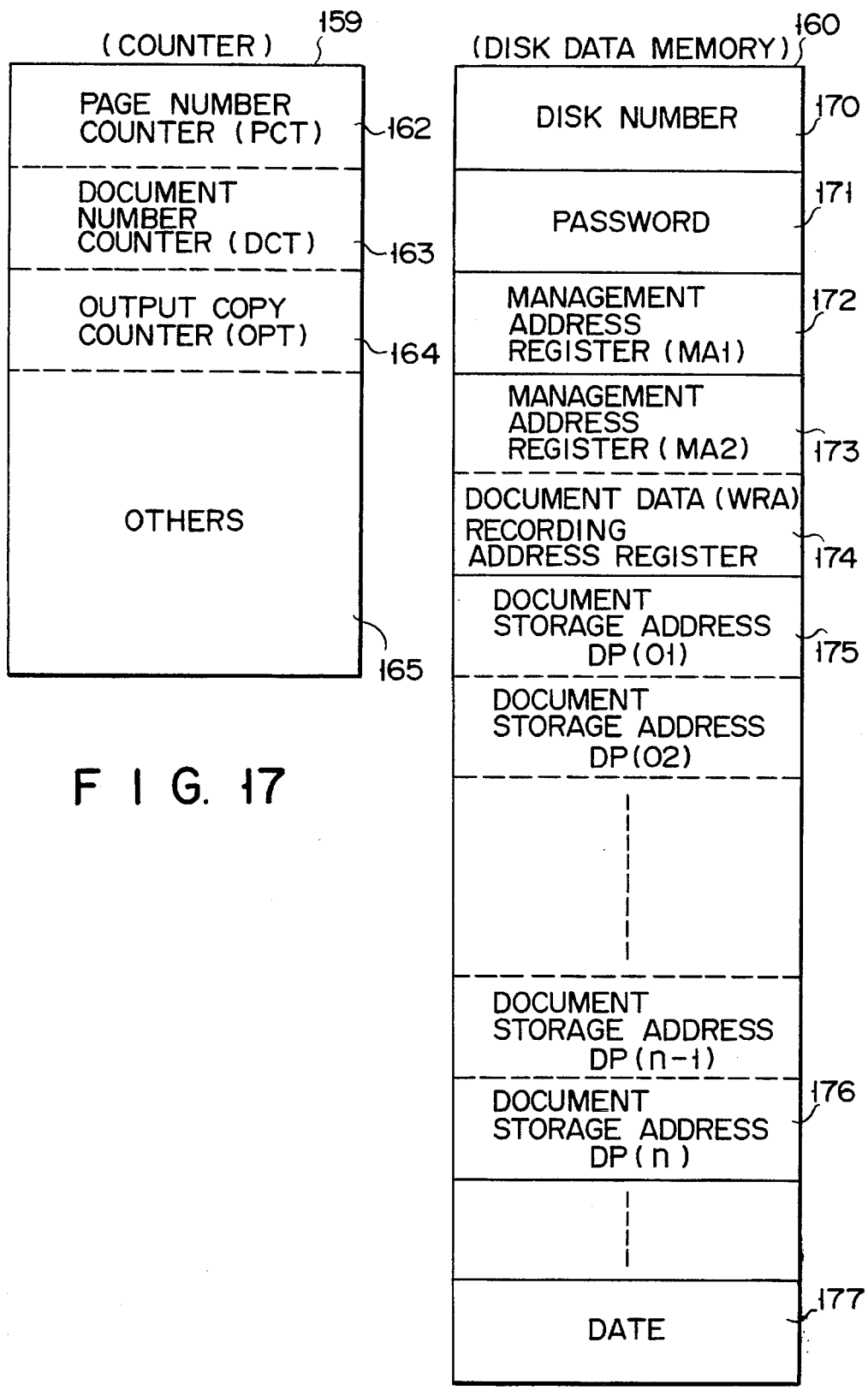
FIG. 17 is a view showing a detailed arrangement of a counter in FIG. 16.
FIG. 18 is a view showing an arrangement of a disk data memory in FIG. 16.

FIG. 17 shows the counter 159 in detail. The counter 159 comprises a page number counter 162 for counting the number of document sheets to be input, a document number counter 163 for counting the number of documents to be filed, an output copy counter 164 for counting the number of output copies of a retrieved document, and others 165.

FIG. 18 shows the disk data memory 160 in detail. The disk data memory 160 comprises a disk number portion 170 for storing a disk number as the inherent number of the loaded optical disk 233, a password portion 171 for storing a password used by the holder of the optical disk 233, two management address registers (MA1 and MA2) 172 and 173 for storing addresses used to manage document data in the mounted optical disk 233, a document data recording address register (WRA) 174 for recording document data, document storage address registers DP(01) to DP(n) 176 for temporarily storing specific addresses at which corresponding documents are recorded in the optical disk 233, and a date register 177 for storing date data by using a date timer means (not shown).

Figures 19A, 19B:
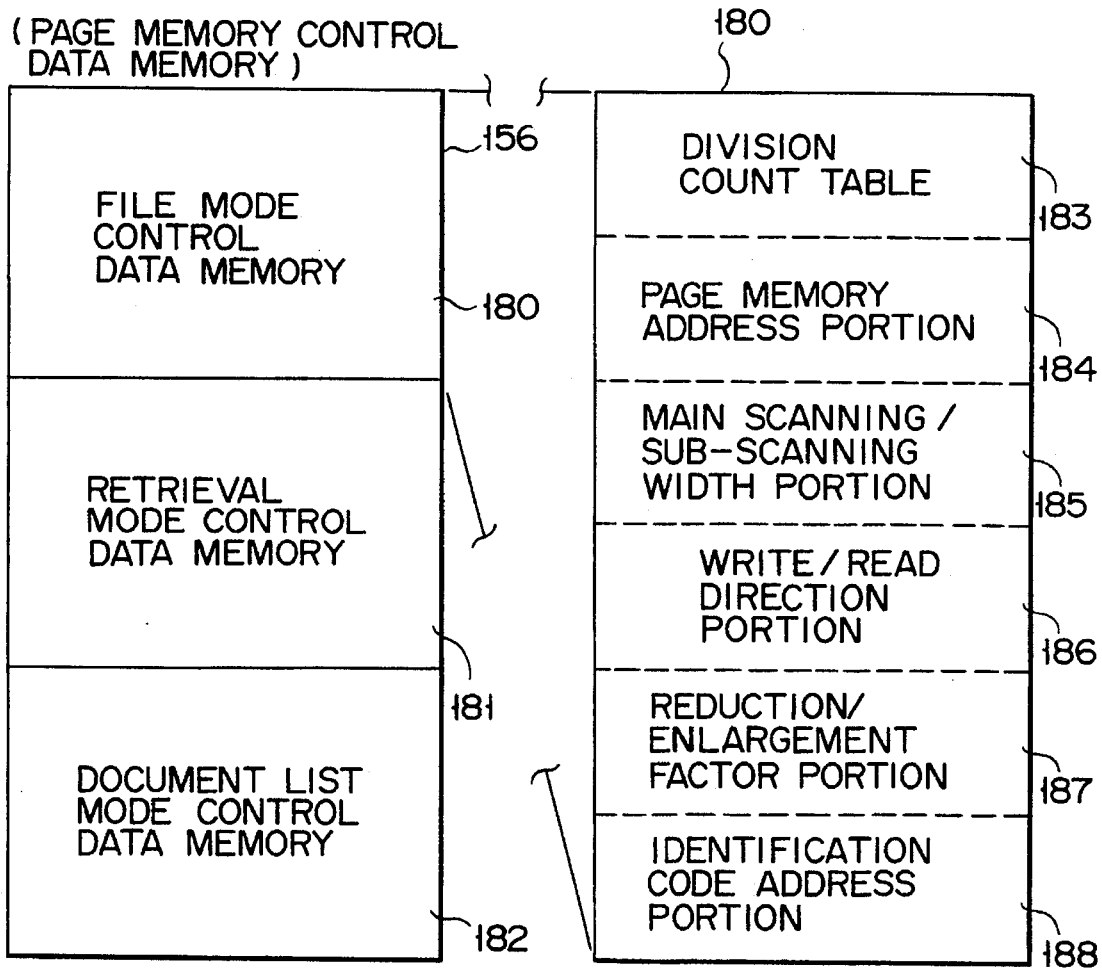
FIG. 19A is a view showing an arrangement of a page memory control data memory in FIG. 15.
FIG. 19B is a view showing an arrangement of a file mode control data memory in FIG. 19A.

FIGS. 19A and 19B show the page memory control data memory 156 in detail.

As shown in FIG. 19A, the page memory control data memory 156 comprises a file mode control data memory 180 for generating page memory control data in the file mode, a retrieval mode control data memory 181 for generating control data in the retrieval mode, and a document list control data memory 182 for generating control data in the document list mode.

FIG. 19B shows the file mode control data memory 180 in detail.

Referring to FIG. 19B, the file mode control data memory 180 comprises a division count table 183 for storing determination data for determining the number of divisions of a one-side page of the abstract image sheet Q on the basis of a document size, an output paper size, and the like in formation of the abstract image sheet Q, a page memory address portion 184 for storing an address data table used to develop document data on the page memory 30 in units of pages, a main scanning/sub-scanning width portion 185 for storing a data table of scanning widths (data widths) in the main/sub-scanning directions of document data in units of pages, a read/write direction portion 186 for storing a data table of scanning directions in write/read operations in the x and y directions on the page memory 30, a reduction/enlargement factor portion 187 for storing a magnification data table of reduction/enlargement factors for image data from the optical disk 233, and an identification code address portion 188 for storing address data and the like used to record a bar code as an additional code to be recorded when the abstract image sheet Q is output and an additional code such as a date.

FIGS. 20A to 20E show formats of management data and of document data in the optical disk 233. FIG. 20A is a view for explaining a data arrangement of the optical disk 233. The optical disk 233 is roughly divided into two areas: a file management area 700 in which management of document data is performed; and a file data area 701 in which document data is stored.

The file management area 700 will be described in detail with reference to FIG. 21B. The file management area 700 includes a disk number 702 as the inherent identification number of the optical disk 233, a password 703 to be used by the holder of the optical disk 233, a registered document management area 704 for managing each document registered in the optical disk 233, and a management address area 712 for managing the management data addresses of the respective registered documents in the registered document management area 704.

FIG. 20C shows the management address area 712 in detail. The management address area 712 includes a management address 719 representing an address at which the management data of each document in the registered document management area 704 is stored, and a document number 718 thereof. Note that this management address area can be accessed by the management address register 172 in FIG. 18.

FIG. 20D shows the registered document management area 704 in detail. Referring to FIG. 20D, in the registered document management area 704, r documents are set, and one document management area includes a document number 705 for discriminating a document, a page count 706 representing the total number of pages of a document, a document size (S) 707 representing the document size of the majority of pages of the document, a registration date 708 representing a date on which the document is registered, and a document storage address 709 representing a start address of corresponding document data stored in the file data area 701.

FIG. 20E shows the document storage address 709 in detail. The document storage address 709 includes storage address data DPA(01) 720 to DPA(N) 721 representing data storage addresses of the respective pages of a document stored in the file data area 701. Note that the registered document management area 704 can be accessed by the management address register (MA2) 173 in FIG. 18.

Figures 21A, 21B:
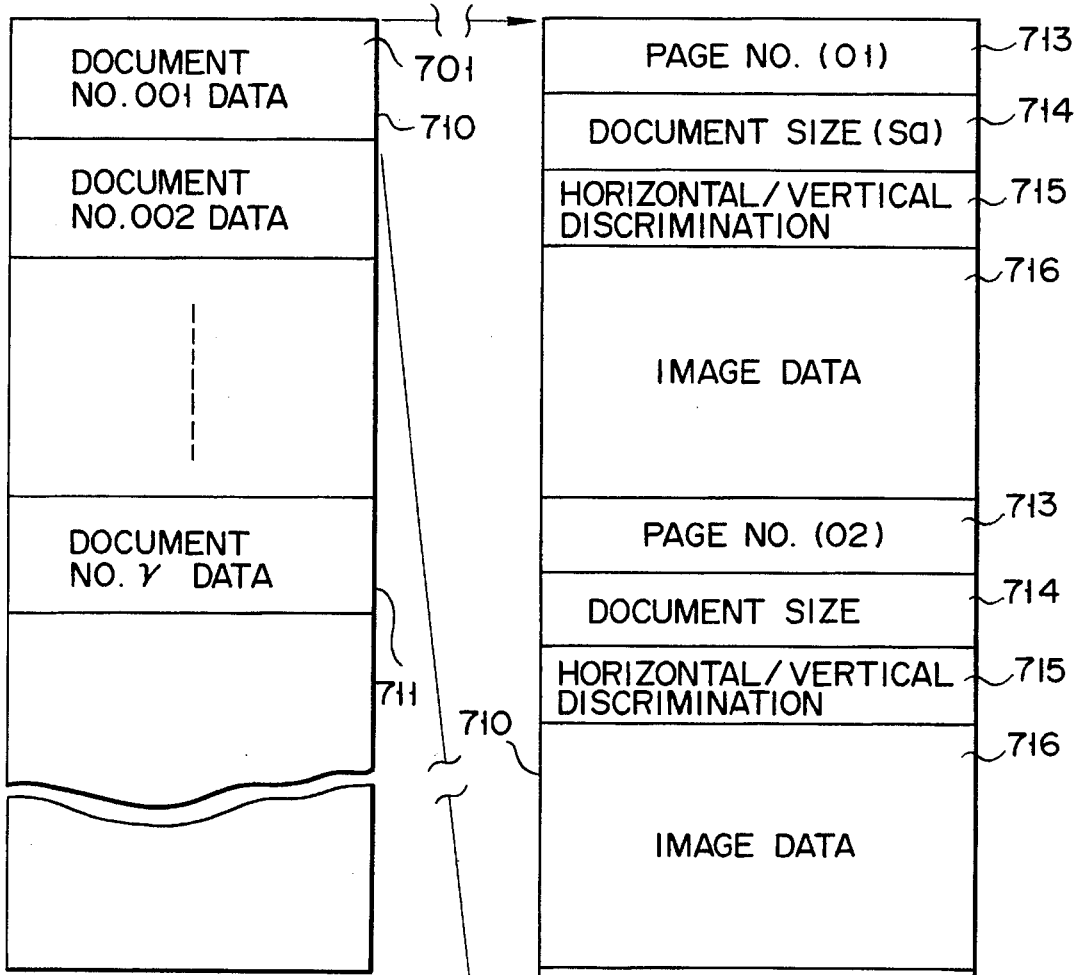
FIGS. 21A and 21B are views showing an arrangement of a file data area in FIG. 20.

FIGS. 21A and 21B show the file data area 701 in detail.

FIG. 21A shows a state of each document data recorded in the file data area 701. Referring to FIG. 21A, in the file data area 701, r documents are recorded as document data, and registered documents are recorded, starting from "document No. 001 data" 710 to "document No. r data" 711. FIG. 21B shows the "document No. 001 data" 710 in detail. Referring to FIG. 21B, one document data consists of n-page document data and is recorded, starting from a "page No. (01)" 712 to a "page No. (n)" 717.

Data corresponding to one page consists of a "page No. (01)" 713 representing the number of pages of a document, a "document size" 714 representing the size of a document sheet, a "vertical/horizontal discrimination" 715 representing the recording direction (vertically elongated/horizontally elongated) of the document, and "image data" 716 corresponding to one page and representing actual document data.

Figure 22A:
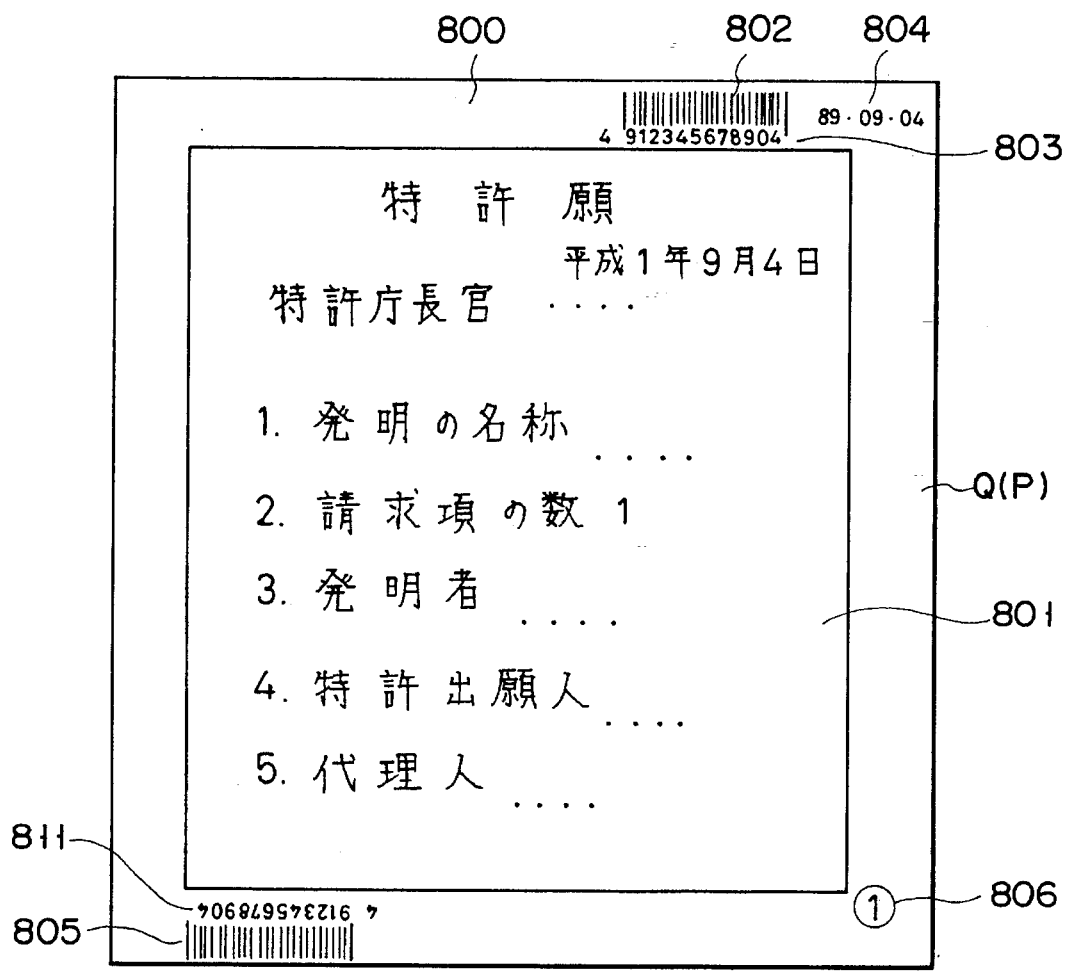
FIG. 22A is a view for explaining the contents printed on the upper surface of an abstract image output from a printer in FIG. 1.
Figure 22B:
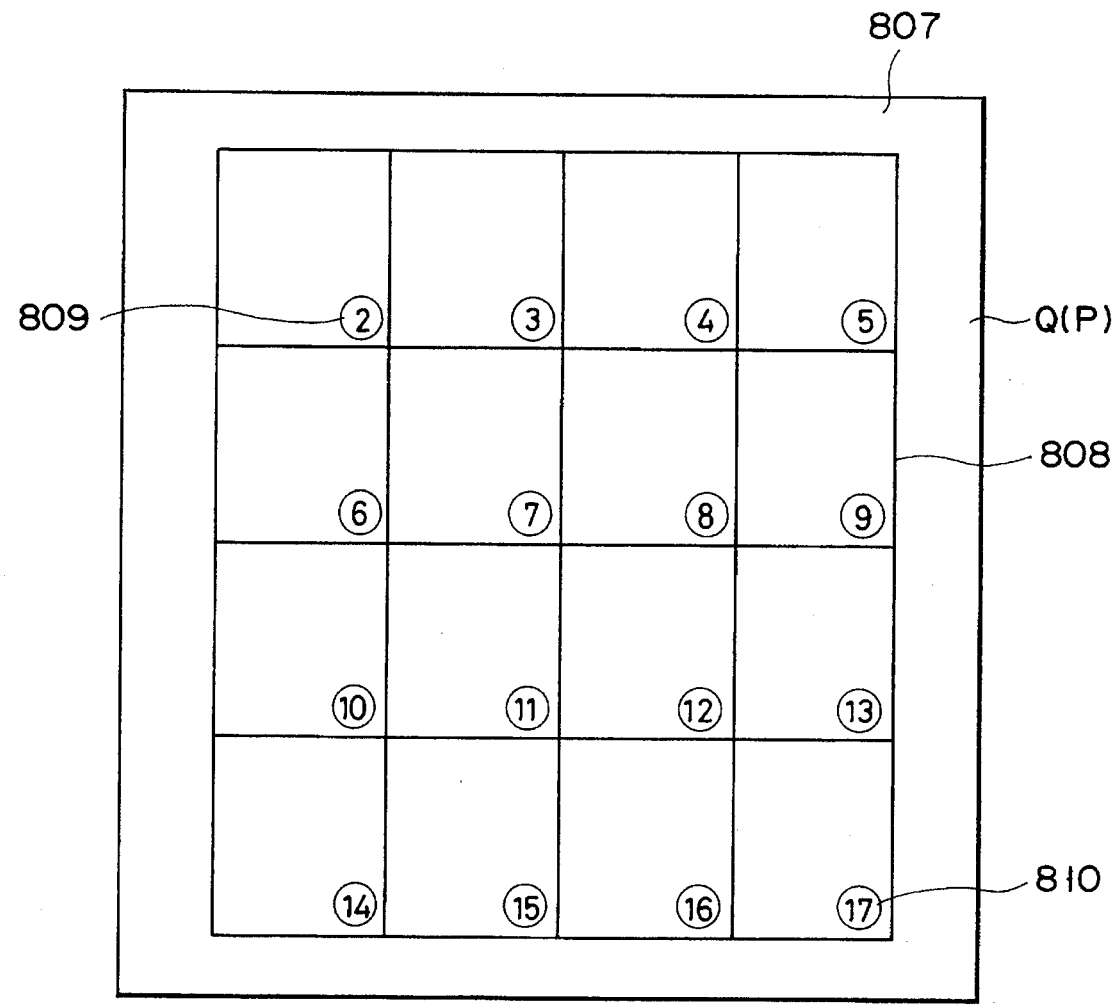
FIG. 22B is a view for explaining the contents printed on the lower surface of the abstract image output from the printer in FIG. 1.

FIGS. 22A and 22B are views for explaining the abstract image sheet Q (the paper sheet P on which an abstract image is printed) to be output from the printer 43 when registration is performed in the file mode in the apparatus of the present invention.

FIG. 22A is a view for explaining the contents of an upper surface 800 of the abstract image sheet Q. The data of the first page of one registered document is printed within an upper surface document printing area 801. In addition, the following data are printed: an identification symbol 802 expressed by a bar code scheme as retrieval data representing a document number required for a subsequent document retrieval operation; a document number 803 as a numeric expression of the identification symbol 802; a registration date 804 representing the date on which the document is registered as a file; a document page number 806 representing a page number of the document; and an identification symbol 805 and a document number 811 identical to the identification symbol 802 and the document number 803, respectively.

Note that the identification symbol 802 (805) is printed in the bar code scheme, and the identification symbol 805 is printed in a direction opposite to the identification symbol 802.

FIG. 22B is a view for explaining the contents to be printed on a lower surface 807 of the abstract image sheet Q. Document data of the pages of the document except for the first page are printed on a reduced scale in a lower surface document printing area 808 in units of pages. Page numbers 809 to 810 are, respectively, printed on the pages.

FIGS. 23A to 23C and 24A to 24C show cases wherein the number of page divisions in the lower surface document printing area 808 is changed.

FIGS. 23A to 23C show printouts obtained by changing the number of page divisions when the document is vertically elongated document. FIG. 23A shows a case of 4 divisions; FIG. 23B, a case of 9 divisions; and FIG. 23C, a case of 16 divisions. These division counts are determined by division count designation by means of the condition display panel 117.

Figure 24A:
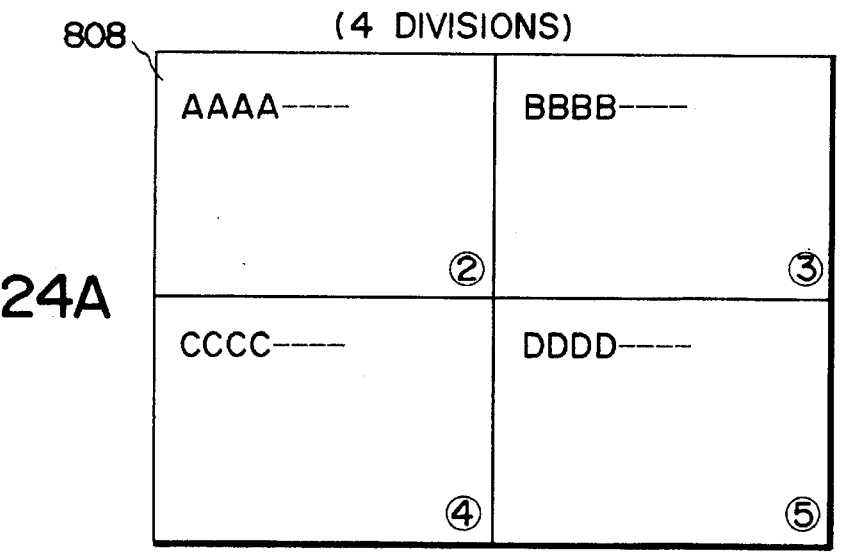
Figure 24B:
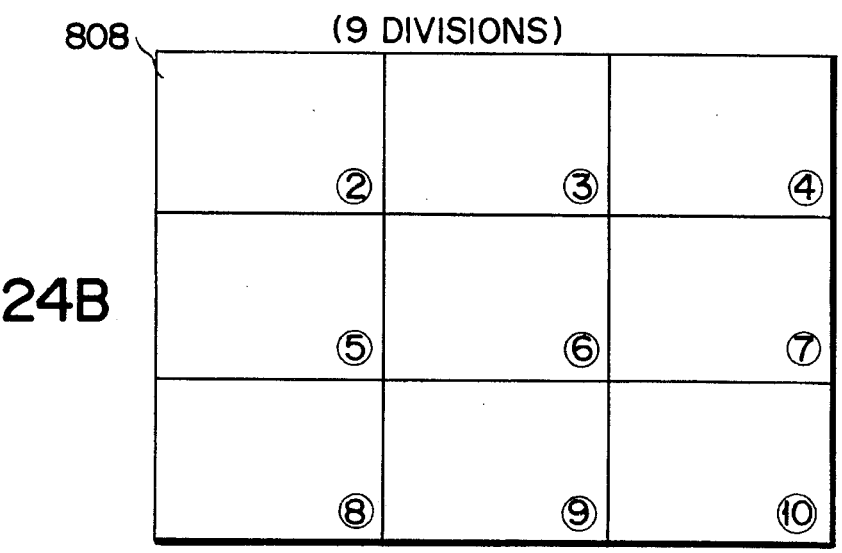
Figure 24C:
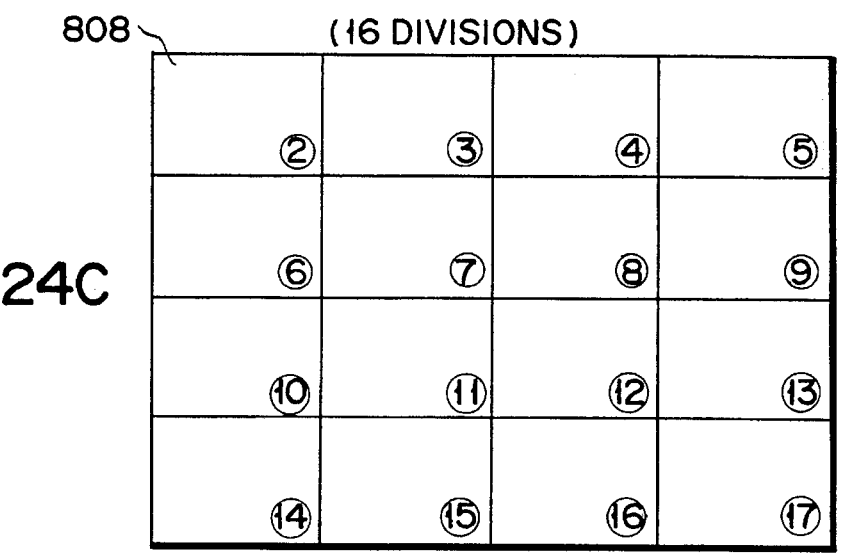

FIGS. 24A to 24C show printouts obtained by changing the number of abstract image divisions when the document is horizontally elongated. FIG. 24A shows a case of 4 divisions; FIG. 24B, a case of 9 divisions; and FIG. 24C, a case of 16 divisions.

Figure 25B:
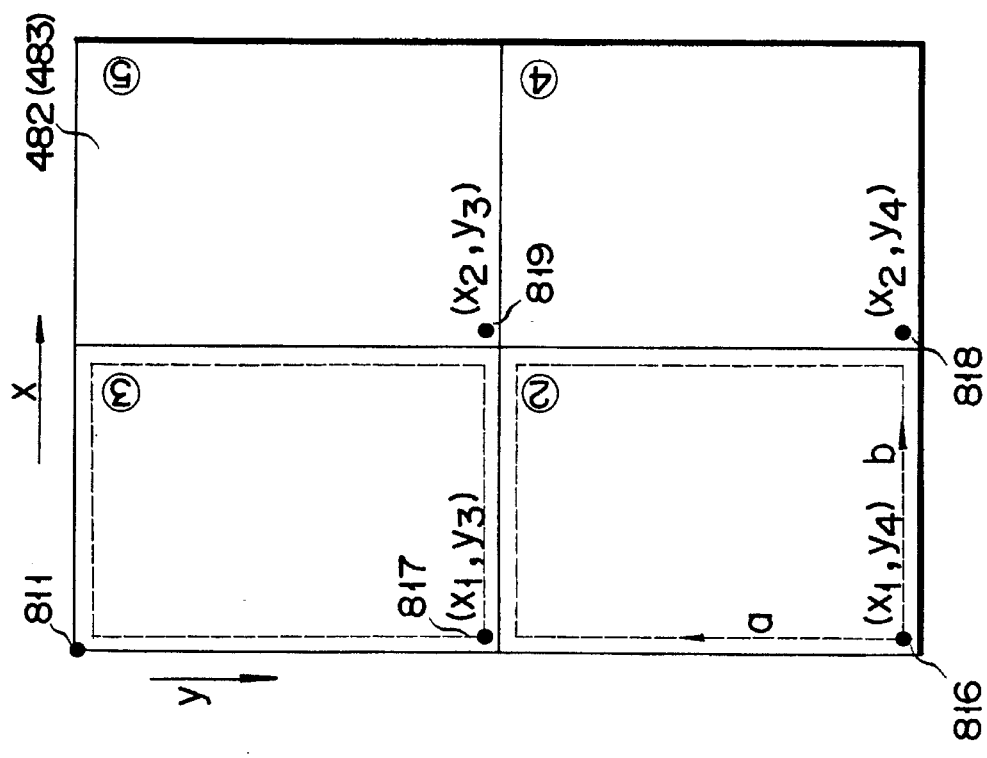
FIG. 25A and 25B are views for explaining an operation of writing image data in memories in the page memory in FIG. 6.
Figure 25A:
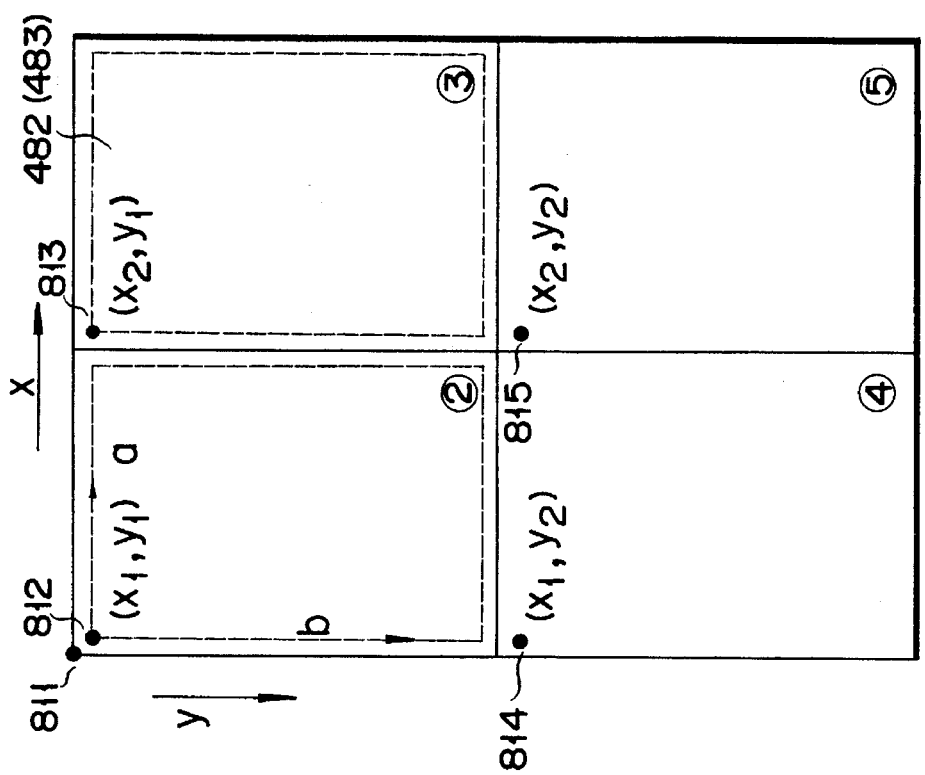

FIGS. 25A and 25B are views for explaining a write operation of image data, in which image data from the optical disk unit 51 are written in the memories 482 and 483 in the page memory 30 when the document is vertically elongated. Referring to FIG. 25A, reference numeral 811 denotes a page memory address origin; 812, a start address (x1,y1) used when image data of the second page is to be written; 813, a start address (x2,y1) for the third page; 814, a start address for the fourth page; and 815, a start address (x1,y2) for the fifth page.

The image data from the optical disk unit 51 are written by an amount corresponding to a predetermined number of addresses in a direction 2, i.e., in the main scanning direction with the start address used as a start point, and one-page reduced data is written by shifting addresses in a direction b. These write operations are performed by using the start address (x2,y1) 813 on the third page, the start address (x1,y2) 814 on the fourth page, and the start address (x2,y2) 815 on the fifth page as start points, respectively, in the same manner as described above so as to read out image data corresponding to the respective pages from the optical disk unit 51 and to write them in the page memory 30. Note that the image data read out from the optical disk unit 51 is data which has been expanded by the compression/expansion circuit 21.

FIG. 25B is a view for explaining an operation of writing image read out from the optical disk unit 51 in the page memory 30 when the document is horizontally elongated. Referring to FIG. 25B, reference numeral 811 denotes a page memory address origin; 816, a start address (x1,y4) used when image data of the second page of a document is to be written; 817, a start address (x1,y3) for the third page; and 818 and 819, start addresses (x2,y4) and (x2,y3) for the fourth and fifth pages.

The image data from the optical disk unit 51 are written by an amount corresponding to a predetermined number of addresses in a direction a, i.e., in the main scanning direction with the start address used as a start point, and one-page reduced data is written by shifting addresses in a direction b. These write operations are performed by using the start address (x1,y3) 817 on the third page, the start address (x2,y4) 818 on the fourth page, and the start address (x2,y3) 819 on the fifth page as start points, respectively, in the same manner as described above so as to read out image data corresponding to the respective pages from the optical disk unit 51 and to write them in the page memory 30.

FIGS. 26A to 26E are views for explaining printouts as examples of the abstract image sheets Q which are formed by selecting the respective modes in the item 107 ("abstract image contents") of the file condition settings shown in FIG. 11. In this case, as shown in FIG. 26A, n document sheets are used. FIG. 26B and 26C show printouts in the "upper surface/abstract image" mode; FIG. 26D, a printout in the "upper surface" mode; and FIG. 26E, a printout in the "abstract image" mode. In the "upper surface/abstract image" mode in FIGS. 26B and 26C, the upper surface 800 of the abstract image sheet Q including an identification symbol 802 (805) is printed on the upper surface of one output paper sheet P. The contents of the first page are printed on the upper surface 800 without reduction in size. The contents of the second page to the nth page as the last page are printed on a lower surface 807 while they are reduced and divided. In the "upper surface" mode in FIG. 26D, the same contents as those of the upper surface 800 in FIG. 26B are printed on the upper surface of the abstract image sheet Q, but the contents of the second and subsequent pages are not printed. In the "abstract image" mode in FIG. 26E, the identification symbol 802 (805) and the reduced and divided contents of the first page to the nth page as the last page are printed on only the upper surface 800 of the abstract image sheet Q. Therefore, in this mode, the first page is not printed on the same scale.

FIGS. 27A to 27F are views for explaining printouts as examples of the abstract image sheets Q which are formed by selecting the respective modes in the item 108 ("number of abstract images") of the file condition settings in FIG. 11. In this case, as shown in FIG. 27A, n document sheets are used. FIGS. 27B, 27C, and 27D show printouts in the "unlimited" mode, whereas FIGS. 27E and 27F show printouts in the "one" mode. In the "unlimited" mode in FIGS. 27B, 27C, and 27D, the contents of the first page including an identification symbol 802 (805) are printed on the upper surface 800 of the first abstract image sheet Q on the same scale, as shown in FIG. 27B. The contents of the second and subsequent pages are printed on a lower surface 807 while they are reduced and divided, as shown in FIG. 27C. In this embodiment, since the number of divisions of the abstract image portion on the first page is smaller than the total number of document sheets, the contents of the pages having page numbers subsequent to the page numbers printed on the lower surface 807 of the first abstract image sheet Q are printed on the second abstract image sheet Q, as shown in FIG. 27D.

Although the above description is based on the assumption that "upper surface/abstract image" is selected in the item 107 (abstract image contents) of the file condition settings in FIG. 11, "unlimited" can also be selected even in the "abstract image" mode.

In the "one" mode, as shown in FIGS. 27E and 27F, the output contents of the pages corresponding to the upper and lower surfaces 800 and 807 of the first abstract image sheet Q are the same as those shown in FIGS. 27B and 27C. In this case, however, since only one abstract image sheet Q is output, the contents of the 18th and subsequent pages are omitted, although the contents of the 1st page to the 17th page are printed. Similar to the case described with reference to FIGS. 27B, 27C, and 27D, the above description is based on the assumption that "upper surface/abstract image" is selected. However, the "one" mode can be selected in the "upper surface" mode and in the "abstract image" mode.

Figure 29B:
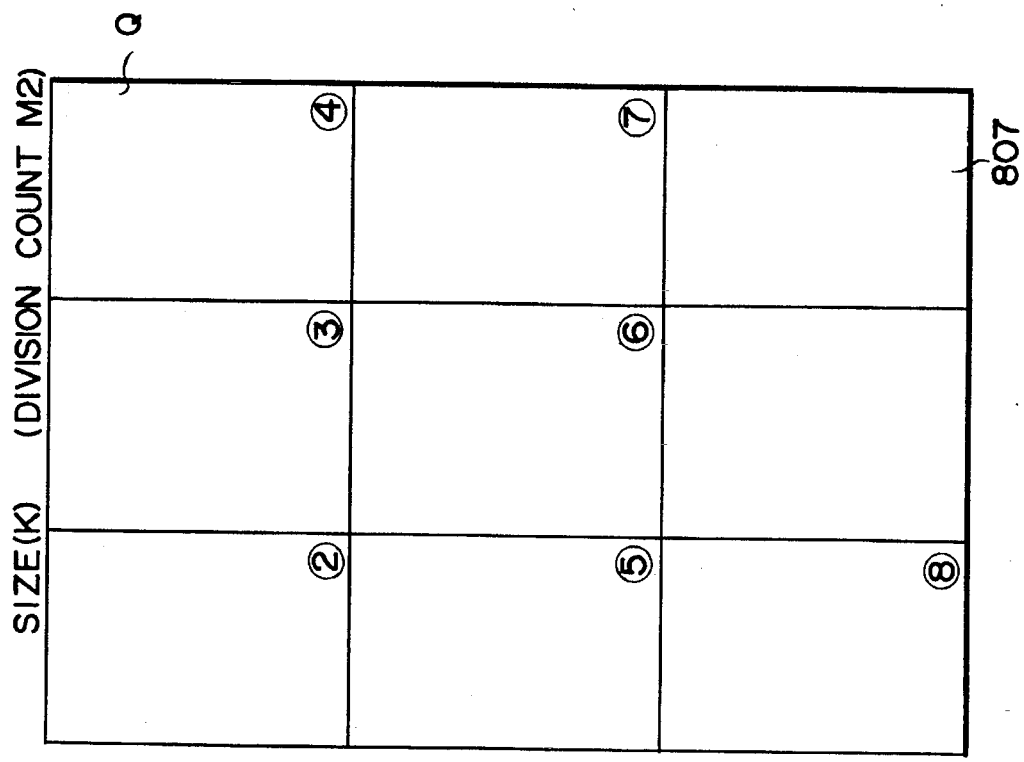
Figure 29A:
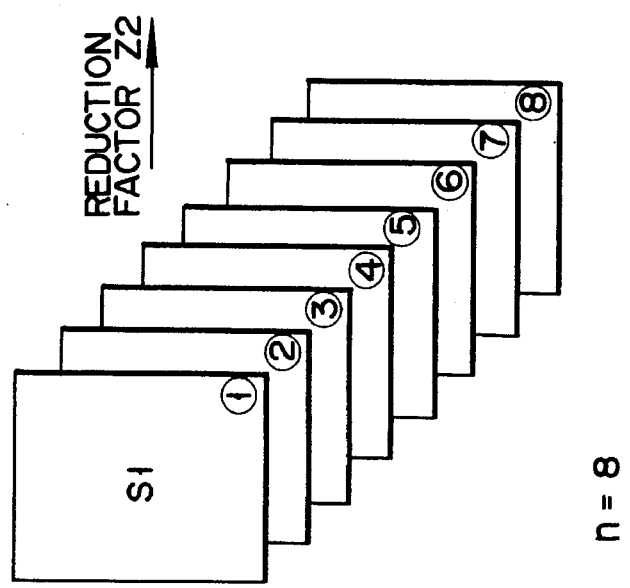

FIGS. 28A to 28C and FIGS. 29A and 29B show a relationship between a document size S and an abstract image division count M in a case wherein the file condition settings in FIG. 11 are set in the respective items as follows: "upper surface/abstract image" in the item 107 ("abstract image contents"); "unlimited" in the item 108 ("number of abstract images"); "automatic" in the item 109 ("number of abstract image divisions"); "vertical" in the item 110 ("abstract image recording direction"); and "same size" in the item 111 ("abstract image reduction condition"). FIG. 28A to 28C show a case wherein the document size S is S1 and a document sheet count n is 8. FIGS. 29A and 29B show a case wherein the document size S is S2 and the document sheet count n is 8. In these cases, the upper surface 800 of the abstract image sheet Q is omitted, and the document sizes S1 and S2 have a relationship of S1>S2.

As shown in FIGS. 28A to 28C, since the document size S1 (e.g., A3 or B4) is larger than a normal size (e.g., A4), the number of divisions of each abstract image portion shown in FIGS. 28B and 28C is set to be a small value, i.e., "4". For this reason, the contents of the second page to the eighth page, excluding the first page, to be printed on the upper surfaces 800 of the abstract image sheets Q are printed over two pages shown in FIGS. 28B and 28C. In the case of the document size S2 in FIGS. 29A and 29B, since the document size is a normal size, e.g., A4, a division count M of an abstract image portion shown in FIG. 28B is set to be a normal value, i.e., "9". For this reason, the contents of the second page to the eight page are printed on only one abstract image sheet shown in FIG. 28B. As described above, if the same output paper size and the same document sheet count are set, the number of divisions of each abstract image portion is changed to prevent the difference between reduction factors Z1 and Z2 with respect to the respective abstract image portions from being greatly increased.

Figure 30B:
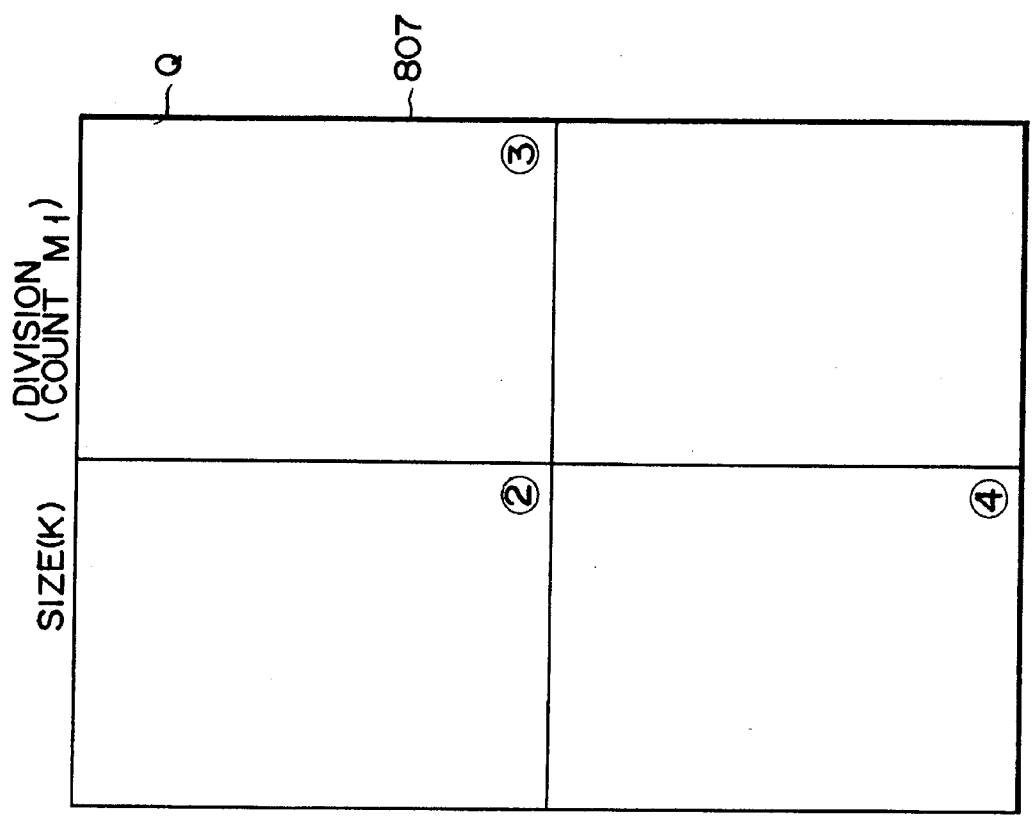
Figure 30A:
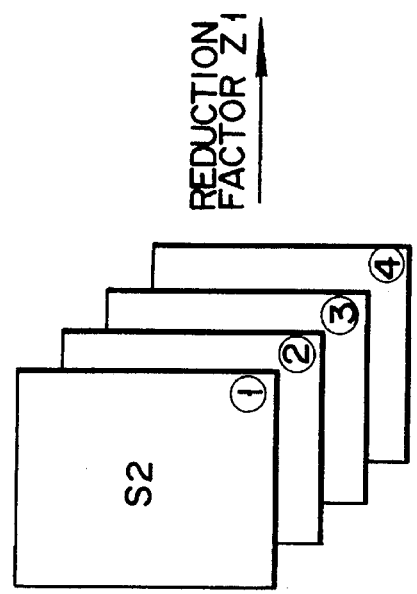
Figure 30D:
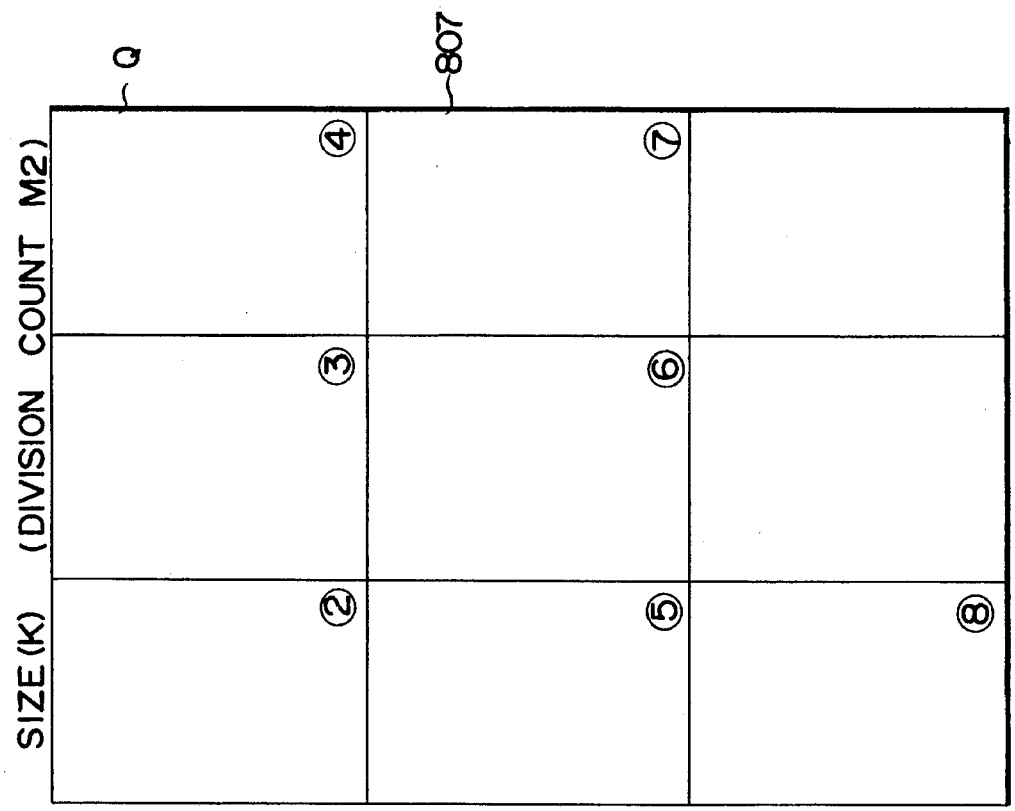
Figure 30C:
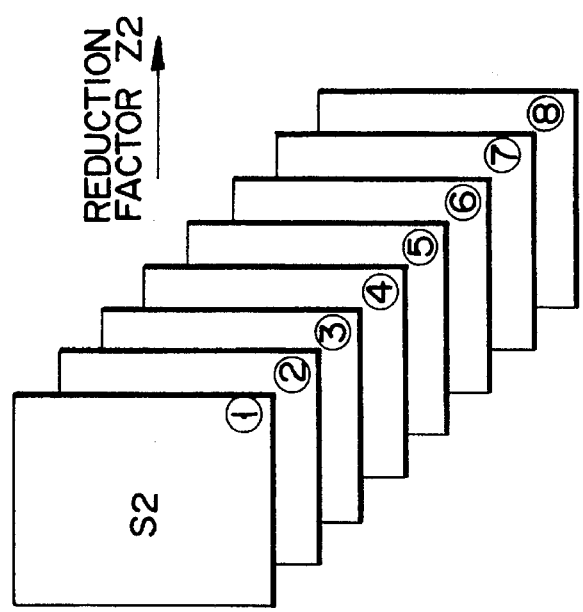

FIG. 30A to 30D show a relationship between the document sheet count n and the abstract image division count M in a case wherein the file condition settings in FIG. 11 are the same as those in FIGS. 28A to 29B. FIGS. 30A and 30B show a case wherein the document size S is S2 and the document sheet count n is 4. FIGS. 30C and 30D show a case wherein the document sheet count n is 8. Note that in these cases, the upper surface 800 of the abstract image sheet Q is omitted.

As shown in FIGS. 30A and 30B, if the document sheet count n is small (n=4), a division count M1 (M1=4) smaller than a maximum division count Mmax which is predetermined on the basis of the document size S is set. In the case shown in FIGS. 30C and 30D, when the document sheet count n (n=8) is close to the maximum division count Mmax, an abstract image division count M2 (M2=9) is equal to the maximum division count Mmax. In this manner, if the document sheet count n is smaller than the division count Mmax predetermined on the basis of document size S and is equal to or smaller than a predetermined division count Mmax −1, the division count is set to be Mmax −1 (in this embodiment, Mmax=M2 and Mmax −1=M1).

Figure 31B:
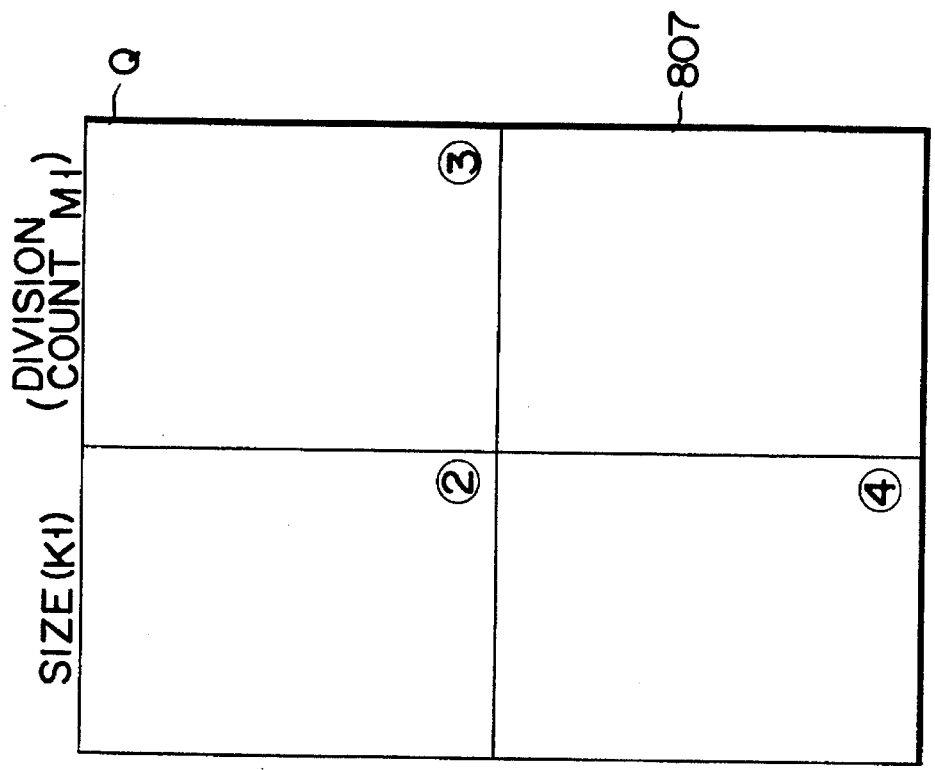
Figure 31A:
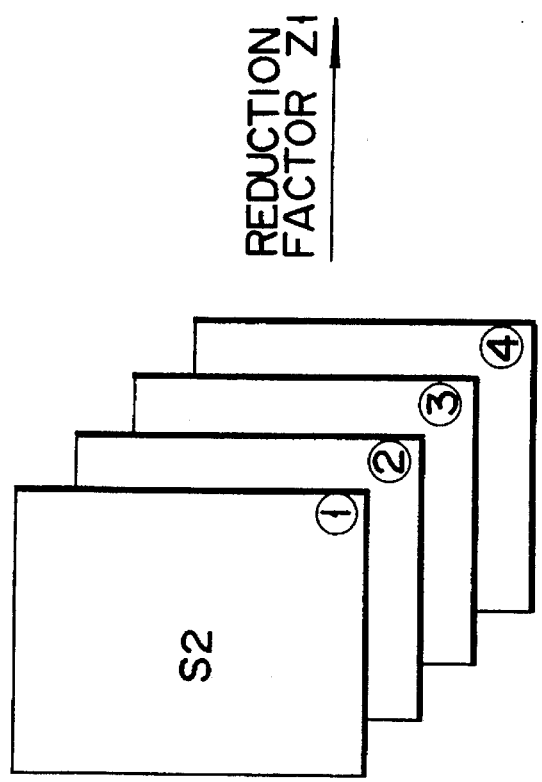
Figure 31D:
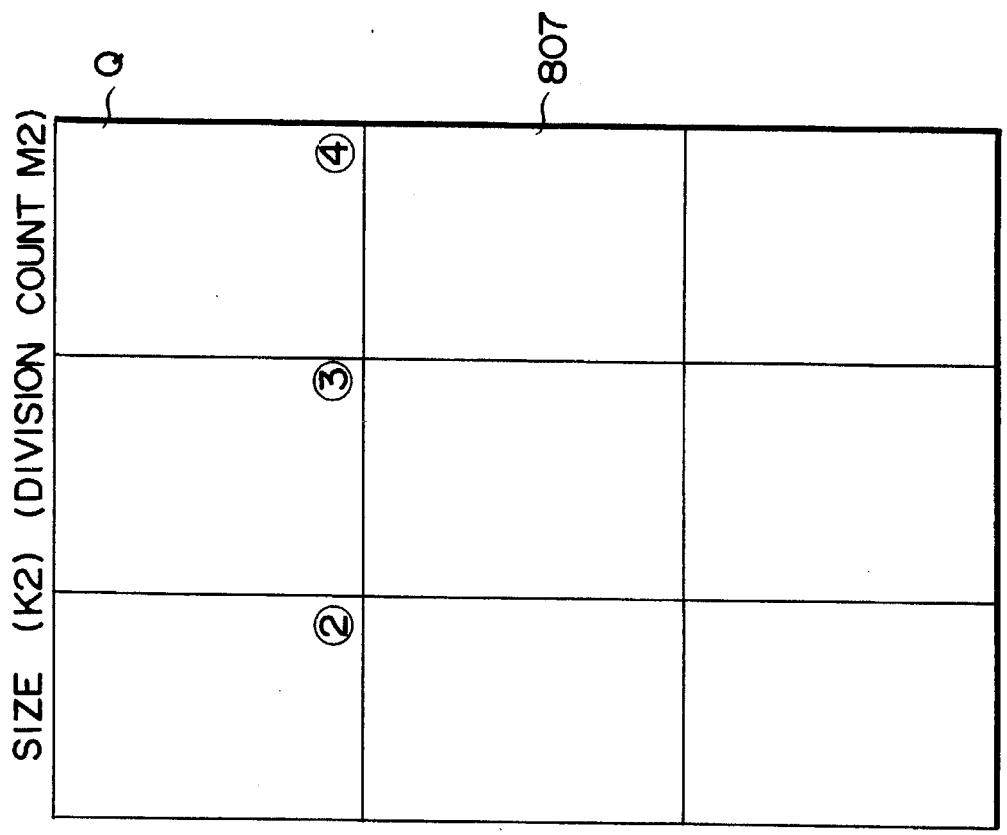
Figure 31C:
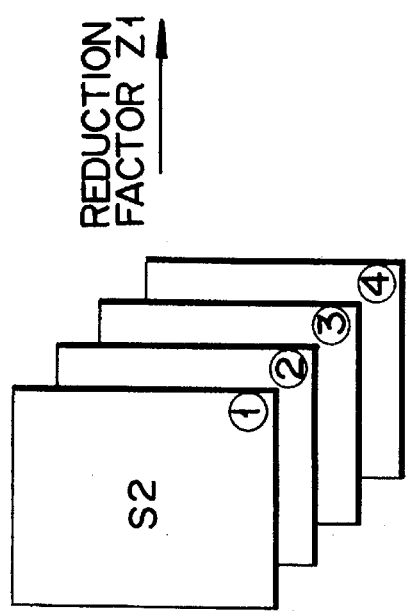

FIGS. 31A to 31D show a relationship between an output paper size K and the abstract image division count M in a case wherein the file condition settings in FIG. 11 are the same as those in FIGS. 28A to 29B. FIGS. 31A and 31B show a case wherein the output paper size K is K1 and the document size S is S2. FIGS. 31C and 31D show a case wherein the output paper size K is K2 and the document size S is S2. Note that in these cases, the upper surface 800 of the abstract image sheet Q is omitted.

As shown in FIGS. 31A and 31B, if the output paper size k is as small as the value K1, the abstract image division count M is equal to a maximum division count M1 (M1=4) which is predetermined on the basis of the document size S2 and the output paper size K1. In the case shown in FIGS. 31C and 31D, since the output paper size K is set to be a large value, i.e., K2, the abstract image division count M is equal to a predetermined maximum division count M2 (M2=9). In this manner, if the document size S is constant, the output paper size K is changed to change the maximum division count M. with this operation, the number of divisions is controlled to keep the document reduction factor constant.

Figure 32B:
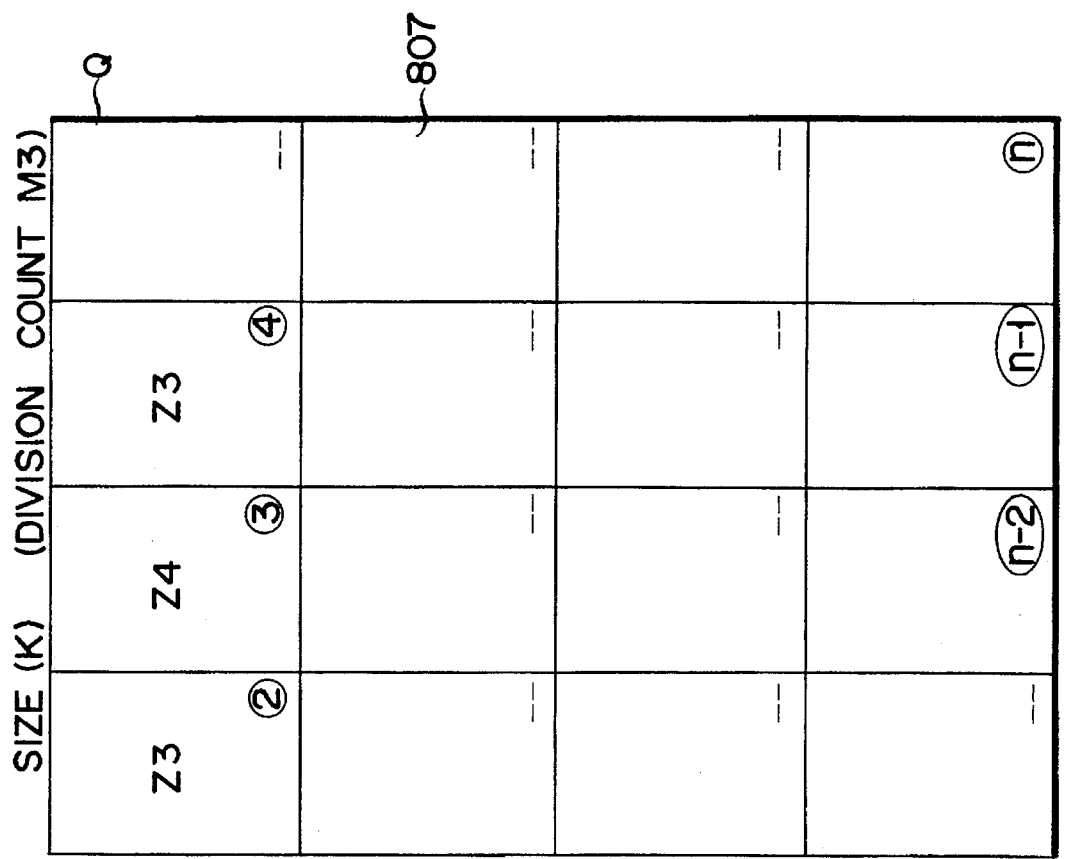
Figure 32A:
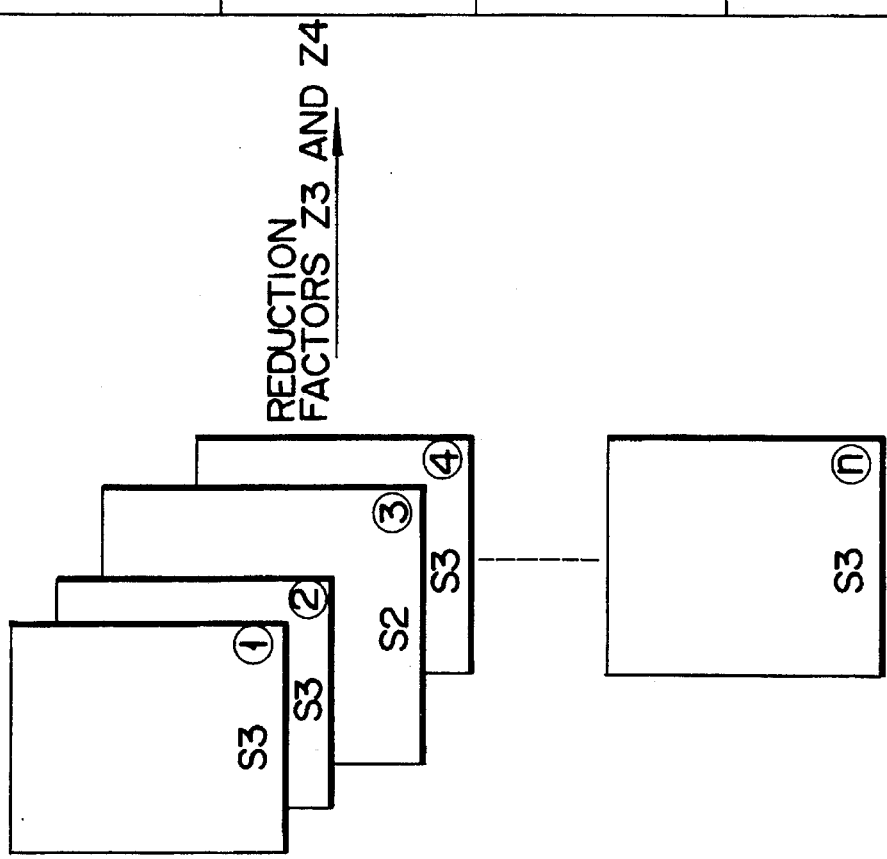

FIGS. 32A and 32B show a relationship between the document size S in a document and a reduction factor Z in a case wherein the file condition settings in FIG. 11 are the same as those in FIGS. 28A to 29B. FIGS. 32A and 32B show a case wherein the document size S includes two sizes, i.e., S3 and S4, and the number of document sheets is n. As shown in FIGS. 32A and 32B, a division count M3 is determined on the basis of the document sheet count n and the document size S3 as the document size of the majority of the document sheets. In this embodiment, since "same size" is selected in the item 111 ("abstract image reduction size") of the file condition settings in FIG. 11, when the abstract image sheet Q of document sheets having different sizes (S3, S4) is to be output, the reduction factor Z is changed to Z3 and Z4 to print out the document sheets on the abstract image sheet Q in the same size. Note that S3<S4 and Z3>Z4.

Figures 33A, 33B:
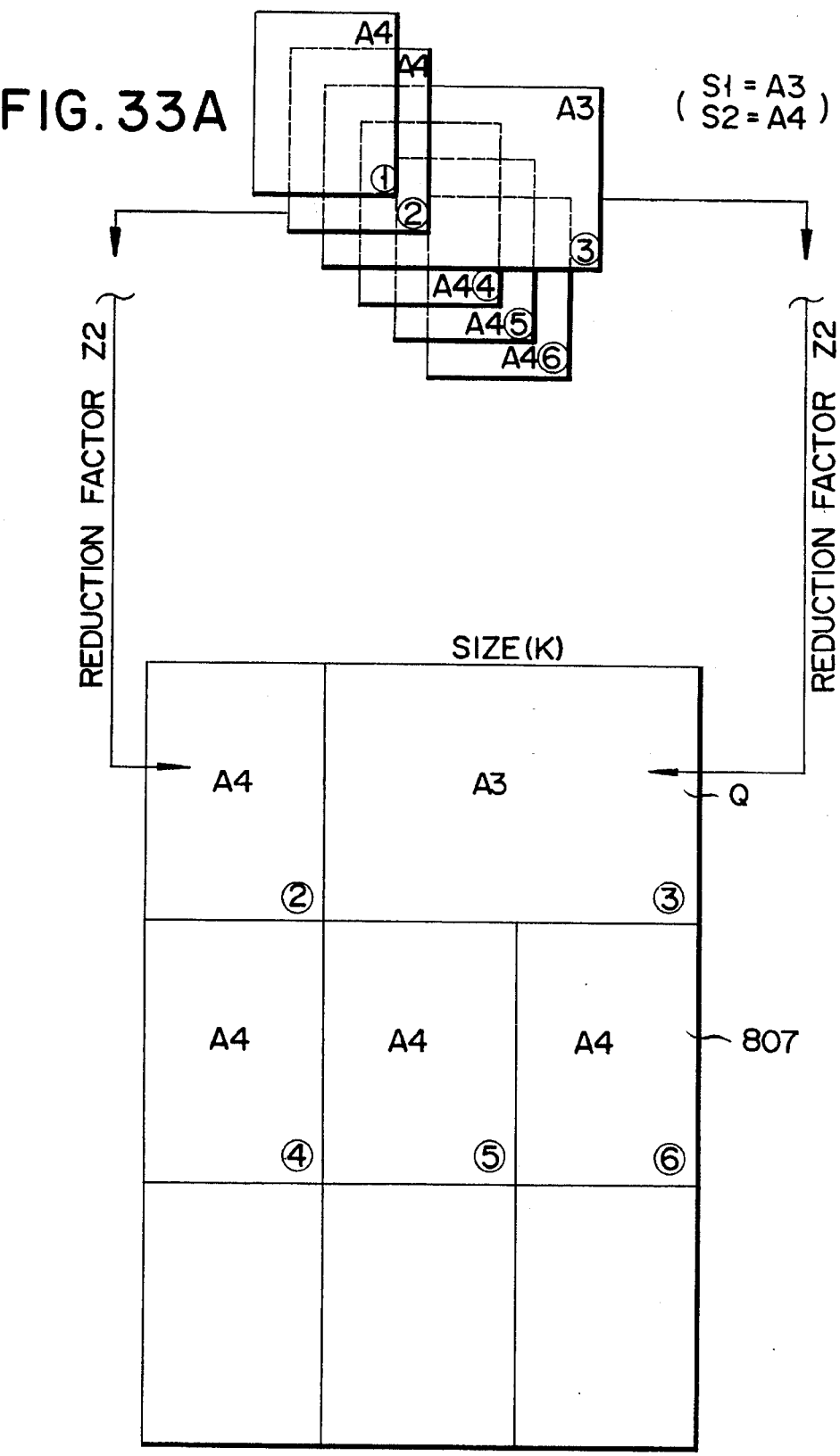

FIGS. 33A and 33B show a relationship between the document size S and the document reduction factor Z with respect to the abstract image sheet Q in a case wherein the file condition settings in FIG. 11 are set in the respective items as follows: "upper surface/abstract image" in the item 107 ("abstract image contents"); "unlimited" in the item 108 ("number of abstract images") "automatic" in the item 109 ("number of abstract image divisions"); "vertical" in the item 110 ("abstract image recording direction"); and "proportional" in the item 111 ("abstract image reduction condition").

FIGS. 33A and 33B show a case wherein the document size S includes two sizes, i.e., S1 (A3) and S2 (A4), and the document sheet count n is 6. In this case, since "proportional" is selected in the item 111 ("abstract image reduction condition") as an item of the file condition settings in FIG. 11, the document sheet Q of document sheets having different sizes (S1, S2) is output with the reduction factor Z being kept constant (Z2). As a result, the document sheets are printed out on the document sheet Q in proportion to their sizes. Note that in this embodiment, S1>S2.

FIGS. 34A and 34B show a detailed document list output upon selection of the document list output mode in FIG. 13. Referring to FIGS. 34A and 34B, the conditions in the respective items are set as shown in FIG. 13: "designation" in the item 140 ("document list contents"); "1985 05 to 1988 10" in the item 141 ("date division"); and "total area" in the item 142 ("area designation").

FIG. 34A shows the contents of document management data in the registered document management area 704 in FIG. 20B which serves to manage each registered document in the optical disk 233. FIG. 34B shows the contents of a document list 820 output in the document output mode.

The contents of the document list 820 will be described in detail below. The document list 820 is divided into eight retrieval document areas. One document area is divided into a retrieval data area 821 in which data required for retrieval is printed, and a cover area 822 in which reduced data of the "cover" of first page of a corresponding document is printed.

In the retrieval data area 821, a registration date 823, a document identification symbol 824, and a document number 825 are printed. The registration date 823 represents a date on which a corresponding document is registered. The document identification symbol 824 is a bar code representing a document number. The document number 825 is a numeric expression of a document number. In this embodiment, the contents of an output document list are determined by the conditions set in the item 141 ("date division") and in the item 142 ("area designation") so that six documents having document numbers 002 to 007, of the contents of the optical disk 233 in FIG. 34A, are output for the document list. Note that in the cover area 822, all of the contents of the first page of the corresponding document are printed on a reduced scale, in accordance with the above-mentioned conditions. In this embodiment, the output document list 820 can be used for document retrieval.

Similar to FIGS. 34A and 34B, FIGS. 35A and 35B show a detailed document list output. Referring to FIGS. 35A and 35B, the conditions in the respective items are set as follows: "all" in the item 140 ("document list contents"); and "½" in the item 142 ("area designation"). Note that when "all" is set in the item 140 ("document list contents"), the item 141 ("date division") is neglected.

FIG. 35A shows the contents of document management data in the registered document management area 704 in FIG. 20B which serves to manage each registered document in the optical disk 233. FIG. 35B shows the contents of a document list. The contents of an output document list are based on the Conditions set in the respective items as described above. In this case, all the documents (document numbers 001 to n) in the optical disk 233 are output for the document list (document numbers 009 to n are not shown) in accordance with the disk contents shown in FIG. 35A.

Note that in the cover area 822, the contents of an upper ½ portion of the first page of the corresponding document is printed on a reduced scale in accordance with the condition set in the item 142 ("area designation"). In this case, as shown in FIGS. 35A and 35B, the number of documents which can be printed on one page of the document list is twice that in the case shown in FIGS. 34A and 34B.

FIGS. 36A to 36E show detailed retrieval document outputs upon selection of the retrieval output mode in FIG. 12. The conditions in the respective items are set as shown in FIG. 12: "automatic" in the item 130 ("retrieval mode"); "all" in the item 132 ("output contents"); "partial" in the item 132 ("number of output copies"); "automatic" in the item 133 ("output paper size"); and "single side" in the item 134 ("printing surface"). FIGS. 36B to 36E show printouts in this case. FIG. 36A shows the contents of one document data. FIGS. 36B to 36E respectively show the output contents of a retrieval document. The contents of the retrieval document to be output on the basis of the conditions set in the respective items are all the contents of the corresponding document (corresponding to four pages in this case). In addition, the number of copies is one, and the contents are printed on one surface of the paper sheet P. Since "automatic" is set in the item 133 ("output paper size"), the same sizes as document sizes in the respective page data portions in FIG. 36A are selected as the sizes of the paper sheets P to be output. Furthermore, since printing is performed in accordance with "vertical/horizontal direction", the paper sheets P are output in the same states as those in the file registration mode.

FIGS. 37A to 37E show outputs obtained when only the condition in the item 133 ("output paper size"), of the conditions in the items which are set in the case shown in FIGS. 36A to 36E, is changed to "A4". The contents of the retrieval document to be output under the above-mentioned conditions are: all the contents of the document are output; the number of copies is one; and the contents are printed on one surface of the paper sheet P. Since "A4" is set in the item 133 ("output paper size"), all the output paper sheets P have a size of A4. Therefore, in the case shown in FIGS. 37A to 37E, since only a document sheet having a page No. 04 is "A3", it is reduced to a A4 size and output.

FIGS. 38A to 38C show outputs obtained when only the condition in the item 131 ("output contents") of the conditions set in the respective items in the case shown in FIGS. 36A to 36E is changed to "partial".

In this case, a detailed condition in the item 131 ("output contents"), i.e., designation of pages, is set to designate two pages, "01" and "03".

Under such conditions, only the contents of document sheets having page Nos. 01 and 03, of the retrieval document to be output, are output.

An operation of each function of the present invention will be described in detail below.

FIG. 39A is a flow chart showing the fundamental functions of the copying machine of the present invention. As shown in FIG. 39A, this copying machine has two fundamental functions: a copy function for a normal copy operation; and a function associated with the filing of document sheets by means of the optical disk 233. When the function associated with filing is to be operated, the file key 101 is operated to select the file mode (STEP 1). After the optical disk 233 is set in the optical disk unit 51 (STEP 2), one of three functions, i.e., "file operation", "retrieval operation", and "retrieval list operation", is selected (STEP 3 to STEP 5), thus executing each of these operations (STEP 6 to STEP 8).

Each operation will be briefly described below. In "file operation", one document is read by the scanner 41, and the read image data is recorded (filed) in the optical disk unit 51, while the abstract image sheet Q for retrieving recorded document data is output. In "retrieval operation", a document recorded in the optical disk 233 is retrieved in accordance with a bar code (retrieval data, a document number) printed on the abstract image sheet Q, and the retrieved document data is printed on the paper sheet P. In "retrieval list operation", a retrieval list for retrieving document data recorded in the optical disk 233 is read out and output independently of the abstract image sheet Q.

When a document sheet is placed on the document glass 200, and the start key 100 is depressed after other conditions are set, copy processing as the copy function is performed (STEP 9).

Figure 39B:
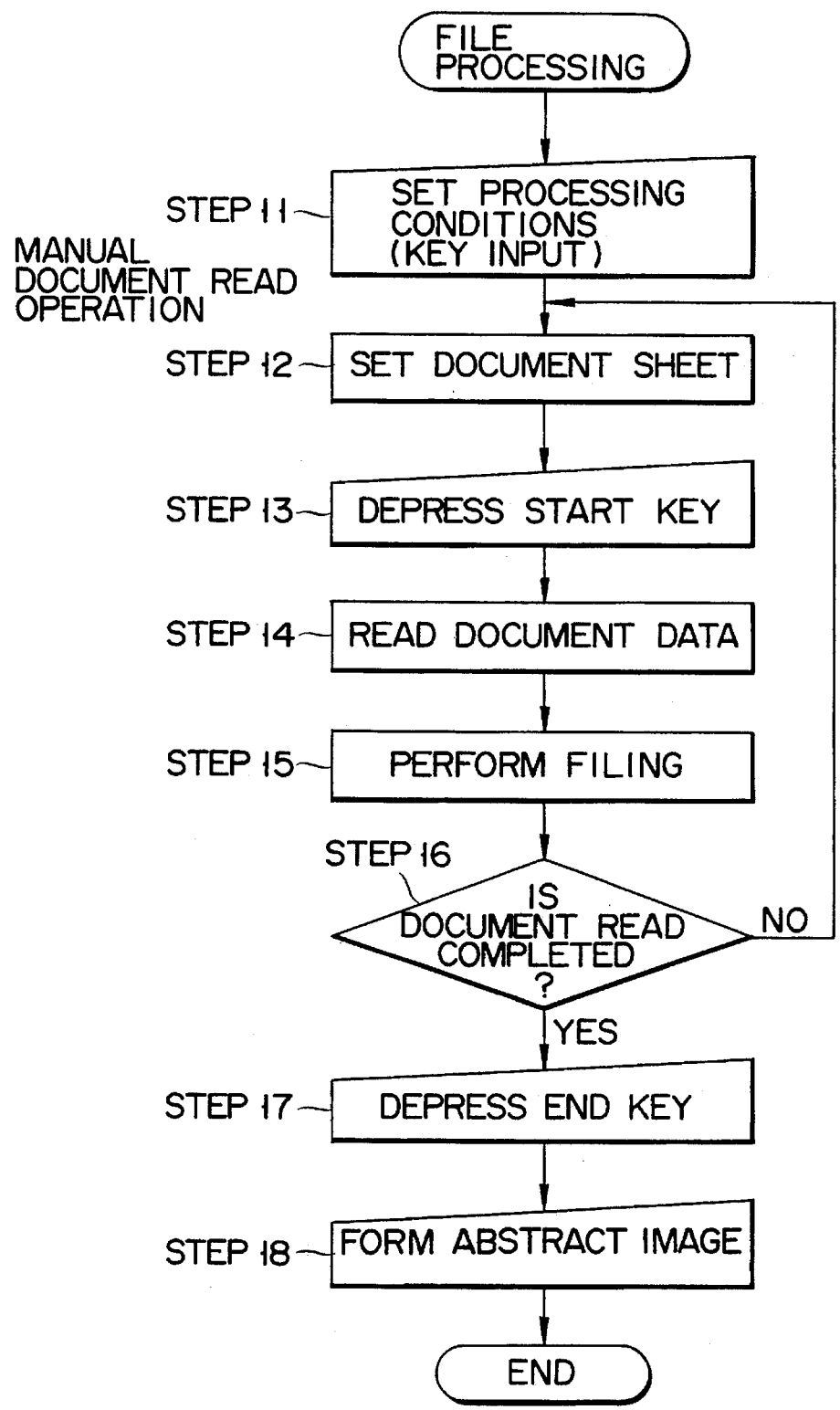

The file processing in FIG. 39A will be described in detail below with reference to FIGS. 39B and 39C. FIG. 39B is a flow chart for explaining operations in a manual document read mode in which document sheets are read by a manual operation (document sheets are manually set one by one on the document glass 220 one by one). FIG. 39C is a flow chart for explaining operations in an RADF document read mode in which document sheets set on the return auto document feeder 206 are automatically read. In FIG. 39B, the file processing is performed in the following manner. Prior to document input, processing conditions for the file processing are set through the condition setting switch panel 105 (STEP 11).

Subsequently, the first page of a document is set on the document glass (STEP 12), and the start key 100 is depressed (STEP 13) to cause the scanner 41 to read the document sheet (STEP 14). The read image data is recorded in a predetermined area of the optical disk 233 by a filing operation (STEP 15). If a read operation of all the document sheets is not completed (STEP 16), the flow returns to STEP 12 to repeat the operation by setting the second page of the document on the document glass 220. If the read operation of the document is completed (STEP 16), the end key 125 is depressed (STEP 17) to form the abstract image sheet Q (STEP 18).

Referring to FIG. 39C, file processing in the document read mode using the return auto document feeder 206 is performed in the following manner. Similar to the above-described manual document read mode, processing conditions are set by means of the condition setting switch panel 105 of the display section 12 (STEP 21). After the setting operation, all the document sheets of one document are set on the document feed table 207 (STEP 22). When the start key 100 is depressed (STEP 23), the document sheets are automatically read by the scanner 41 one by one (STEP 24). In this case, since the document sheets to be read are set facing down, they are sequentially read, starting from the last page. The read image data is recorded in a predetermined area of the optical disk 233 by a filing operation (STEP 25).

The document read operation to the filing operation described above are automatically repeated until all the document sheets are completely read. When the last document sheet is read (STEP 26), and the document detection switch 217 is turned off, the read operation is automatically stopped. At this time, if "automatic" is selected in the item 144 ("RADF file") (STEP 27), the abstract image sheet Q is automatically formed (STEP 30). In contrast to this, if "manual" is selected (STEP 27), the operation of the copying machine is temporarily stopped. If no document sheet of one document is left (STEP 28), the end key 125 is depressed (STEP 29) to form the abstract image sheet Q (STEP 30).

In the document read mode using the return auto document feeder 206, all the document sheets of one document are basically set on the document feed table 207. However, for example, a document may include a very large number of document sheets and hence cannot be stored at once in the document feed table 207 by one setting operation. In such a case, remaining document sheets are set on the document feed table 207 at the second setting operation, and the start key 100 is depressed to start read and filing operations of the remaining document sheets.

Figure 39E:
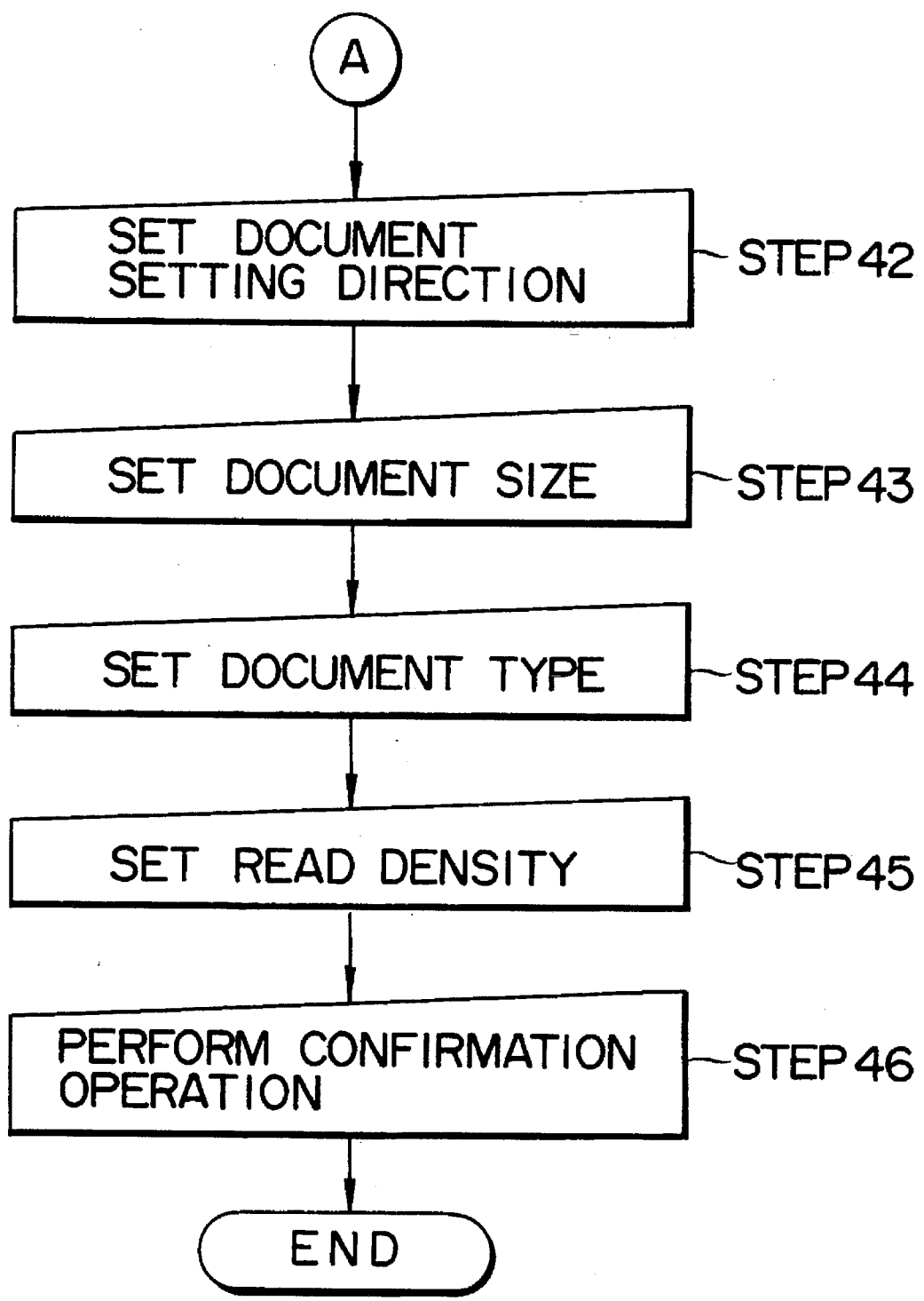
Figure 39G:
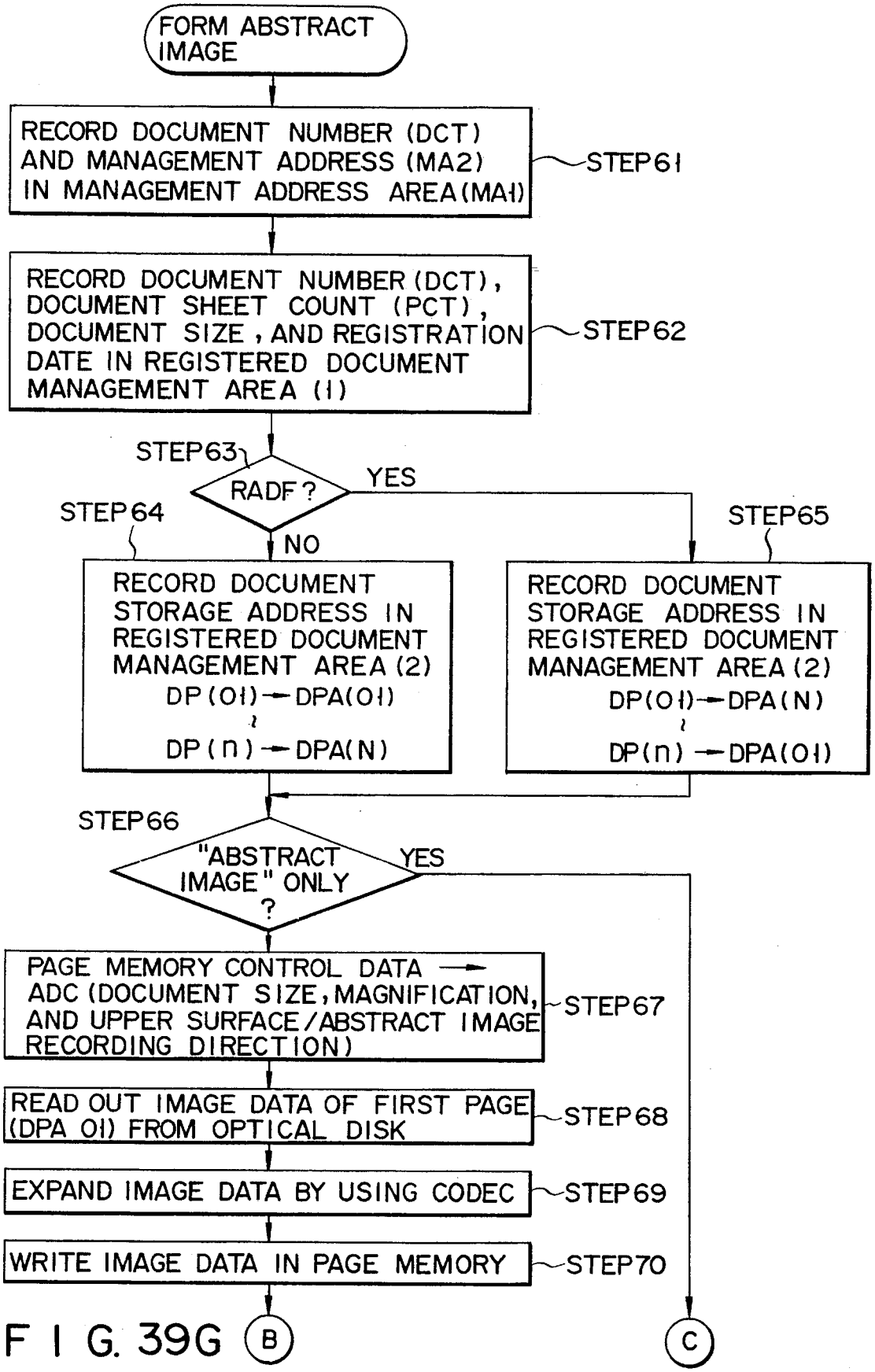
Figure 39H:
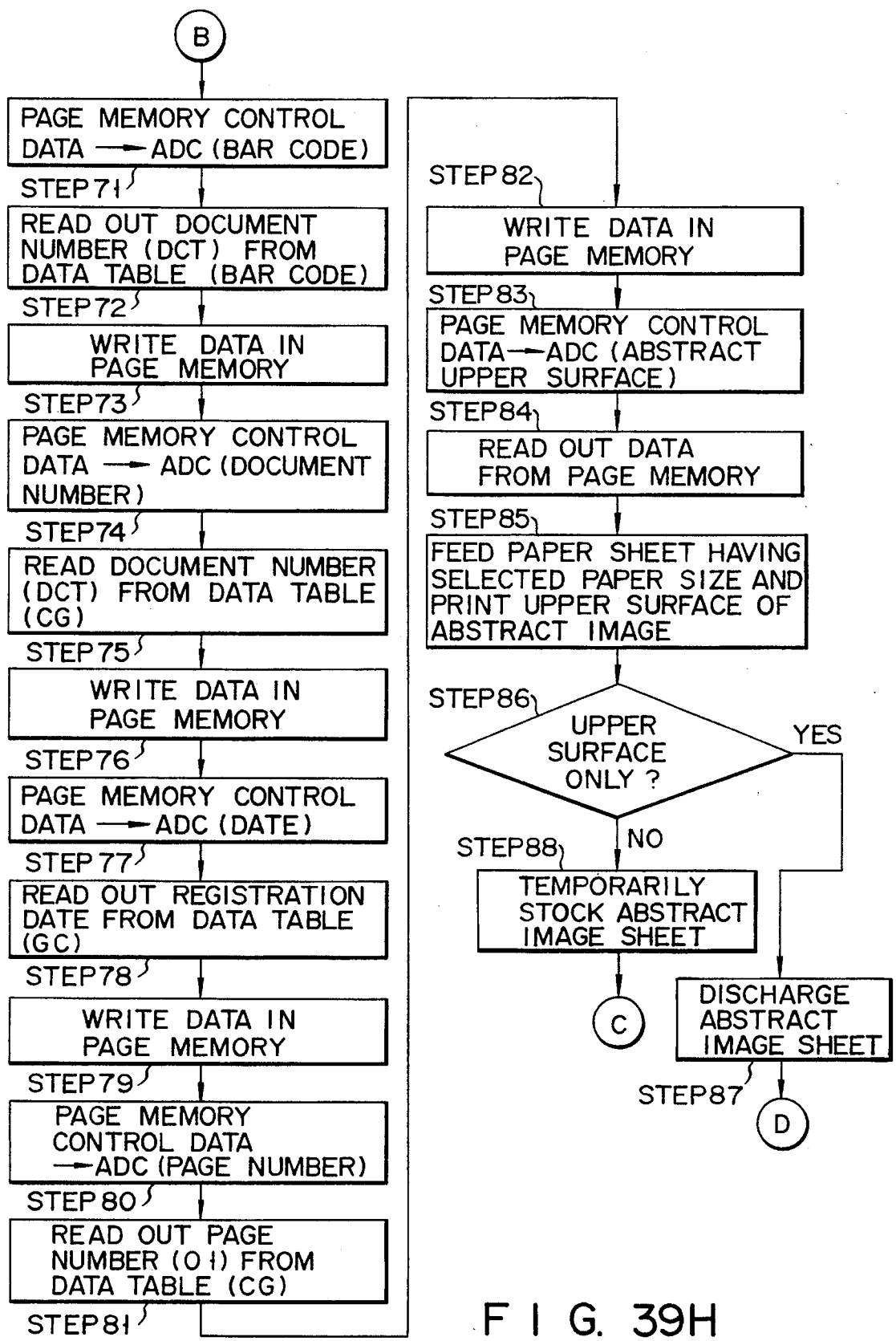
Figure 391:
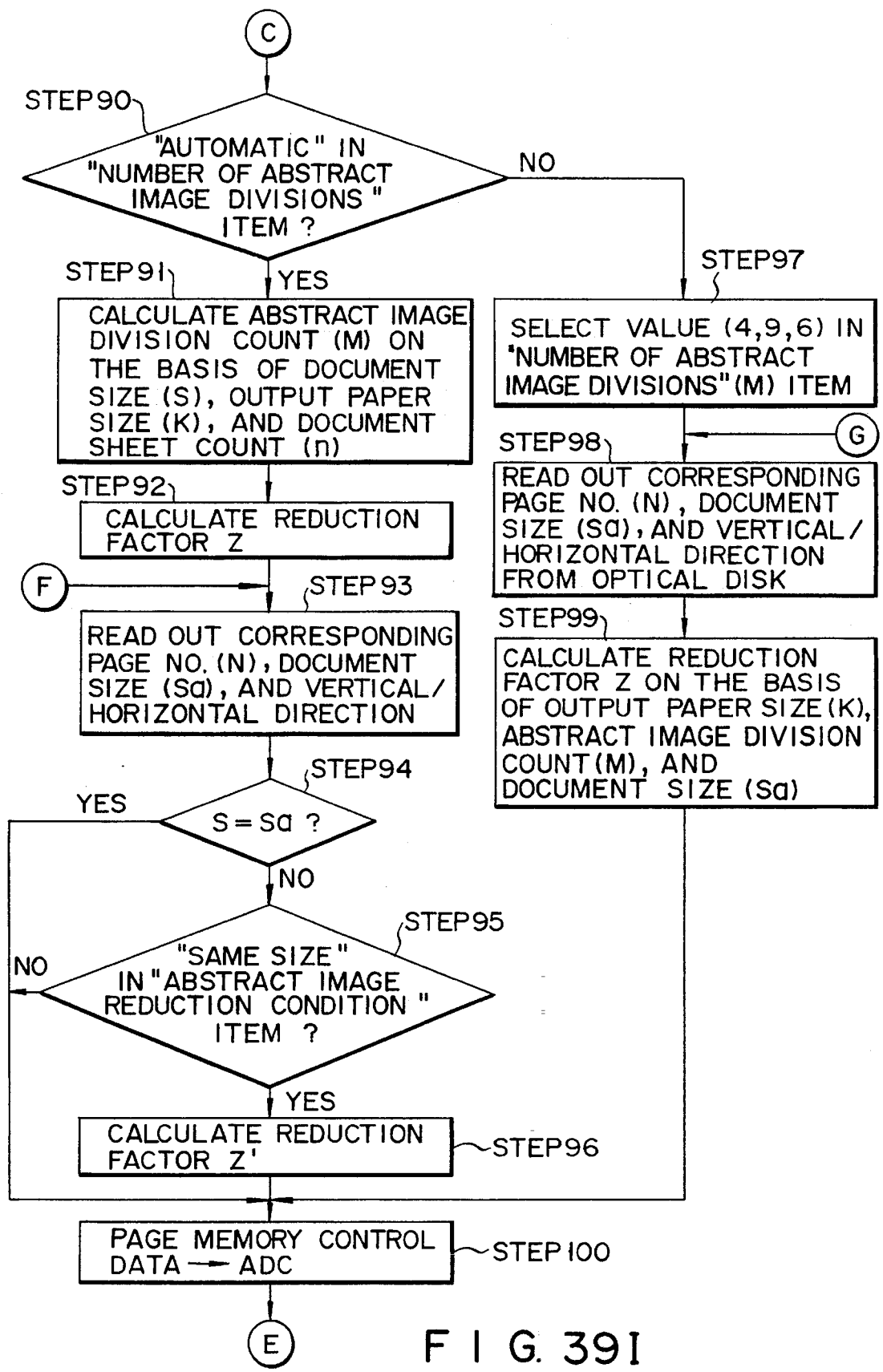

Setting of the processing conditions in FIGS. 39B and 39C will be described in detail below with reference to the flow charts in FIGS. 39D and 39E. In process condition setting, as shown in FIG. 39D, processing conditions are sequentially set in the item 106 ("output paper size") for selecting the size of the paper P on which the abstract image sheet Q is printed, and in the item 107 ("abstract image contents") for selecting output contents of the abstract image sheet Q, by using the condition setting switch panel 105 of the display section 12 (STEP 31 and STEP 32). If "upper surface/abstract image" or "abstract image" is selected in the item 107 ("abstract image contents") (STEP 33), processing conditions are sequentially set in the item 108 ("number of abstract images") for selecting the number of output abstract image sheets Q, in the item 109 ("number of abstract image divisions") for selecting a condition for division and the number of divisions of the abstract image sheet Q, and in the item 111 ("abstract image reduction condition") for selecting a document reduction condition with respect to the abstract image sheet Q, by using the condition setting switch panel 105 (STEP 34 to STEP 36). If "surface" is selected in STEP 33, condition setting in the item 108 and the subsequent items described above (STEP 34 to STEP 36) need not be performed.

Subsequently, by using the condition setting switch panel 105, processing conditions are sequentially set in the item 110 ("upper surface/abstract image recording direction") for selecting the recording direction of the upper surface 800 and the abstract image portion of the abstract image sheet Q (the recording direction of the document) and in the item 112 ("document input condition") for selecting a document input method (STEP 37 and STEP 38).

If "RADF" is selected in the item 112 ("document input condition") (STEP 39), processing conditions are sequentially set in the item 113 ("RADF document") for selecting a reading surface/surfaces of a document sheet fed from the return auto document feeder 206, and in the item 114 ("RADF file") for selecting whether to automatically form the abstract image sheet Q upon completion of a read operation of a document from the return auto document feeder 206, by using the condition setting switch panel 105 (STEP 40 and STEP 41). If "manual" is selected in STEP 39, condition setting in the item 113 ("RADF document") and the subsequent items (STEP 40 and STEP 41) described above need not be performed.

Subsequently, by using the condition setting switch panel 105, processing conditions are sequentially set in the item 115 ("document setting direction") for selecting a setting direction with respect to the scanner 41, in the item 146 ("document size") for selecting a document size, and in the item 148 ("read density") for selecting a document read density (STEP 42 to STEP 45). When the condition setting switch panel 105 on the confirmation display portion 116 is operated (STEP 46), setting of all the processing conditions is completed.

Filing in FIGS. 39B and 39C will be described in detail below with reference to a flow chart in FIG. 39F. Image data read by the scanner 41 is written on the same scale in the page memory 30 (STEP 51). Before one-page image data is recorded in the optical disk 233, the address value of the document data recording address register 174 in the disk data register 160 is set in the document storage address register DP(n) 176 corresponding to a page number (n) (STEP 52). At this time, the value of the document data recording address register 174 is an address value used to record each page No. in FIG. 21.

Subsequently, a page No. 713 and a vertical/horizontal direction 715 in FIG. 21 are respectively recorded at addresses of the optical disk 233 which are designated by the data recording address register 174 (STEP 53). The item 115 ("document setting direction") and the item 110 ("upper surface/abstract image recording direction" (document recording direction)) are checked (STEP 54). If the "document setting direction" item 115 is different from the "upper surface/abstract image recording direction" item (document recording direction) 110 (a combination of vertical and horizontal directions or of horizontal and vertical directions), 90°-rotation read control data is set with respect to the address controller 484 of the page memory 30 (STEP 55).

Subsequently, image data recorded in the page memory 30 is read out (STEP 56) and is compressed by the compression/expansion circuit 21 (STEP 57). The compressed data is recorded at an address designated by the document data recording address register 174 (STEP 58). At this time, the page counter 162 representing the page number (n) is incremented by one (STEP 59).

Formation of the abstract image sheet Q in the flow charts in FIGS. 39B and 39C will be described in detail below with reference to FIGS. 39G to 39L. In forming the abstract image sheet Q, the value of document number counter 163 in FIG. 17 is recorded first as a document number registered in the management address area 712 in the optical disk 233 in FIG. 20, and the address value of the management address register 173 in FIG. 18 is recorded at an address, in the management address 719 in FIG. 20, designated by the management address register 172 (STEP 61).

Management data of each document in the registered document management area 704, i.e., data of the document number 705, of the page count 706, of the document size 707 representing the size of the majority of document sheets, and of the registration date 708 are recorded (STEP 62). The data of the document number 705 corresponds to the value of the document number counter 163; the data of the page count 706, to the value of the page number counter 162; and the data of the registration date, to the value of the date register 177.

The item 112 ("document input condition") is checked (STEP 63). If "manual" is set in the item 112, the values of the document storage address registers DP(01) 175 to DP(n) 176 are recorded in the document storage addresses DPA(01) 720 to DPA(N) 721 representing the recording address of each page in the registered document management area 704 (STEP 64). This operation is performed because document input is performed from the first page of each document when "manual" is set in the item 112.

If it is determined in STEP 63 that "RADF" is set in the item 112 ("document input condition"), since document input is performed from the last page of each document unlike the "manual" mode, the data of the document storage address registers DP(01) 175 to DP(n) 176 in FIG. 18 is recorded in the document storage address DPA(01) 720 to DPA(N) 721 as follows (STEP 65). The values of the registers DP(n) 176 and DP(01) 175 are respectively recorded in the document storage addresses DPA (01) 720 and DPA(N) 721. This operation is performed because document input is performed from the last page when "RADF" is set in the item 112.

The item 107 ("abstract image contents") is then checked (STEP 66). If a mode other than "abstract image" is set in the item 107, formation of the upper surface 800 of the abstract image sheet Q is performed. With respect to the address controller 484 of the page memory 30, a paper size (K) in which the abstract image sheet Q is printed, a magnification determined by a document size (S), and control data in the item 110 ("upper surface/abstract image recording direction") are set (STEP 67). Image data of the first page of the corresponding document in the optical disk 233 is read out (STEP 68). In this case, the image data of the first page is read out from an address designated by the page No. (01) storage address DPA(01) 720 in the registered document management area 704. The readout image data is expanded by the compression/expansion circuit 21 (STEP 69) and is written in the page memory 30 (STEP 70). When "abstract image" is set in the item 107 ("abstract image contents"), the flow advances to STEP 90 in FIG. 39I to perform reduced abstract image formation.

After the image data of the first page is written in the page memory 30, bar code pattern data corresponding to the document number is read out from the bar code pattern data memory 155 in FIG. 15 and is written in a designated address area of the page memory 30 (STEP 71 to STEP 73). In addition, numeric pattern data corresponding to the document number, i.e., numeric data corresponding to the registration date and numeric pattern data corresponding to the page number (01), are read out from the character generator 154 in FIG. 15 and are written in a designated address area of the page memory 30 (STEP 74 to STEP 82). Upon completion of writing of the data in page memory 30, the paper sheet P having an output paper size selected in the item 106 ("output paper size") is fed, and the data in the page memory 30 is printed on the paper sheet P as the upper surface 800 of the abstract image sheet Q (STEP 83 to STEP 85). The printed abstract image sheet Q is discharged only when "upper surface" is set in the item 107 ("abstract image contents"), and the flow advances to STEP 117 to perform a register setting operation (STEP 86 and STEP 87). If "upper surface/abstract image" is set in the item 107, the abstract image sheet Q is not discharged but temporarily stocked in the apparatus, and the flow advances to STEP 90 to perform a reduced abstract image forming operation (STEP 88).

Figure 39J:
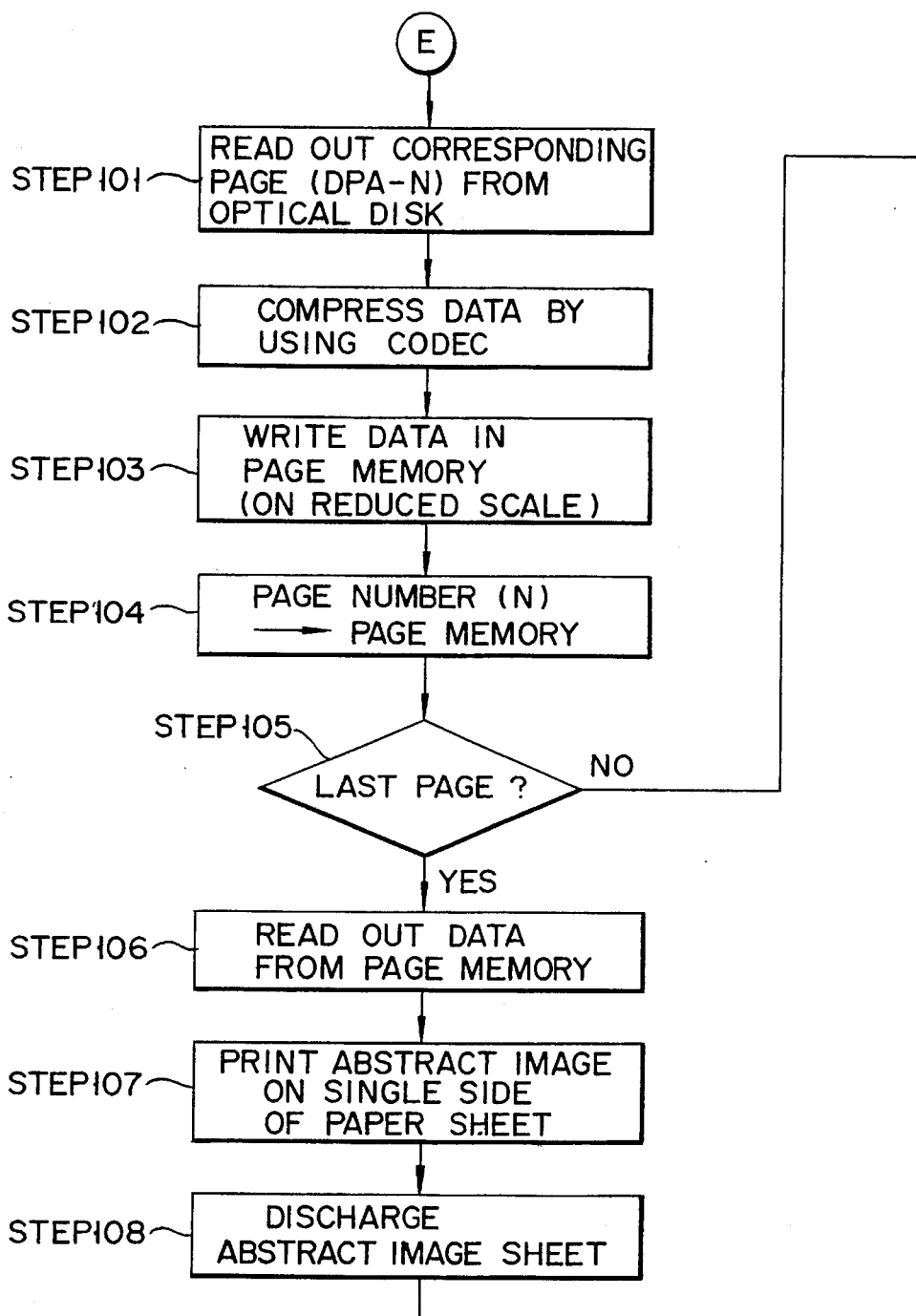
Figure 39K:
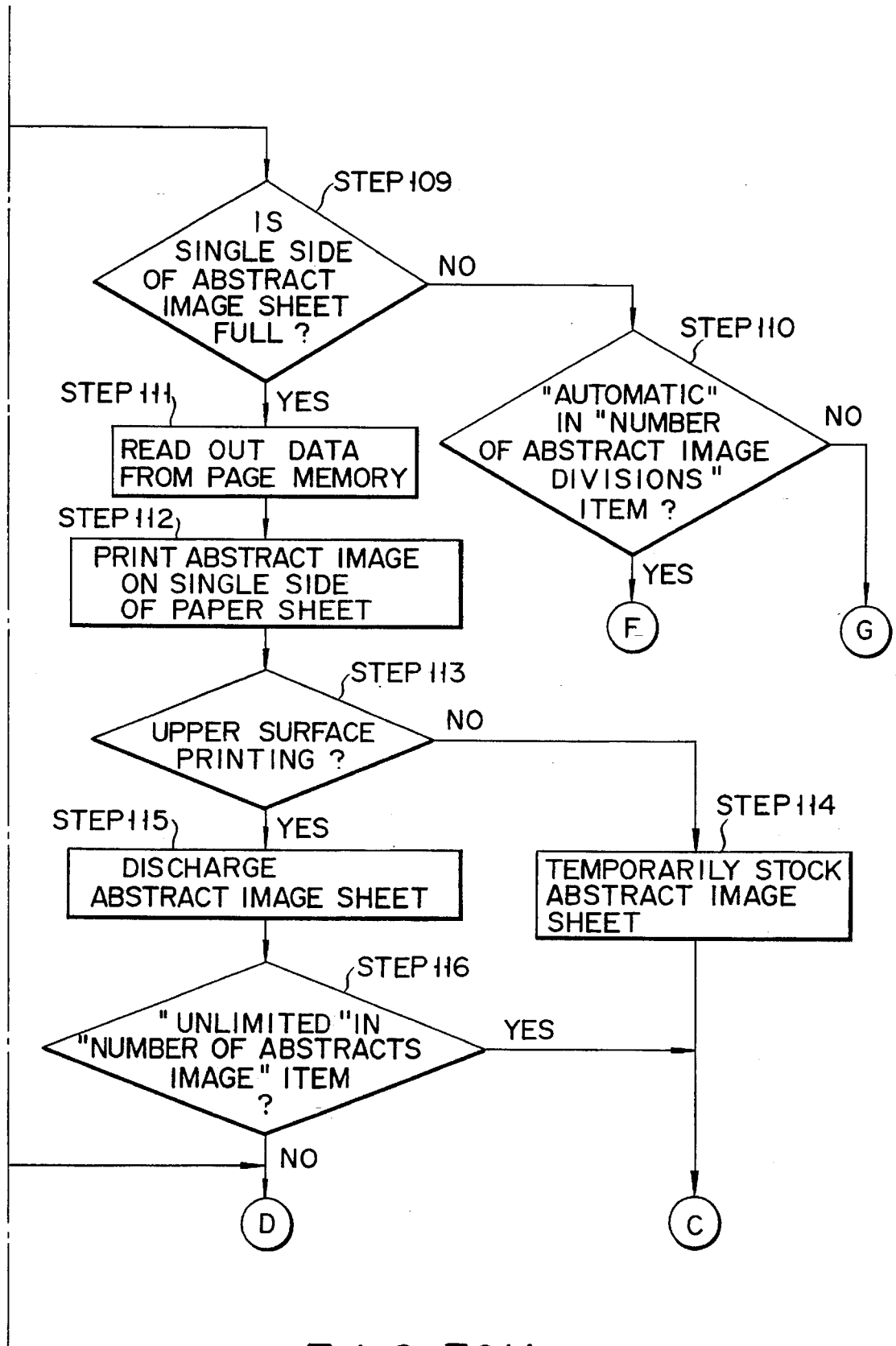
Figure 39L:
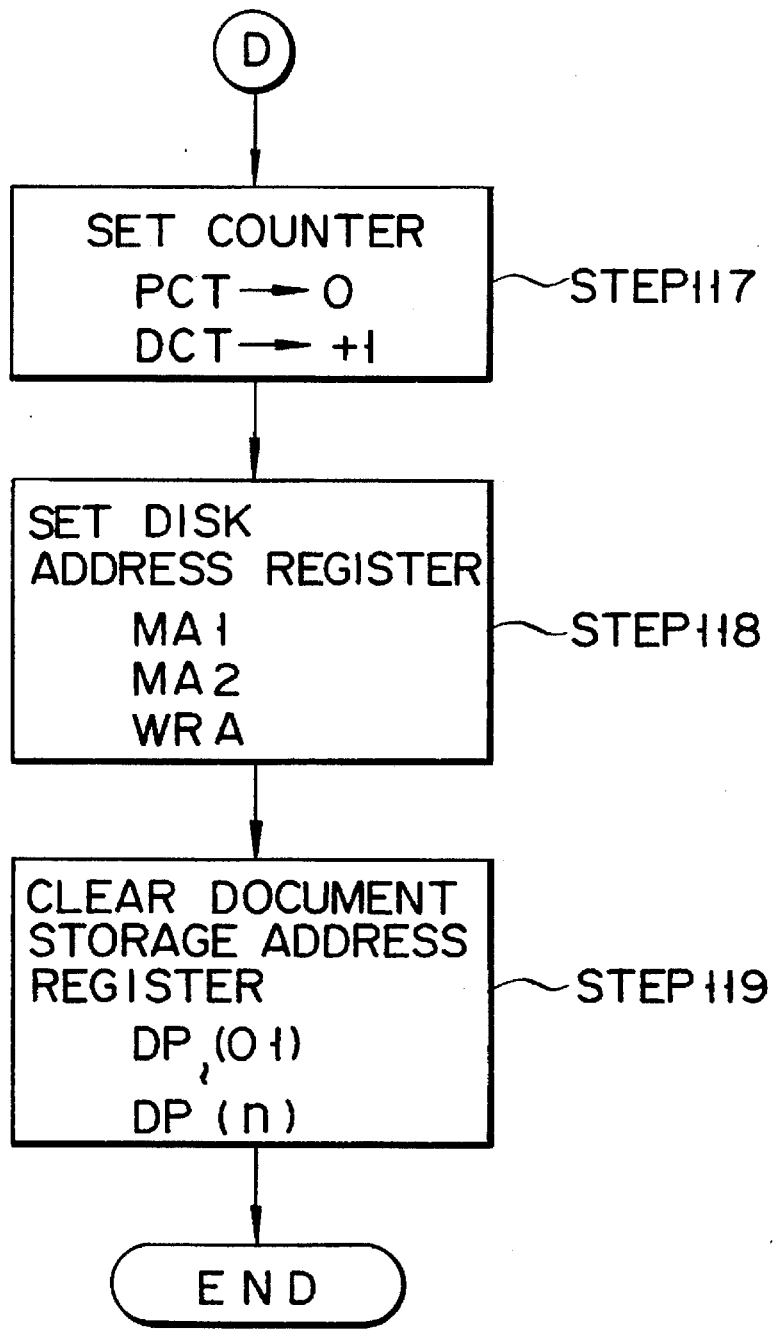

A reduced abstract image forming operation will be described below with reference to flow charts in FIGS. 39I to 39K.

The item 109 ("number of abstract image divisions") is checked (STEP 90). If "automatic" is set in the item 109, an abstract image division count (M) is calculated to calculate reduced data of a specific number of pages to be printed on a single side of the abstract image sheet Q (STEP 91). Calculation of a division count (M) of an abstract image portion is performed by using the division count table 183 in FIG. 19B which stores division counts (M) predetermined on the basis of the respective conditions: document sizes (S), output paper sizes (K), and document sheet counts (n). The image data in the optical disk 233 is reduced on the basis of the calculated division count (M), the document size (S), and the document sheet size (K) to calculate a reduction factor (Z) at which the data is written in the page memory 30 (STEP 92).

Subsequently, data of the document size (Sa) 714 and of the vertical/horizontal direction 715 of a page No. (N) of the page data of the corresponding document No. (r) are read out from the optical disk 233 (STEP 93). In this case, if "same size" is selected in the item 111 ("abstract image reduction condition"), and the document size (Sa) of the corresponding page (N) is different from the document size (S), the reduction factor Z is updated to a reduction factor Z' (STEP 94 to STEP 96).

If it is determined in STEP 90 that "4 to 16" is selected in the item 109 ("number of abstract image divisions"), the selected value is used as an abstract image division count (M) (STEP 97).

Data of the document size (Sa) 714 and of the vertical/horizontal direction 715 of a corresponding page No. (N) of a corresponding document No. (r) are read out from the optical disk 233 (STEP 98). A reduction factor (Z) is calculated on the basis of an already selected abstract image division count (M) and output paper size (K), and the document size (Sa) of the corresponding page (N) read out from the optical disk 233 (STEP 99).

After the reduction factors (Z) and (Z') are calculated, conditions such as the reduction factors (Z) and (Z') are set in the address controller 484 (STEP 100), and the image data of the corresponding page No. is read out (STEP 101). The readout image data is compressed by the compression/expansion circuit 21 (STEP 102) and is written on a reduced scale in the page memory 30 (STEP 103). In addition, numeric pattern data corresponding to the page number (N) is generated by the character generator 154 and is written at a designated address of the page memory 30 (STEP 104).

It is then checked whether the current page is the last page (STEP 105). If it is the last page, the reduced abstract image data is read out from the page memory 30 (STEP 106) and is printed on the selected paper sheet P (STEP 107). In this case, since the last page is determined, the abstract image sheet Q is discharged (STEP 108). The flow advances to STEP 117 to perform a register setting operation.

If NO in STEP 105, it is checked whether a single side of the abstract image sheet Q is full (to check whether image data are written in all the divisions of the division count M) (STEP 109).

If NO in STEP 109, the item 109 ("number of abstract image divisions") is checked (STEP 110). If "automatic" is set, the flow advances to STEP 93. If "automatic" is not set, the flow advances to STEP 98 to perform processing of the next page data.

If YES in STEP 109, the reduced abstract image data is read out from the page memory 30 (STEP 111) and is written in the selected paper sheet P (STEP 112). After printing, it is checked whether printing on a lower surface (lower surface printing) is to be performed (STEP 113). If upper surface printing is determined, the abstract image sheet Q is temporarily stocked in the apparatus upon a fixing operation (STEP 114), and the flow shifts to a reduced abstract image forming operation in STEP 90 so as to form an abstract image on the lower surface. If lower surface printing is determined in STEP 113, the abstract image sheet Q is discharged upon a fixing operation (STEP 115). Thereafter, the item 108 ("number of abstract images") is checked (STEP 116). If "unlimited" is selected in the item 108, the flow shifts to a reduced abstract image forming operation in STEP 90 so as to form a reduced abstract image of remaining pages. If "one" is selected in the item 108, the formation of a reduced abstract image is stopped regardless of the presence/absence of remaining pages, and the flow advances to STEP 117 to perform a register setting operation.

A register setting operation as the last processing in abstract image formation will be described below with reference to a flow chart in FIG. 39K. When all the processing in abstract image formation is completed, setting of the counter 159 is performed in such a manner that the page number counter 162 is cleared to "0" and the document number counter 163 is incremented by one (STEP 117). Setting of the disk address register group is performed in such a manner that the management address register 172 is set to an address, in the management address area 712, for managing the next document; the management address area 173, to a start address at which data for managing the next document in the registered document management area 704 is recorded; and the document data recording address register 174, to a start address at which document data in the file data area 701 is recorded (STEP 118). Subsequently, the contents of the document storage address registers DP(01) 175 to DP(n) 176 are cleared (STEP 119). With this processing, the formation of the abstract image sheet Q is completed.

Figure 39M:
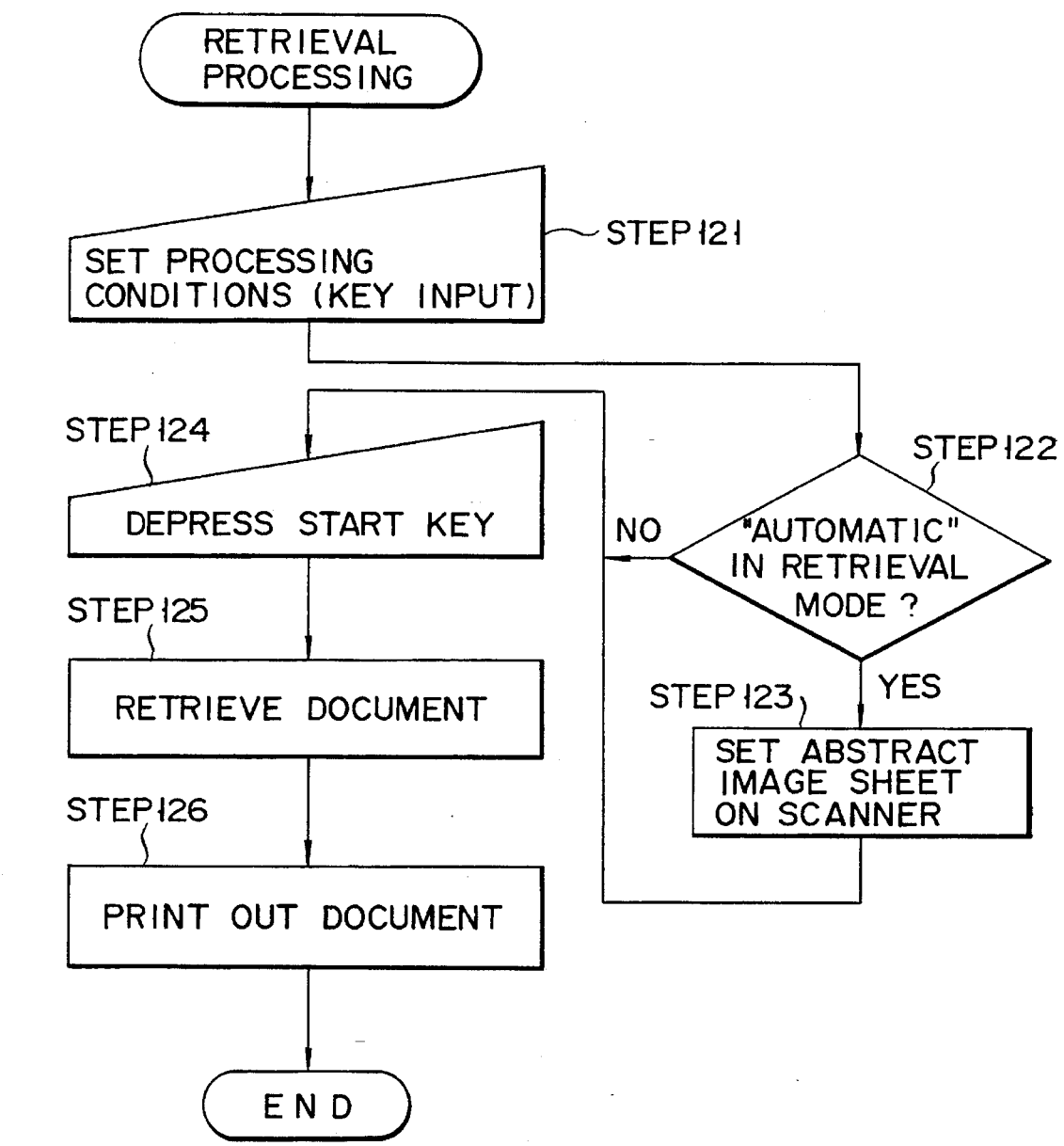
FIG. 39M is a flow chart for explaining retrieval processing in FIG. 39A.

The retrieval processing in FIG. 39A will be described in detail below with reference to a flow chart in FIG. 39M. Prior to execution of retrieval, processing conditions for the retrieval processing are set by using the condition setting switch panel 105 of the display section 12 (STEP 121). Of the conditions set in STEP 121, a condition in the item 130 ("retrieval mode") is checked (STEP 122). If "automatic" is set in the item 130, the upper surface 800 of the abstract image sheet Q is set, as a reading surface, on the scanner 41 (STEP 123). If "manual" is set in the item 130, no abstract image sheet Q is set. When the start key 100 is depressed (STEP 124), retrieval of a corresponding document is performed and its contents are output (STEP 125 and STEP 126).

Figure 39N:
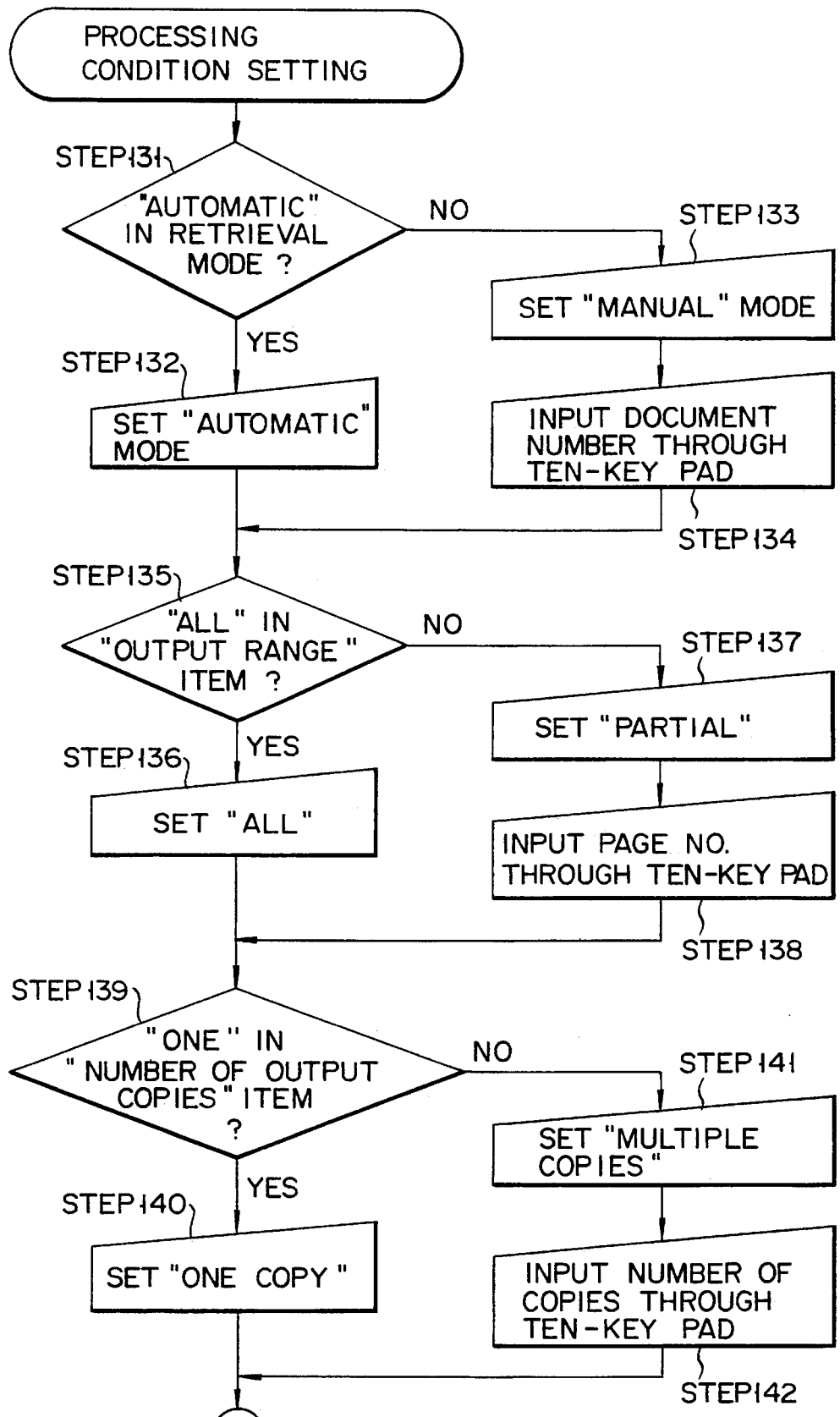
Figure 390:
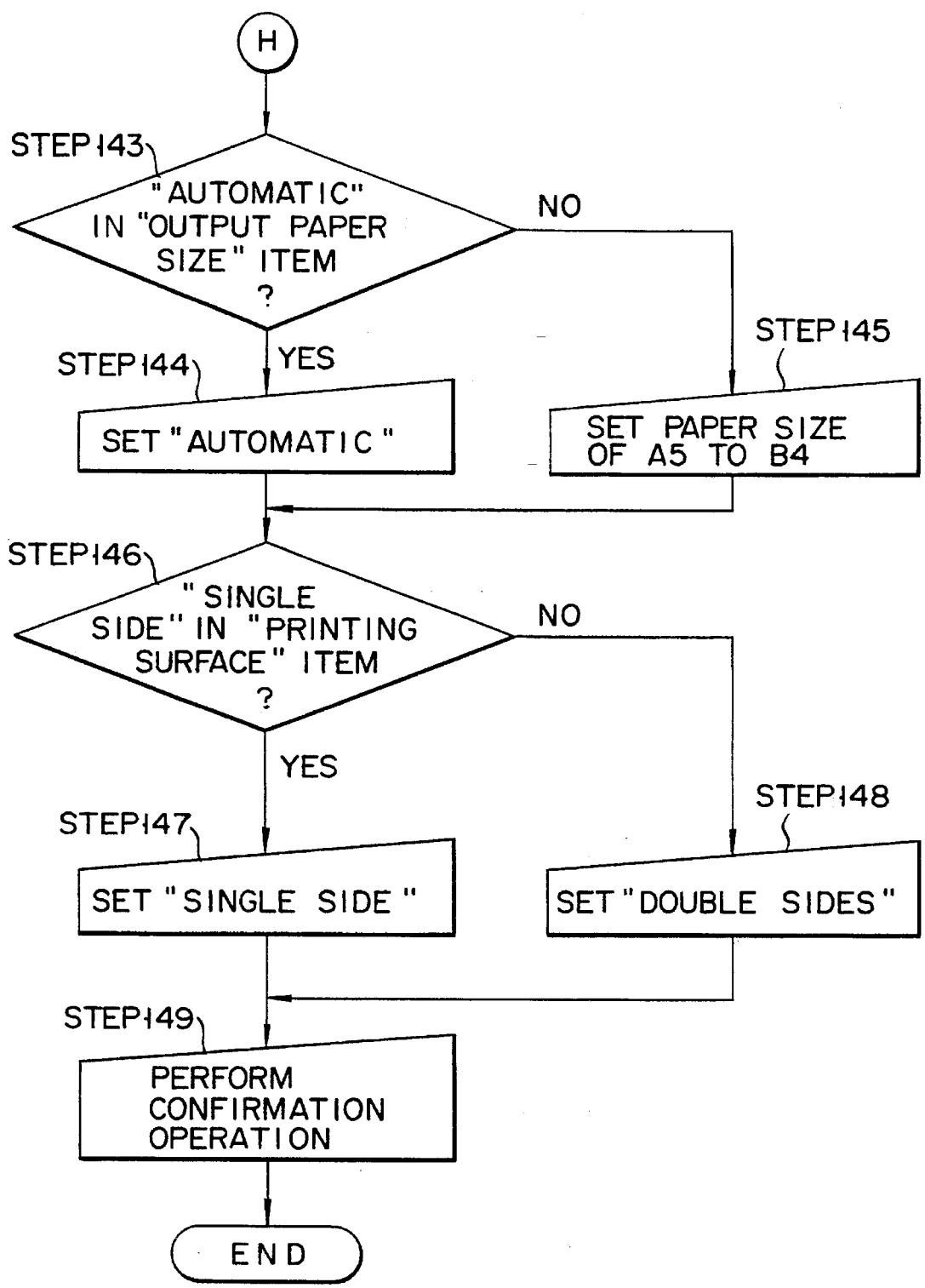

Setting of the processing conditions in FIG. 39M will be described in detail below, with reference to the flow charts in FIGS. 39N and 39O. Selection of a condition in the item 130 ("retrieval mode") is performed by using the condition setting switch panel 105 (STEP 131). If retrieval is to be performed by identifying a bar code on the upper surface 800 of the abstract image sheet Q, "automatic" is selected (STEP 132). If a document number is to be input by an operator, "manual" is selected (STEP 133), and a document number is input through the ten-key pad 129 (STEP 134).

Selection of a condition in the item 131 ("output range") is performed by using the condition setting switch panel 105 (STEP 135). If all the contents of a corresponding document are to be output, "all" is selected in the item 131 (STEP 136). If only a designated page of the document is to be output, "partial" is selected in the item 131 (STEP 137), and a designated page number is input through the ten-key pad 129 (STEP 138).

Selection of a condition is performed in the item 132 ("number of output copies") by using the condition setting switch panel 105 (STEP 139). If "one copy" is selected in the item 132, one copy is selected (STEP 140). If a plurality of copies are to be output, "multiple copies" is selected in the item 132 (STEP 141), and a required number of copies is input through the ten-key pad 129 (STEP 142).

Selection of a condition in the item 133 ("output paper size") is performed by using the condition setting switch panel 105 (STEP 143). If an abstract image is to be printed on a paper sheet having the same size as that of a corresponding document sheet, "automatic" is selected in the item 133 (STEP 144). If such an output operation is to be performed by using a paper sheet having a designated size regardless of a document size, a corresponding paper size key in the item 133 is depressed (STEP 145).

Selection of a condition in the item 134 ("printing surface") is performed by using the condition setting switch panel 105 (STEP 146). If only a single side is to be output, "single side" is selected in the item 134 (STEP 147). If double sides are to be output, "double sides" is selected in the item 134 (STEP 148). After the above conditions are set, the confirmation key 137 is depressed (STEP 149) to complete setting of the processing conditions in document retrieval.

Figure 39Q:
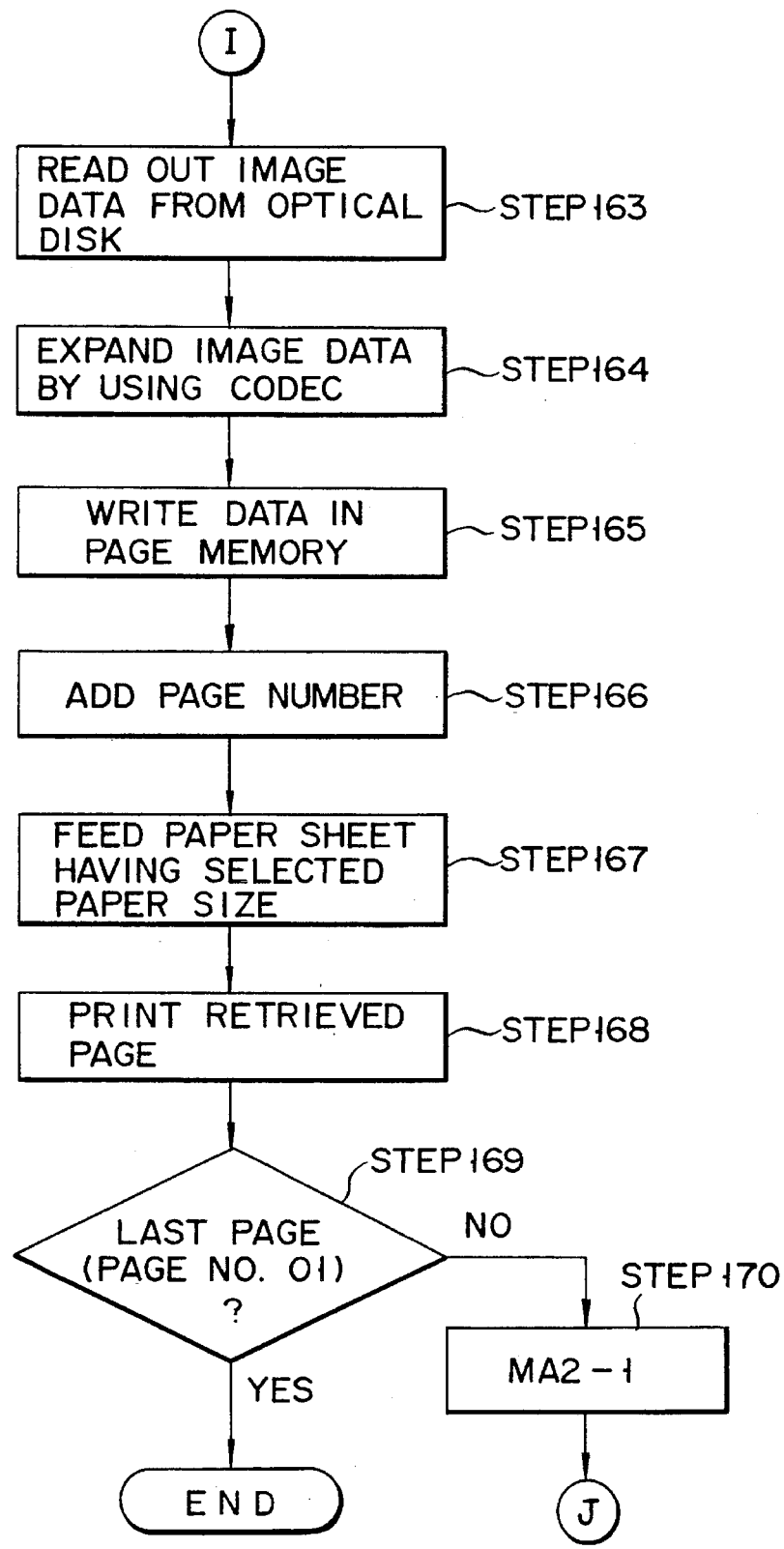

Document retrieval in FIG. 39M will be described below with reference to flow charts in FIG. 39P and 39Q.

In document retrieval, the item 130 ("retrieval mode") is checked first (STEP 151). If "automatic" is set in the item 130, a bar code in a designated area on the upper surface 800 of the abstract image sheet Q set on the scanner 41 is read out (STEP 152). Bar code pattern determination is performed to decode the bar code to obtain a document number (STEP 153). If it is determined in STEP 151 that "manual" is set in the item 130, since a document number is designated in advance, the abstract image sheet Q is not read.

Retrieval is then performed on the basis of the document number (STEP 154). This retrieval is performed with respect to the management address area 712 in FIG. 20, and it is checked whether a corresponding document number is present in the management address area 712 (STEP 155).

If no corresponding document is found in this retrieval operation, the display section 12 is caused to display that no corresponding document is present (STEP 156). If a corresponding document is found in the management address area 712 in the retrieval operation in STEP 155, the address value of the page No. (N) 721 of corresponding document data in the registered document management area 704 is set in the management address register 173 (STEP 157).

Subsequently, of the document data of the page No. (N) recorded at the address in the page No. 721, a document size (Sa) and data discriminating vertical and horizontal directions are read out from the optical disk 233 (STEP 158). The item 133 ("output paper size") is then checked (STEP 159). If "automatic" is selected in the item 133, a reduction/enlargement factor (Z) of the image data of the corresponding page written in the page memory 30 is set to be "1", i.e., 100% (STEP 160).

If it is determined in STEP 159 that designation of a paper size is selected in the item 133, the reduction/enlargement factor (Z) is calculated from the output paper size (K) and the document size (Sa) (STEP 161). Page memory control data is set in the address controller 484 on the basis of the calculation results such as the reduction/enlargement factor (Z) (STEP 162).

The image data of a corresponding page is read out from the optical disk 233 (STEP 163) and is expanded by the compression/expansion circuit 21 (STEP 164). The image data is then written in the page memory 30 (STEP 165). At this time, the value of the corresponding page No. (N) is added to the page memory 30 as a page number in the form of a numeric pattern (STEP 166). Thereafter, a paper sheet having the selected paper size is fed and the retrieved page is printed thereon (STEP 167 and STEP 168). After printing, determination of the last output is performed (STEP 169).

In this determination, the last output is determined when a page data storage address designated by the management address register 173 is designated by DPA(01) 720. If the last output is determined, a series of operations of document retrieval are completed. If the last output is not determined, the value of the management address register 173 is decremented by one (STEP 170), and the flow shifts to STEP 158 to perform an output operation for the next page data. Since the retrieval result is output from the page (N) to the page (01), the pages are discharged onto the discharge tray 259 in the order of increasing page number.

Document list processing in FIG. 29A will be described in detail below with reference to a flow chart in FIG. 39R. Prior to formation of a document list, processing conditions for document list processing are set by using the condition setting switch panel 105 (STEP 171). When the start key 100 is depressed (STEP 172), document retrieval is performed in accordance with the conditions set in the processing condition setting (STEP 173), and a document list is output (STEP 174).

Figure 39S:
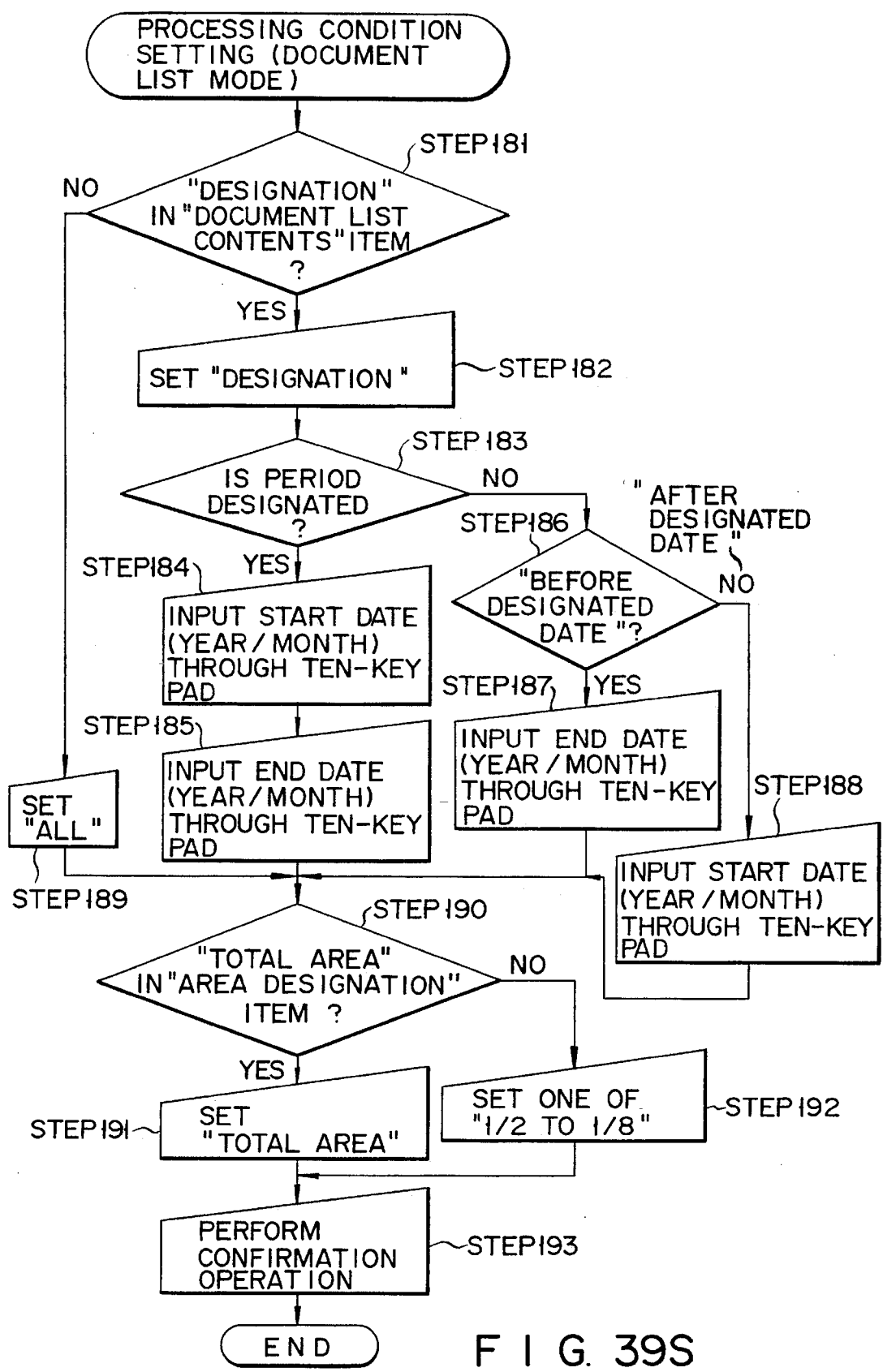
FIG. 39S is a flow chart for explaining a processing condition setting operation in FIG. 39R.

Processing condition setting in FIG. 39R will be described in detail below with reference to flow chart in FIG. 39S. Selection of a condition in the item 140 ("document list contents") is performed by using the condition setting switch panel 105 (STEP 181). If a range (period) in formation of a document list is to be designated, "designation" is selected (STEP 182). If a period is to be set in the "designation" mode, the start and end dates (specific years and months) of a retrieval period are input through the ten-key pad 129 (STEP 183 to STEP 185). Setting other than that of a period includes two types of setting: setting of "before a designated date"; and setting of "after a designated date" (STEP 186).

If "before a designated date" is to be set, an end date on which retrieval is ended is input (STEP 187). If "after a designated date" is to be set, a start date is input (STEP 188).

If a list of documents in the optical disk 233 is to be formed without designating a range for formation of the document list in selection of a condition in the item 140, "all" is selected in the item 140 (STEP 189).

Subsequently, selection of a condition in the item 142 ("area designation") is performed to set a printing area of the first page of each document on the document list (STEP 190). If the total area of the first page is to be printed, "total area" is selected (STEP 191). If a partial area is to be designated, "½", "¼", or "⅛" is selected (STEP 192). After all the processing conditions are input, the condition setting switch panel 105 on the confirmation display portion 145 is depressed (STEP 193) to complete the processing condition setting.

Figure 39T:
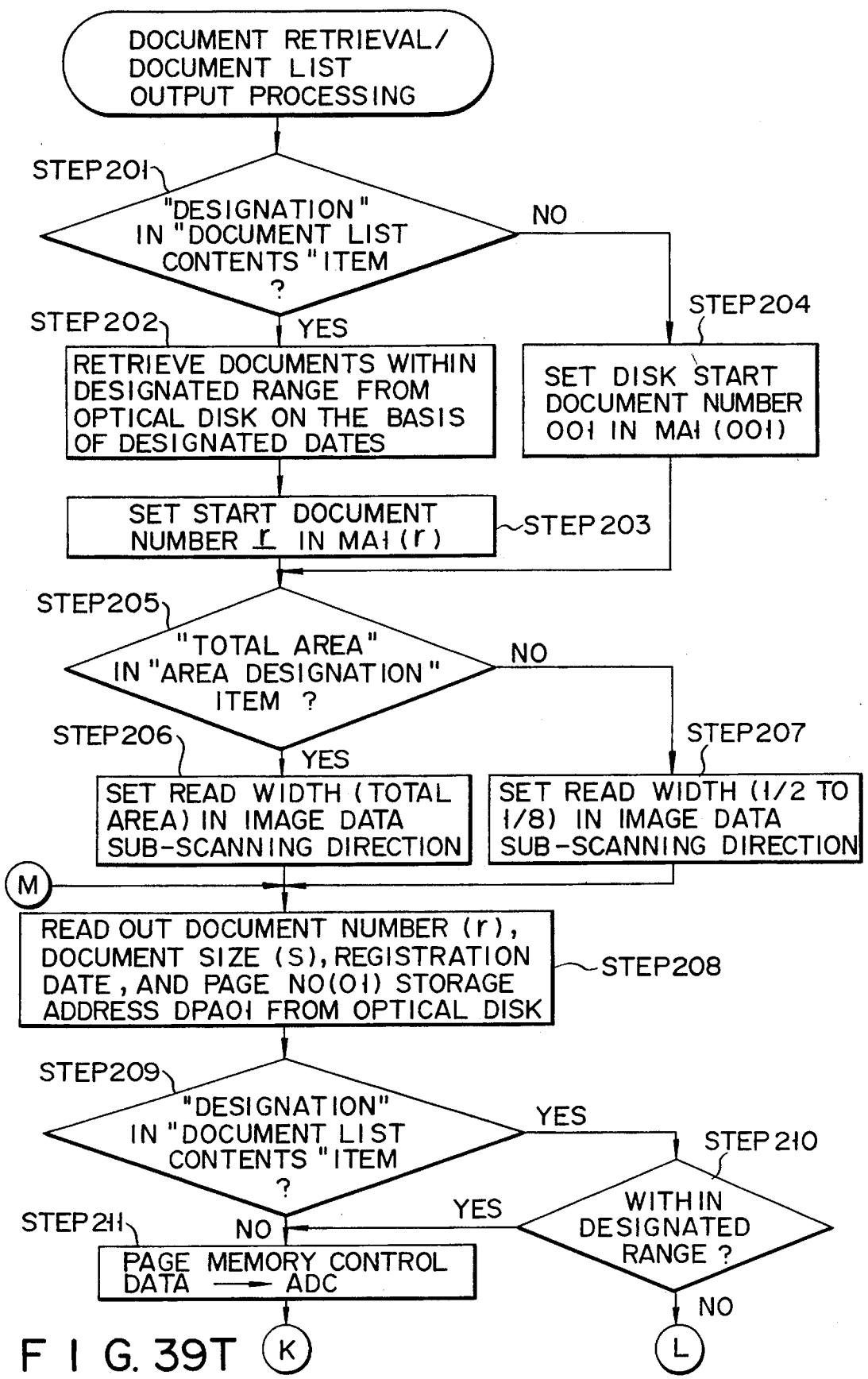
FIGS. 39T and 39U are flow charts for explaining document retrieval processing and document output processing in FIG. 39R.
Figure 39U:
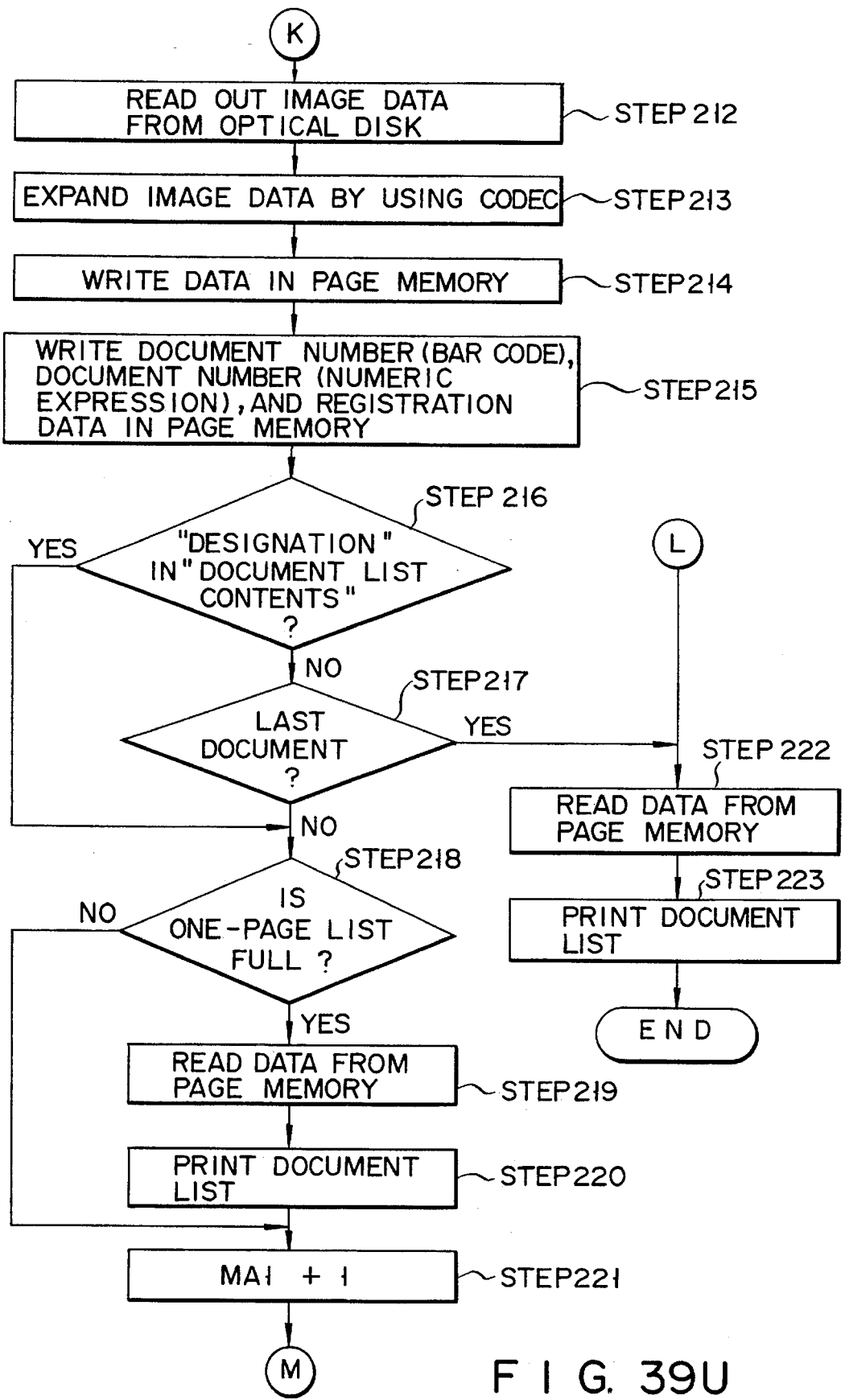

Document retrieval and document list output processing in FIG. 39R will be described in detail below with reference to flow charts in FIGS. 39T and 39U. The item 140 ("document list contents") is checked first (STEP 201). If "designation" is set in the item 140, management data is retrieved from the registered document management area 704 in the optical disk 233 (STEP 202). More specifically, retrieval is performed on the basis of the registration date 708 of each document in the registered document management area 704. Of documents corresponding to a range designated in the above-described processing condition setting, a document number (r) with the oldest date (smallest year and month numbers) is selected. A management address corresponding to the document number (r) is set in the management address register 172 (STEP 203).

If it is determined in STEP 201 that no period is designated in the item 140, management address corresponding to the oldest document in the optical disk 233, i.e., the smallest document number (001) is set in the management address register 172 (STEP 204).

The item 142 ("area designation") is checked (STEP 205). If "total area" is set in the item 142, the read width in the image data sub-scanning direction is set to "total area" in order to read out all the one-page image data from the optical disk 233 (STEP 206).

If "total area" is not set in the item 142, the read width in the image data sub-scanning direction is set in correspondence with "½", "¼", or "⅛" designated in the processing condition setting (STEP 207).

Of the document management data of a corresponding document No., a document number (r), a document size (S), a registration date, and a page No. (01) storage address DPA01 are read out from the optical disk unit 51 (STEP 208). Subsequently, the item 140 ("document list contents") is checked (STEP 209). If "designation" is set in the item 140, the registration date of a currently readout document is checked (STEP 210). If it is determined that the registration date falls outside the range set in the processing condition setting, it is determined that retrieval of all the document corresponding to the document list is completed, and the flow advances to STEP 222 to perform a document list printing operation. If it is determined in STEP 209 that "designation" is not set in the item 140, and if it is determined in STEP 210 that the registration date falls inside the range, control data is set with respect to the page memory 30 (STEP 211). With this operation, data in the document list mode control data 182 in FIG. 19A is set in the address controller 484. The image data of the first page of a corresponding document is read out from the optical disk 233 (STEP 212). The readout data is expanded by the compression/expansion circuit 21 (STEP 213) and is written in the page memory 30 (STEP 214).

Subsequently, a bar code, a document number r, and a registration date are written in the page memory 30 (STEP 215). The item 140 ("Document list contents") is checked (STEP 216). If a condition other than "designation" is set, determination of the last document is performed (the last document is a document having the last document number registered in the optical disk 233) (STEP 217). If the last document is determined, the flow advances to STEP 222 to perform a document list printing operation.

If it is determined in STEP 216 that "designation" is set in the item 140, and if NO is obtained in STEP 217, it is checked whether the list is full (STEP 218). Whether the list is full is determined on the basis of a condition set in the item 142 ("area designation"). If the number of divisions of the document list per page coincides with the number of documents which have been read from the optical disk 233 prior to this determination, it is determined that the list is full.

If the list of one page is full, data is read out from the page memory 30 (STEP 219), and the readout contents are printed as a document list (STEP 220). The value of the management address register 172 is then incremented by one (STEP 221), and the flow shifts to STEP 208 to read out document management data of the next document number (r+1). If NO in STEP 218, the flow advances to STEP 221.

The document list printing operation is completed when the data read out from the page memory 30 (STEP 222) is printed as a document list (STEP 223).

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:

document reading means for reading a plural-page document to obtain images;

image storage means for storing the images obtained by the document reading means;

first write means for writing an image in a page memory with an equal scale, the image written by the first write means being an image on a first page of the plural-page document and being included among the images which are obtained by the document reading means and which are stored in the image storage means;

retrieval code generating means for generating a retrieval code corresponding to the plural-page document read by the document reading means, said retrieval code being used for retrieving the images of the plural-page document stored in the image storage means, so that the images of the plural-page document are automatically retrieved and output from the image storage means when the retrieval code is read;

second write means for writing the retrieval code generated by the retrieval code generating means in the page memory;

first print means for printing on a first side of a sheet of paper said image on the first page of the plural-page document, the image on the first page being printed along with the retrieval code written in the page memory by the second write means;

selection means for selecting the number of images printed on a second side of the sheet of paper in response to an input operation by an operator;

calculation means for calculating an image reduction factor on the basis of the number of images selected by the selection means, a size of the document, and a size of the sheet of paper;

third write means for writing images in the page memory after the images are reduced by the image reduction factor, the images written by the third write means being images on second and succeeding pages of the plural-page document and included among the images which are read by the document reading means and which are stored in the image storage means; and second print means for printing on the second side of the sheet of paper the images which are shown on the second and succeeding pages of the plural-page document and the reduced images which are written in the page memory by the third write means.

2. Am image processing apparatus according to claim 1, wherein said designating means includes:

means for automatically calculating the number of pages to be formed on the second side of the one-page document, in accordance with the number of images corresponding to the remaining pages of the plural-page document; and means for manually designating the number of images to be formed on the second side of the one-page document.

3. An image processing apparatus according to claim 1, wherein said second preparing means includes means for determining an image reducing scale, in accordance with both the number designated by the designating means and sizes of the images formed on the second side of the one-page document.

4. An image processing apparatus according to claim 1, wherein said second preparing means includes means for forming images on a second one-page document in a reduced scale if all images corresponding to the remaining pages of the plural-page document cannot be formed on the second side of the one-page document.

5. An image processing apparatus comprising:

document reading means for reading a plural-page document to obtain images;

image storage means for storing the images obtained by the document reading means;

selection means for selecting the number of images to be printed on a first side of a sheet of paper in response to an input operation by an operator;

calculation means for calculating an image reduction factor on the basis of the number of images selected by the selection means, a size of the document, and a size of the sheet of paper;

first write means for writing reduced images in a page memory at the image reduction factor calculated by the calculation means without losing any data, the reduced images written by the first write means being based on the images read by the document reading means and stored in the image storage means;

retrieval code generating means for generating a retrieval code corresponding to the plural-page document read by the document reading means, said retrieval code being used for retrieving images of the plural-page document stored in the image storage means, so that the images of the plural-page document are automatically retrieved and output from the image storage means when the retrieval code is read;

second write means for writing the retrieval code generated by the retrieval code generating means in the page memory; and print means for printing the reduced images which the first write means writes in the page memory and which correspond to the images on the plural-page document, said reduced images being printed on the sheet of paper along with the retrieval code which the second write means writes in the page memory.

* * * * *